(12) United States Patent
Wood

(10) Patent No.: US 7,159,415 B2
(45) Date of Patent: Jan. 9, 2007

(54) DRAWER STORAGE

(75) Inventor: Ian David Wood, Lowestoft (GB)

(73) Assignee: Applied Design and Engineering Limited (GB)

( * ) Notice: Subject to any disclaimer, the term of this patent is extended or adjusted under 35 U.S.C. 154(b) by 486 days.

(21) Appl. No.: 10/473,684

(22) PCT Filed: Mar. 13, 2002

(86) PCT No.: PCT/GB02/01139

§ 371 (c)(1),
(2), (4) Date: Sep. 12, 2003

(87) PCT Pub. No.: WO02/073107

PCT Pub. Date: Sep. 19, 2002

(65) Prior Publication Data

US 2004/0065579 A1    Apr. 8, 2004

(51) Int. Cl.
*F25D 11/02* (2006.01)
(52) U.S. Cl. ...................................................... 62/441
(58) Field of Classification Search ................ 62/441, 62/371, 457.1, 457.5
See application file for complete search history.

(56) References Cited

U.S. PATENT DOCUMENTS

| | | | |
|---|---|---|---|
| 1,337,696 A | 4/1920 | Ewen | |
| 2,077,739 A | 4/1937 | Bryant | |
| 2,223,234 A | 11/1940 | Stemme | |
| 2,338,889 A | 1/1944 | Yoxsimer | |
| 2,360,533 A | 10/1944 | Zeidler | |
| 2,386,757 A | 10/1945 | Straubel | |
| 2,460,469 A | 2/1949 | Rifkin et al. | |
| 2,780,510 A | 2/1957 | Cole, Jr. | |
| 2,894,845 A | 7/1959 | Stoddard | |
| 2,942,926 A | 6/1960 | Pavelka, Jr. | |
| 2,948,498 A | 8/1960 | Johnsen et al. | |
| 3,058,320 A | 10/1962 | Foster et al. | |
| 3,178,902 A | 4/1965 | Costantini et al. | |
| 3,206,943 A | 9/1965 | Rice et al. | |
| 3,210,957 A | 10/1965 | Rutishauser et al. | |
| 3,230,733 A | 1/1966 | Rutishauser et al. | |
| 3,323,625 A | 6/1967 | Webster | |
| 3,477,243 A | 11/1969 | Schroeder et al. | |
| 3,481,503 A | 12/1969 | Kloess et al. | |

(Continued)

FOREIGN PATENT DOCUMENTS

CH    269462    7/1950

(Continued)

OTHER PUBLICATIONS

Patent Abstracts of Japan; Nov. 6, 1989; vol. 013, No. 487 (C-649); abstract for JP 01 191618 A Matsushita Electric Works Ltd., Aug. 1, 1989.

*Primary Examiner*—Melvin Jones
(74) *Attorney, Agent, or Firm*—Stevens & Showalter LLP

(57) ABSTRACT

A cold-storage appliance includes an open-topped insulating container defining an external surface; an insulating lid adapted to close the open top of the container; a cooling means adapted to cool the interior of the container; and a structure supporting the container, the lid and the cooling means; wherein the container is mounted to the structure for movement relative to the structure and the lid to open the container and afford access to its interior or to close the container. Movement of the drawer includes a major component to open or close the drawer and a minor component transverse to the major component to separate the drawer from the lid at opening.

52 Claims, 35 Drawing Sheets

U.S. PATENT DOCUMENTS

| | | |
|---|---|---|
| 3,543,952 A | 12/1970 | Young |
| 3,772,898 A | 11/1973 | Anderson |
| 3,907,147 A | 9/1975 | Goobeck |
| 4,019,339 A | 4/1977 | Anderson |
| 4,085,986 A | 4/1978 | Taub |
| 4,180,093 A | 12/1979 | Kamezaki |
| 4,305,625 A | 12/1981 | Gutner et al. |
| 4,317,607 A | 3/1982 | Gomolka |
| 4,365,484 A | 12/1982 | Carson et al. |
| 4,596,427 A | 6/1986 | Pflugfelder |
| 4,706,466 A | 11/1987 | Yingst et al. |
| 4,872,798 A | 10/1989 | Ide |
| 4,898,294 A | 2/1990 | Jennings |
| 4,899,554 A | 2/1990 | Kato et al. |
| 4,926,754 A | 5/1990 | Feuz |
| 5,029,450 A | 7/1991 | Takano et al. |
| 5,120,118 A | 6/1992 | Rankin |
| 5,178,655 A | 1/1993 | Sassier |
| 5,271,240 A | 12/1993 | Detrick et al. |
| 5,377,498 A | 1/1995 | Cur et al. |
| 5,661,978 A | 9/1997 | Holmes et al. |
| 5,865,037 A | 2/1999 | Bostic |
| 5,921,095 A | 7/1999 | Lee et al. |
| 5,927,088 A | 7/1999 | Shaw |
| 6,176,776 B1 | 1/2001 | Finkelstein et al. |
| 6,282,914 B1 | 9/2001 | Steinhoff et al. |

FOREIGN PATENT DOCUMENTS

| | | | |
|---|---|---|---|
| CH | 663712 A5 | 1/1988 | |
| DE | 808845 C | 7/1951 | |
| DE | 1129972 B | 5/1962 | |
| DE | 1601936 | 3/1971 | |
| DE | 2017564 | 10/1971 | |
| DE | 2212857 A | 9/1973 | |
| DE | 2262277 | 6/1974 | |
| DE | 2823048 | 12/1979 | |
| DE | 2918222 A | 11/1980 | |
| DE | 3015351 | 1/1981 | |
| DE | 3126325 A | 1/1983 | |
| DE | 3631591 A1 | 7/1987 | |
| DE | 4021497 A1 | 1/1992 | |
| DE | 4237293 A1 | 5/1994 | |
| DE | 19546984 A1 | 6/1997 | |
| EP | 0023145 A1 | 1/1981 | |
| EP | 0036238 A2 | 9/1981 | |
| EP | 0080916 A1 | 6/1983 | |
| EP | 0405680 A2 | 1/1991 | |
| EP | 0440296 A1 | 8/1991 | |
| EP | 0518183 A2 | 12/1992 | |
| EP | 0720824 A2 | 7/1996 | |
| EP | 0754636 A1 | 1/1997 | |
| EP | 0819898 A2 | 1/1998 | |
| FR | 933333 | 4/1948 | |
| FR | 1377844 | 11/1964 | |
| FR | 2777985 | 10/1999 | |
| GB | 341745 | 1/1931 | |
| GB | 418489 | 10/1934 | |
| GB | 579071 | 7/1946 | |
| GB | 581121 | 10/1946 | |
| GB | 602329 | 5/1948 | |
| GB | 602590 | 5/1948 | |
| GB | 620460 | 3/1949 | |
| GB | 628939 | 9/1949 | |
| GB | 642475 | 9/1950 | |
| GB | 948223 | 1/1964 | |
| GB | 1143926 | 2/1969 | |
| GB | 1188881 | 4/1970 | |
| GB | 1400685 | 7/1975 | |
| GB | 1430789 | 4/1976 | |
| GB | 1484282 | 9/1977 | |
| GB | 1551044 | 8/1979 | |
| GB | 2154553 A | 9/1985 | |
| GB | 2161064 A | 1/1986 | |
| GB | 2197639 A | 5/1988 | |
| GB | 2317595 A | 4/1998 | |
| GB | 2354061 A | 3/2001 | |
| JP | 1262387 A | 10/1989 | |
| JP | 1262390 A | 10/1989 | |
| JP | 2282679 | 11/1990 | |
| JP | 10220884 | 8/1998 | |
| JP | 11193966 A | 7/1999 | |
| JP | 2002295952 | 10/2002 | |
| WO | WO 85/00422 A1 | 1/1985 | |
| WO | WO 01/20237 A1 | 3/2001 | |
| WO | WO 01/26532 A1 | 4/2001 | |
| WO | WO 01/71263 A1 | 9/2001 | |
| WO | WO 02/22993 A1 | 3/2002 | |
| WO | WO 02/073104 A1 | 9/2002 | |
| WO | WO 02/073105 A1 | 9/2002 | |

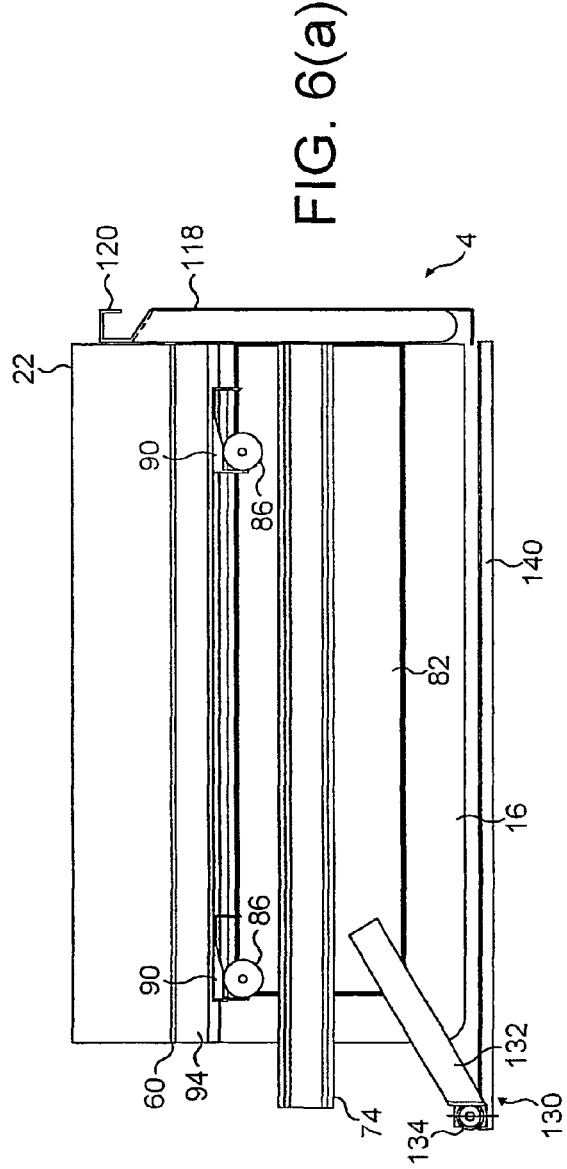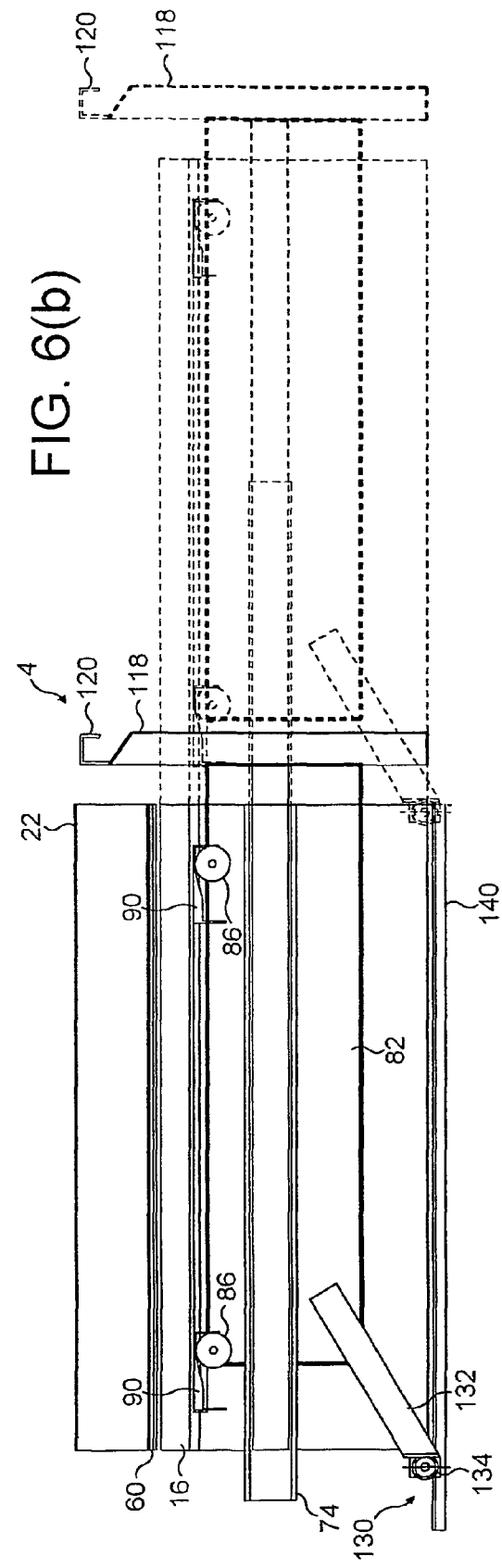

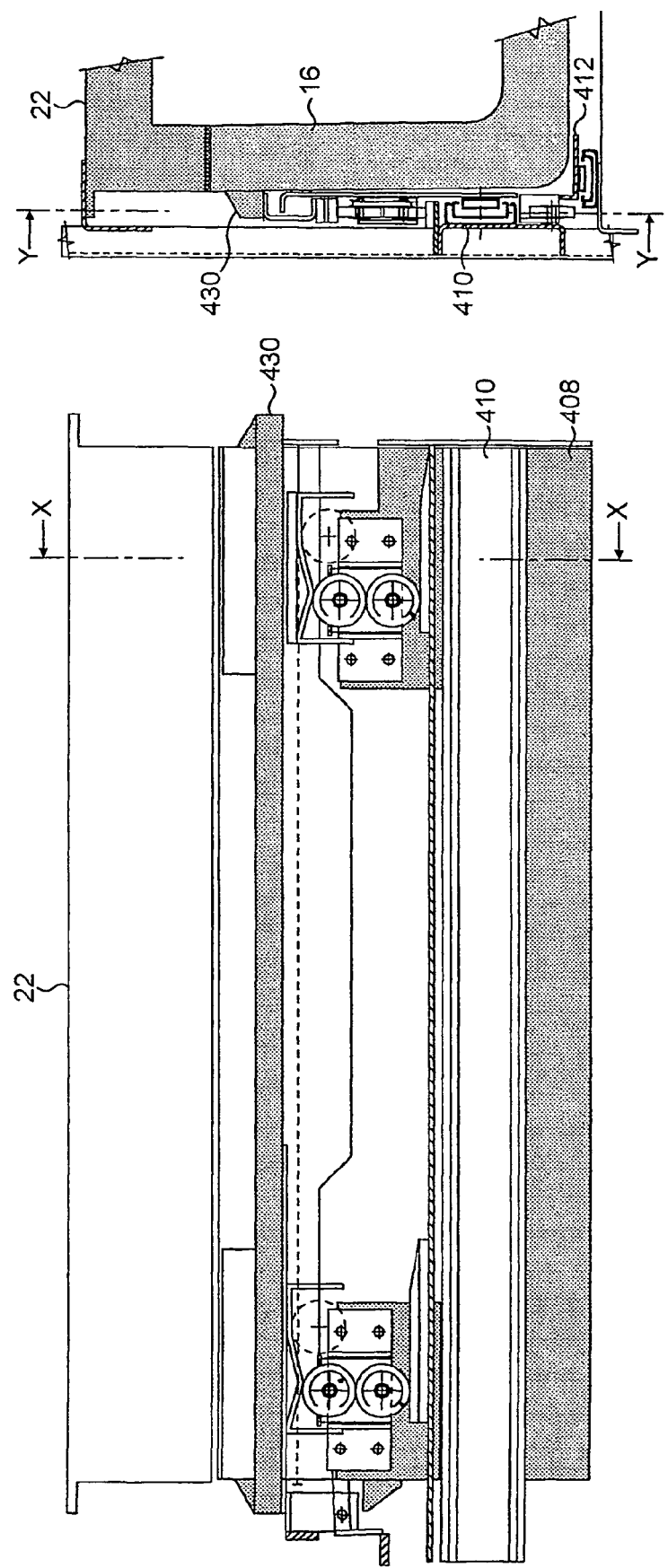

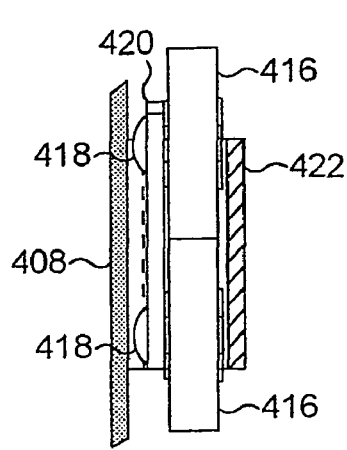
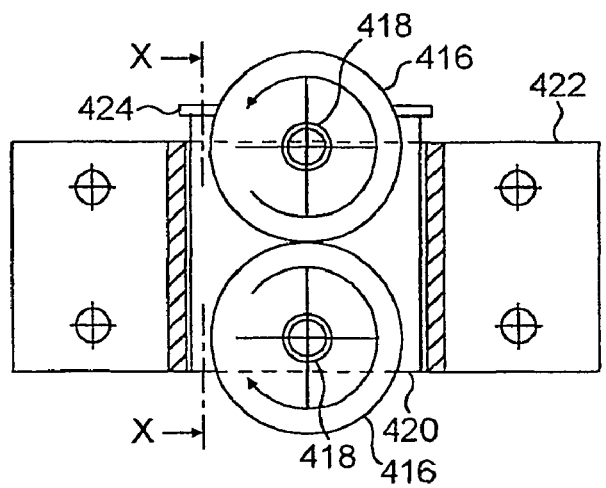
FIG. 18(a)   FIG. 18(b)
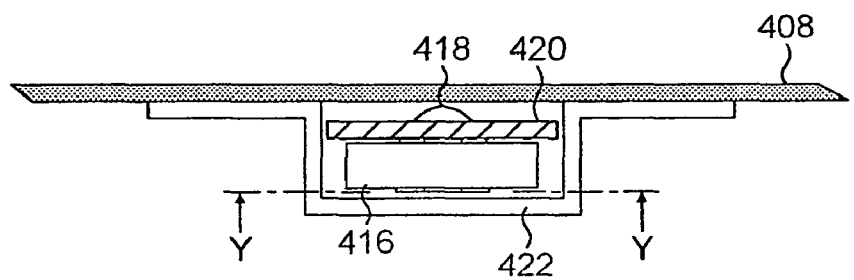
FIG. 18(c)
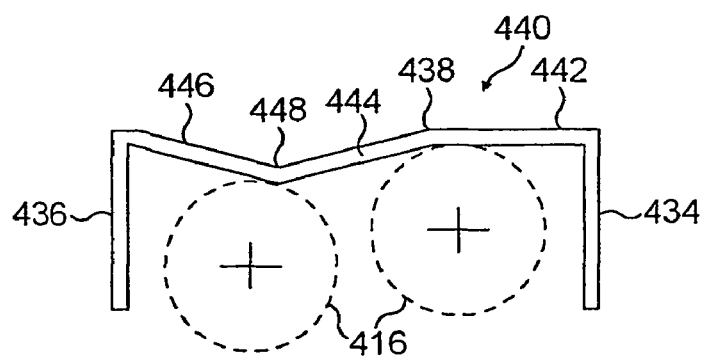
FIG. 21

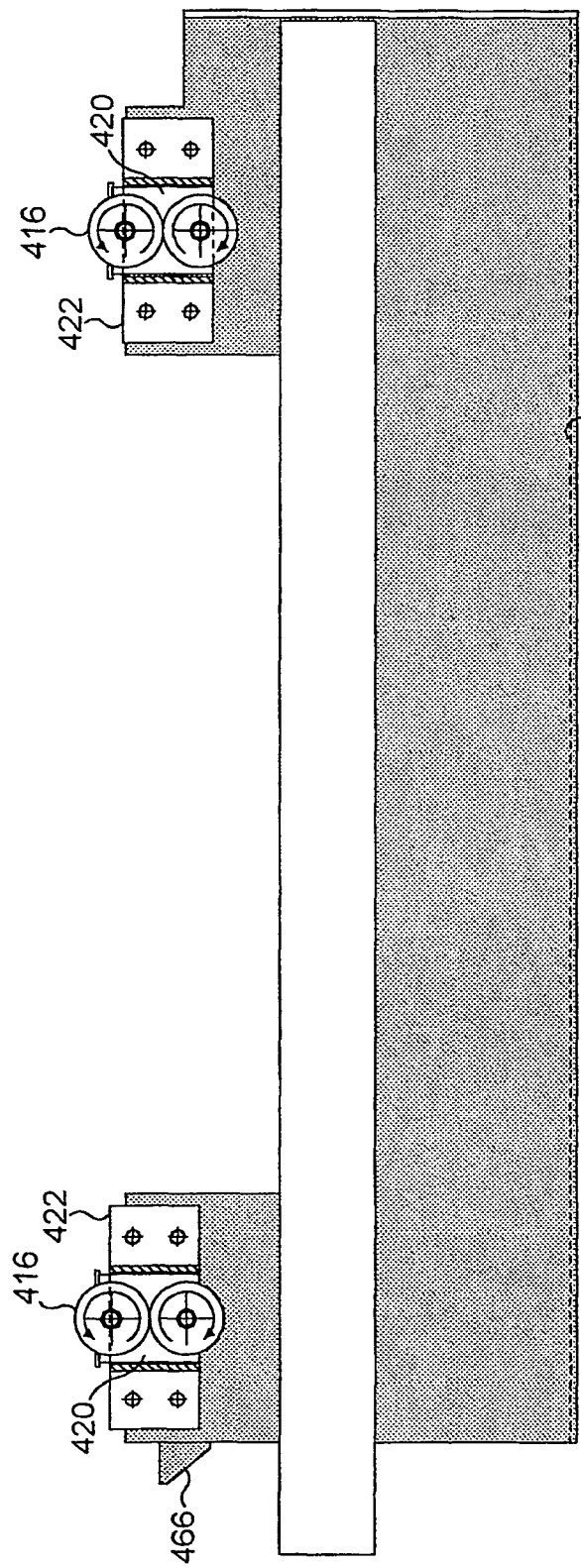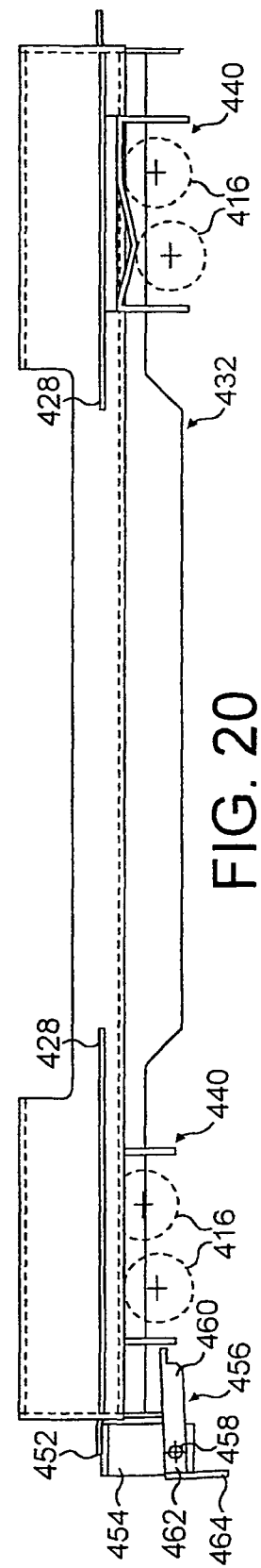

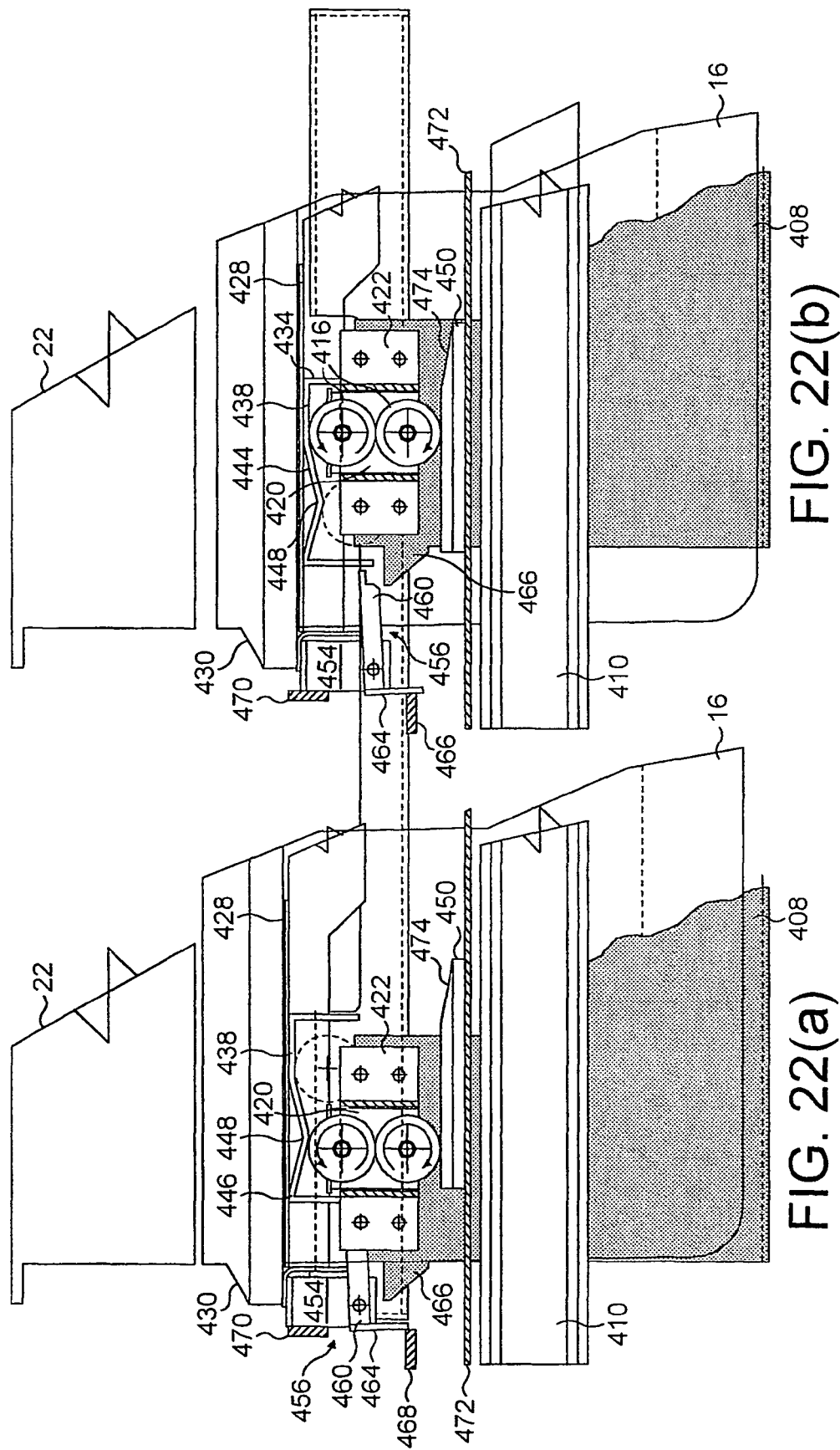

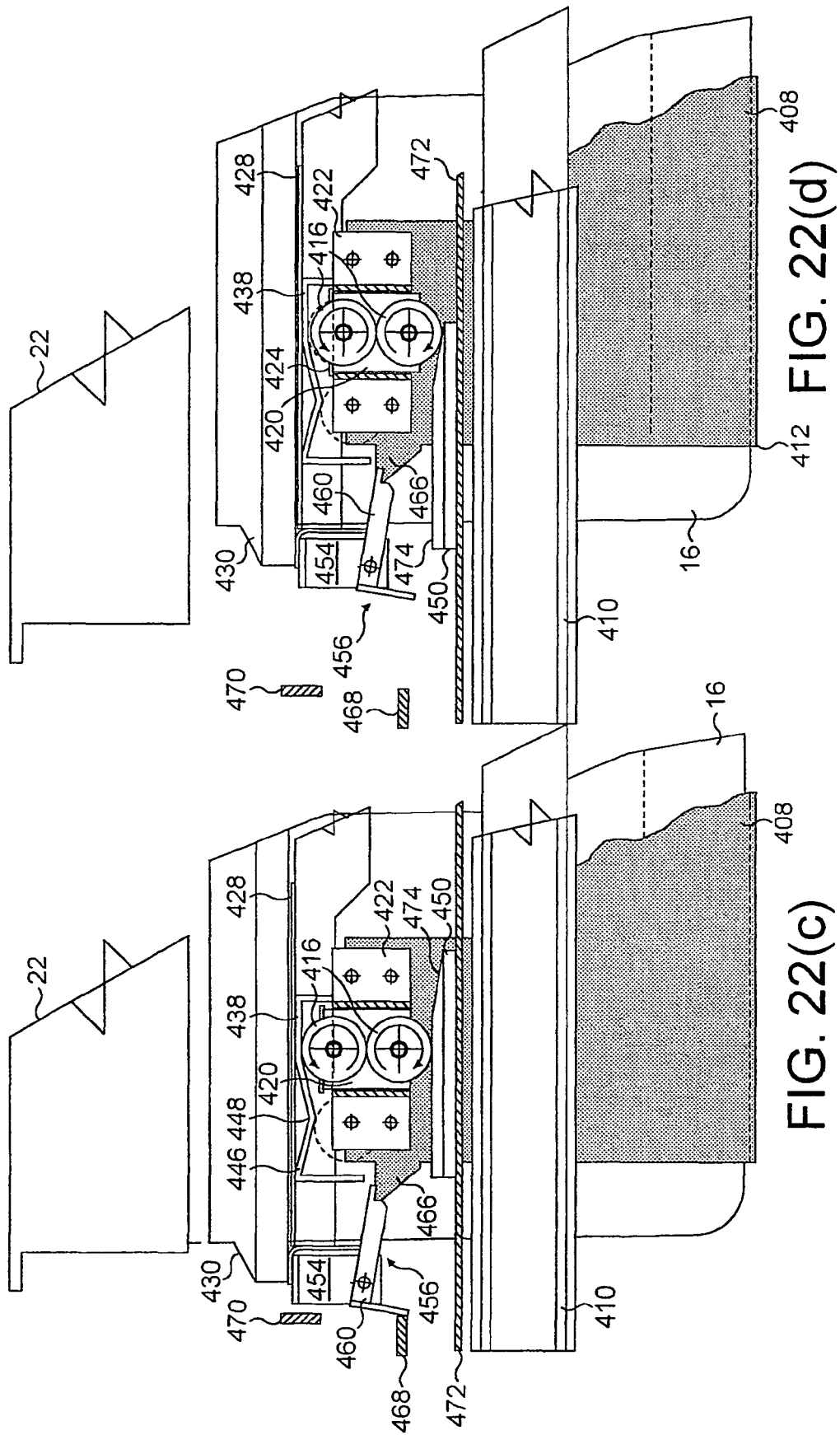

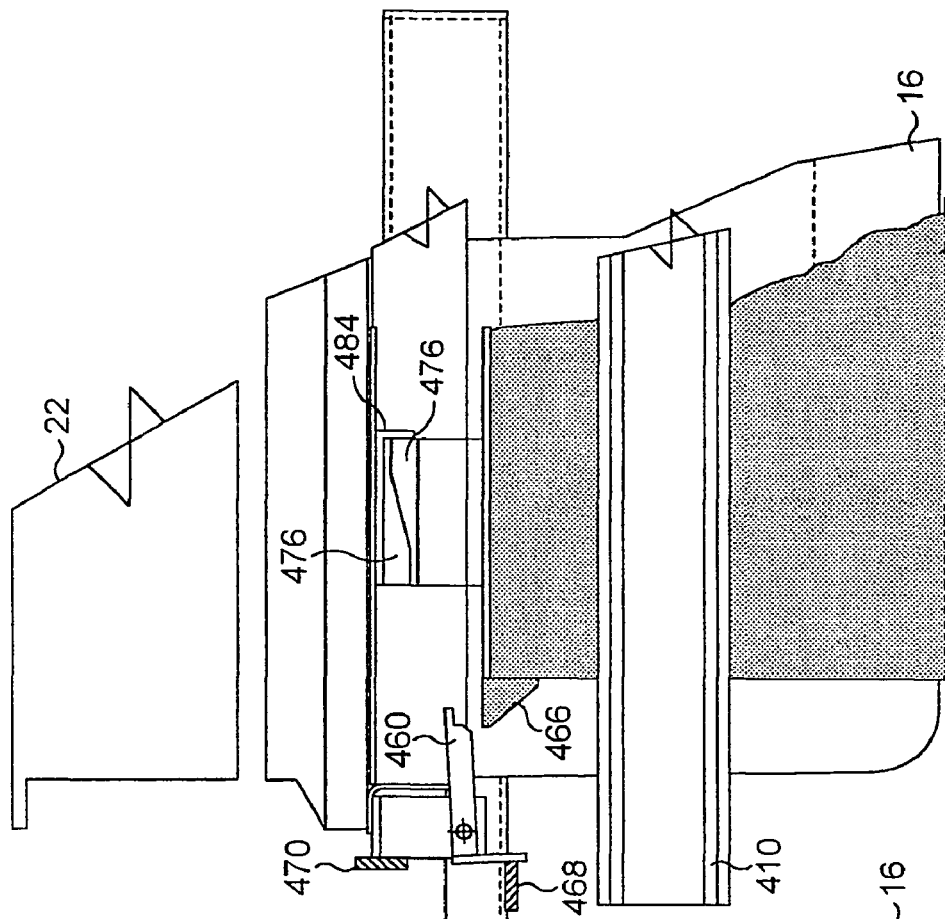
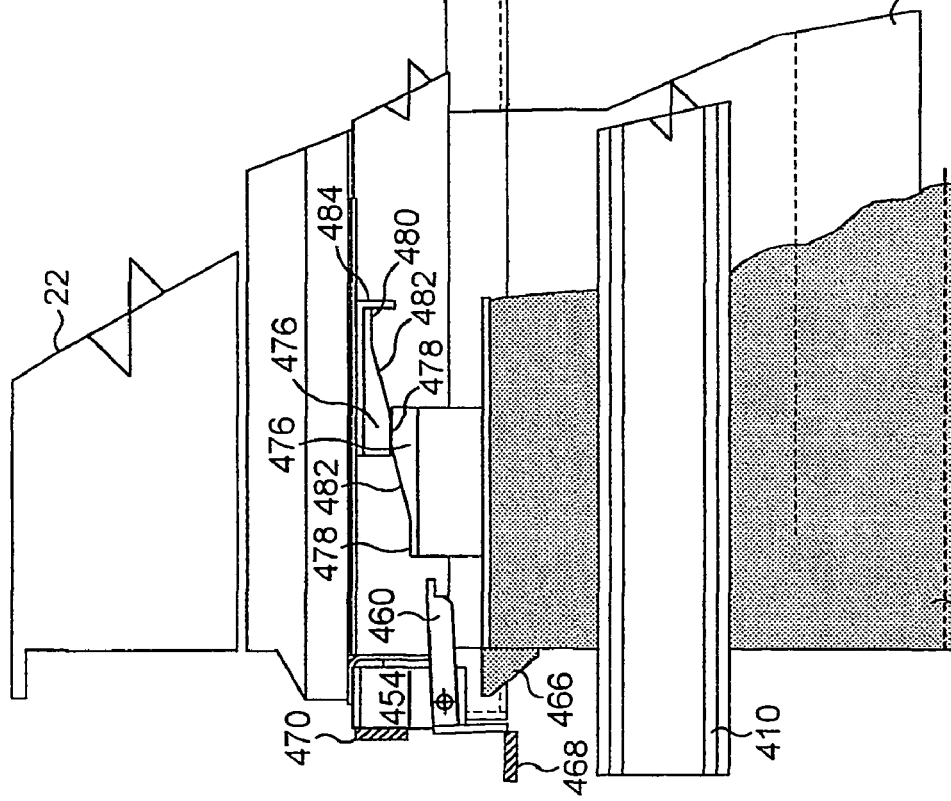

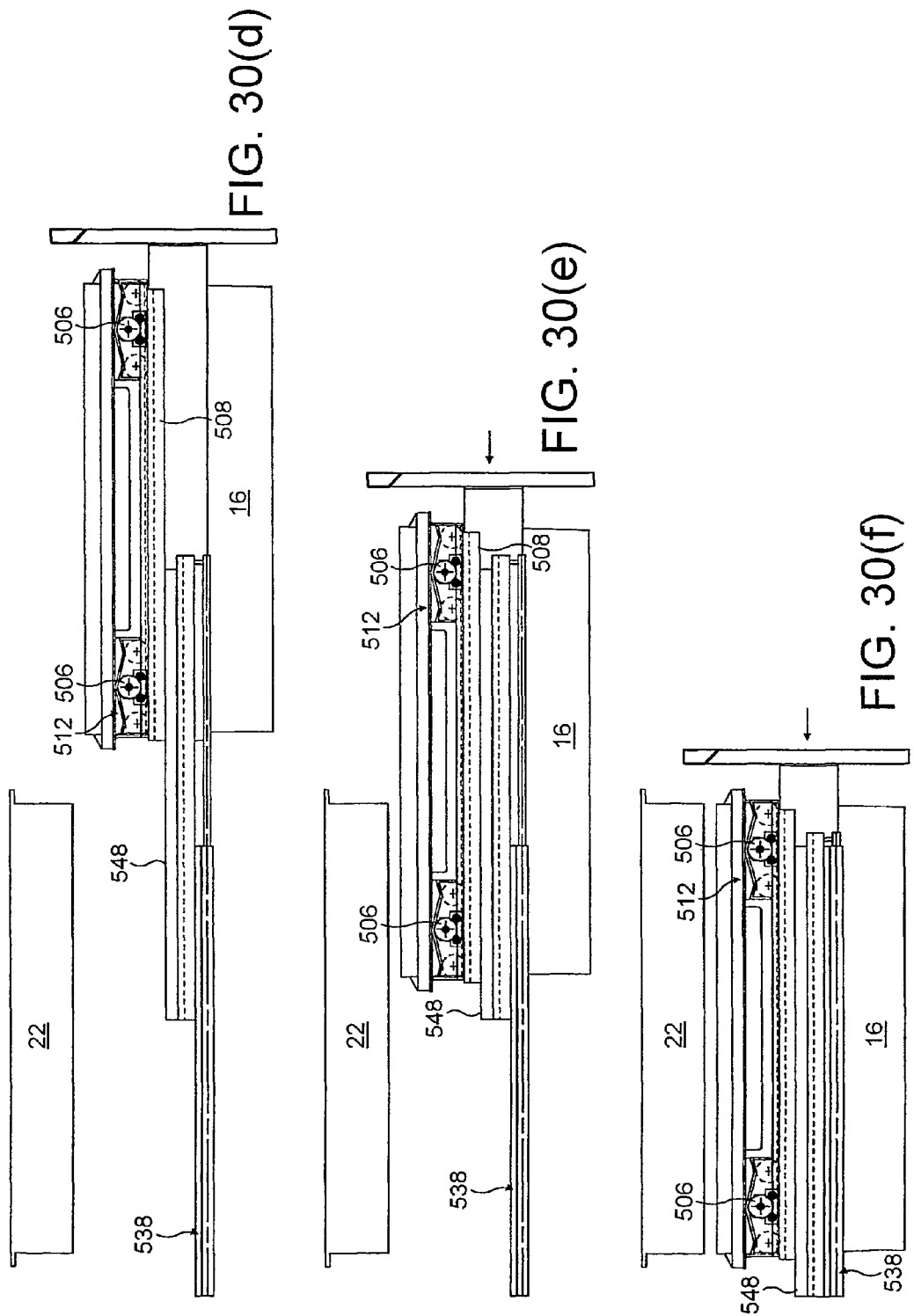

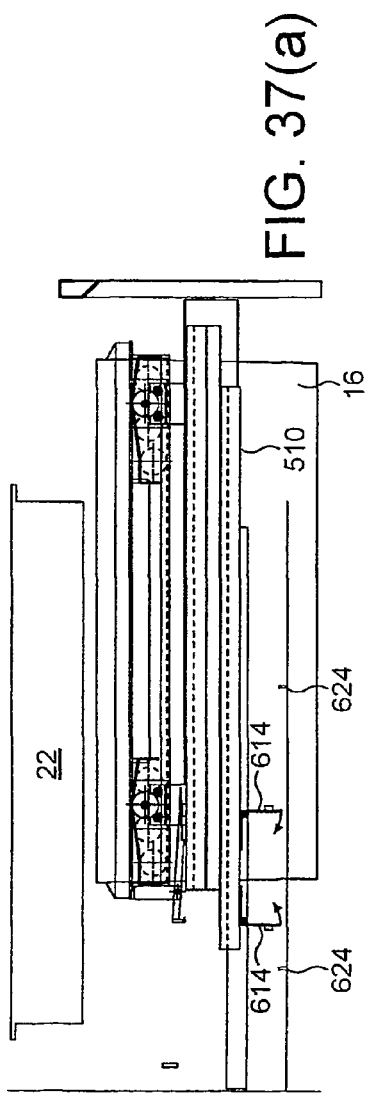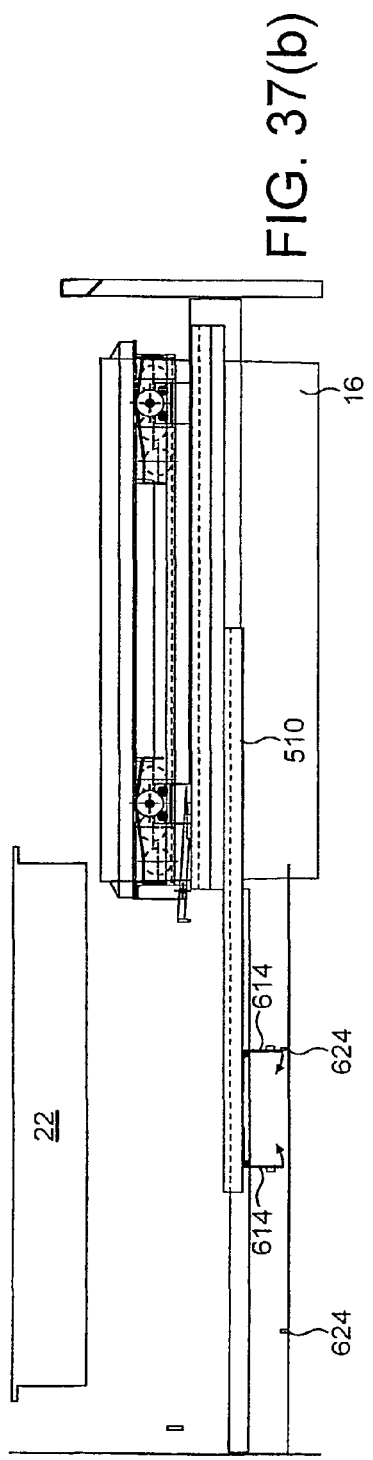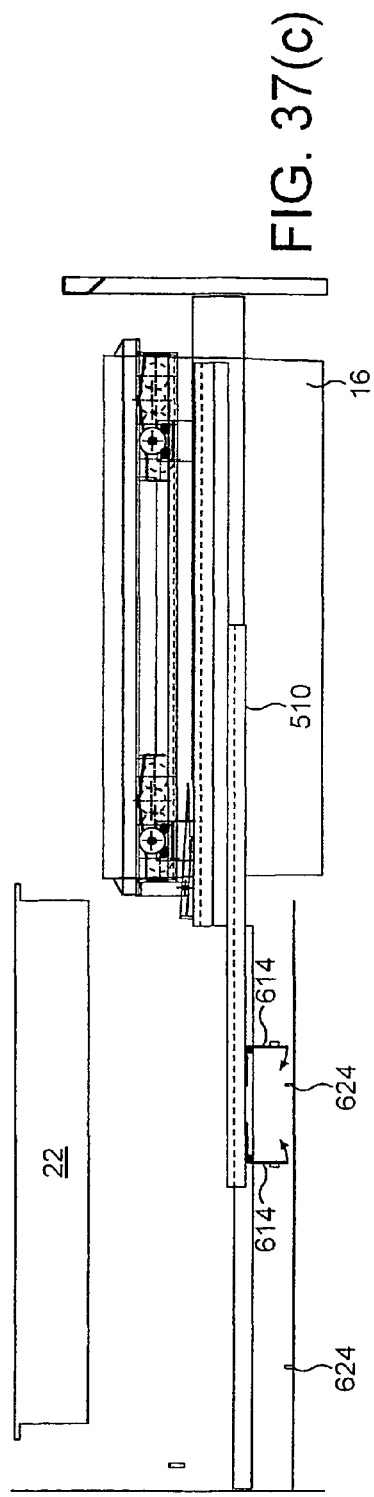

DRAWER STORAGE

BACKGROUND OF THE INVENTION

This invention relates to storage and in preferred embodiments relates to the art of cold storage, including appliances such as refrigerators and freezers for storing foodstuffs and other perishables. Other applications of the invention include storage of chemicals and medical or biological specimens. The invention also finds use in mobile applications, for example in the transport and storage of perishable goods. More generally, the invention finds use in any form of storage involving the use of drawers, and especially where the drawers carry heavy loads and need to be sealed when closed.

The invention develops and adds to the various features of the Inventor's co-pending International Patent Application No. PCT/GB00/03521 published as WO 01/20237, and co-pending U.S. patent application Ser. No. 10/070,896, the contents of which are incorporated herein by reference. The invention is also derived from UK Patent Application No. 0106164.7 published as GB 2367353, the content of which is also incorporated herein by reference and from which, inter alia, the present application claims priority. As in those specifications, the invention can be applied to storing any items within a cooled environment, such as in a refrigerated goods vehicle. The term 'appliance' is therefore to be construed broadly, extending beyond fixed domestic devices into industrial, scientific and mobile applications. However, this specification will particularly describe domestic or commercial cold-storage appliances for storing foodstuffs.

DESCRIPTION OF THE RELATED ART

Briefly to recap the introduction of WO 01/20237, the advantages of storing foodstuffs and other perishable items in refrigerated and segregated conditions have long been known: refrigeration retards the degradation of such items and segregation helps to prevent their cross-contamination. Accordingly, modem cold-storage appliances such as refrigerators and freezers are usually compartmentalised, albeit not often effectively, so that a user can store different types of food in different compartments. All such appliances have the additional aim of maximising their energy efficiency.

The invention herein and the inventions in WO 01/20237 and GB 2367353 were devised against a background of typical cold-storage appliances, most of which comprise one or more upright cabinets each with a vertically-sealed hinged door on its front. Substantially all of the interior of the cabinet defines a storage volume, most commonly partitioned by shelves or drawers for supporting stored foodstuffs. Access to all of the shelves or drawers in the cabinet is gained by opening the door.

A cooler unit generates a convection loop within the cabinet, in which air cooled by the cooler unit sinks toward the bottom of the cabinet and as that air absorbs heat during its downward journey, it warms and rises back up to the cooler unit where it is cooled again. It is also possible to have forced-air circulation by means of a fan within or communicating with the cabinet. The shelves or drawers are typically made of wire so that they offer little resistance to this circulation of air.

Upright refrigerators and freezers are often combined and sold as a single-cabinet 'fridge freezer' unit with a refrigerator occupying an upper compartment and the freezer occupying a lower compartment, or vice versa. As different temperatures are required for the two compartments, they are partitioned by a solid divide and each compartment has its own door and cooler unit, conventionally in the form of an evaporator.

The domestic fridge freezer usually has only one compressor and the refrigerator evaporator is in series with the freezer evaporator. In that case, temperature control and measurement is usually confined to the refrigerator compartment. Where temperature control is required in both compartments, the evaporators are in parallel and have respective solenoid valves and temperature switches providing on/off cooling mass control to each compartment. In either case, however, the temperature within the respective compartments cannot be duplicated: one compartment is for chilling, so it has less insulation than the other and its temperature can be adjusted within a range above zero Celsius, and the other is for freezing, so it has more insulation than the other and its temperature can be adjusted (if at all) within a range below zero Celsius. Neither compartment can do the job of the other.

WO 01/20237 addresses a major problem with upright refrigerators and freezers, namely the upright door which, when opened, allows cold air to flow freely out of the cabinet to be replaced by warm ambient air flowing in at the top. That rush of ambient air into the cabinet causes its internal temperature to rise, hence consuming more energy in redressing that rise by running the cooler unit. The incoming ambient air introduces the possibility of airborne contamination, and moisture in that air also gives rise to condensation and ice within the cabinet. The more often and frequently the cabinet is opened, as may happen especially in commercial cold storage appliances, the worse these problems get.

In upright-door arrangements, the limitations of the vertical seal mean that loss of cold air and induction of warm air can even occur when the door is closed. Being denser than warmer air, the coldest air collects at the bottom of the cabinet and applies pressure to the sealing interface so that unless the seal forms a perfect seal between the door and the cabinet, that air will escape.

The present invention and WO 01/20237 also address the problems inherent in the well-known chest freezer, whose open-topped cabinet is typically closed by a horizontally-hinged upwardly-opening lid. Such a chest freezer is inconvenient and wasteful of space because it precludes use of the space immediately above the freezer, which space must be preserved to allow its lid to be opened. Even if a sliding lid is used instead of an upwardly-opening lid, items cannot be left conveniently on top of the lid. It is also well known that large chest freezers can make access to their contents extremely difficult, it being necessary to stoop down and shift numerous heavy and painfully cold items to get to items at the bottom of the freezer compartment.

Finally, the present invention and WO 01/20237 address the problem of segregating different types of foodstuff or other perishable items to avoid cross-contamination. In typical cold-storage appliances, segregation of food is compromised by the convection and/or forced-air principles on which those appliances rely. The substantially open baskets or shelves designed to promote convective circulation of air between the compartments also promote the circulation of moisture, enzymes and harmful bacteria. In addition, any liquid that may spill or leak, such as juices running from uncooked meats, will not be contained by the open baskets or shelves.

Conventional cold-storage appliances exemplified by upright refrigerators and chest freezers are not the only prior art disclosures of interest. For example, it has been known for many years to divide a refrigerator into compartments, each with its own dedicated door or lid. Examples of this idea are disclosed in UK Patent Nos. GB 602,590, GB 581,121 and GB 579,071, all to Earle, that describe cabinet-like refrigerators.

In those Earle documents, the front of the cabinet is provided with a plurality of rectangular openings for receiving drawers. Each drawer has a front panel larger than its respective opening so that a vertical seal is formed around the overlap when the drawer is in a closed position. The drawers and their contents are cooled by a cooler unit that circulates cooled air by convection within the cabinet, in common with the types of refrigerator already described. To promote circulation of this air amongst all of the drawers, the drawers are open-topped and have apertures in their bottoms. Also, the drawers are disposed in a stepped arrangement, those at the top of the refrigerator extending back less far into the cabinet than the lower drawers so that the rear of each drawer is exposed to the downward flow of cooled air from the cooler unit.

Although only one drawer need be opened at a time, the apertures in the bottom allow cold air to flow freely from the open drawer, which is replaced by warm moist ambient air to the detriment of energy efficiency and with the increased possibility of cross-contamination. Indeed, when a drawer is opened, cold air within the cabinet above the level of that drawer will flood out, drawing ambient air into the cabinet. Furthermore, the drawers encourage ambient air to flow into the interior of the refrigerator because, upon opening, they act as pistons drawing the ambient air into the interior of the refrigerator cabinet. Once in the cabinet, the warm air can circulate as freely as the cold air that is supposed to be there.

Even when closed, the accumulation of cold air towards the bottom of the cabinet will exert increased pressure on the vertical seals of the lowest drawers, increasing the likelihood of leakage if the seal is faulty.

A further example of the above type of refrigerator is disclosed in UK Patent No. GB 602,329, also to Earle. The refrigerator disclosed therein suffers many of the above problems but is of greater interest in that a single drawer consisting of insulated sides and base is provided within the cooled interior of the cabinet. In contrast to the variants outlined above, the sides and base are solid and not perforated so that air cannot flow through them. When the drawer is closed, a horizontal member within the cabinet combines with the drawer to define a compartment, the horizontal member thus being a lid for the drawer. This compartment is provided with its own cooling coils situated just below the horizontal member.

Very little detail is given about the seal that is formed between the drawer and the horizontal member, other than that the horizontal member has a downwardly projecting rear end with a biased edge that makes a close fit with the rear wall of the drawer. Nothing else is said about the junction between the drawer and the horizontal member, apart from the general statement that the drawer is adapted when in its closed position to fit 'fairly snugly' against the horizontal member. It can only be inferred that the drawer and the horizontal member merely abut against each other. Whilst this will impede the passage of air into and out of the drawer, it will not form an impervious seal. As this is not a vapour seal, icing and cross-contamination is likely to occur even when the drawer is closed.

The drawer arrangement described creates a compartment in which a different temperature can be set when compared to the essentially common temperature of the rest of the refrigerator. It is particularly envisaged that the drawer can act as a freezer compartment. The Applicant has appreciated a disadvantage in this arrangement, namely that as the freezer drawer resides within the cooled interior when closed, the outer surfaces of the drawer within the cabinet will be cooled to the temperature of the refrigerator. Accordingly, when the drawer is opened, those cooled outer surfaces will be exposed to ambient air containing moisture that will condense on the cooled surfaces leading to an undesirable accumulation of moisture. Condensation involves transfer of latent heat from water vapour to the drawer, thus increasing the burden of cooling the drawer again when the drawer is returned to the closed position within the cabinet.

Additionally, condensed moisture will be transferred to the interior of the refrigerator when the drawer is closed. As discussed above, the presence of water promotes microbial activity. A further disadvantage of introducing water into the interior of the refrigerator is that it may freeze: this can be a particular problem where the drawer of the enclosed compartment meets the insulated top, as any ice formation will form a seal that locks the drawer in a permanently closed position. In fact, the of ice formation is due to moisture migration across the interface between the drawer and the top. This disadvantage was appreciated by Earle, as a cam mechanism is mentioned in GB 602,329 to break any ice formed at the seals or on the runners or other support surfaces of the drawers. It is also possible for a build-up of ice to affect the sealing ability of the seal, by preventing mating sealing surfaces from mating correctly. Of course, the accumulation of ice on moving parts of the drawer mechanism is also undesirable as it will impede movement of the drawer.

A further interesting prior art document, cited as technological background against WO 01/20237, is U.S. Pat. No. 1,337,696 to Ewen. Ewen speaks of segregation between refrigerated drawers contained in a surrounding cabinet and employs refrigerating units placed 'immediately and closely above each drawer . . . so that said drawer may in effect be said to be closed against said refrigerating unit'. However, there has to be a gap left between the drawer and the refrigerating unit if the drawer is going to open. As in Earle, that gap will promote icing as moist air within the cabinet migrates into the drawer and the water vapour condenses and freezes. The smaller the gap, the sooner the accumulating ice will prevent drawer movement. If a larger gap is tried instead, there will be a greater spillage of air and hence the refrigerator will be less energy-efficient and more susceptible to cross-contamination.

That aside, the spillage of cold air in Ewen lowers the temperature within the cabinet around the drawers, and so increases the likelihood of condensation on the drawers when opened. It will be noted that cold air spilled in this way can fall freely behind the drawers within the cabinet and so expose the exterior of the drawers to air substantially below ambient temperature. Certain design details of Ewen worsen this effect. For example, the bottom wall of the Ewen unit is an efficient insulator which will significantly reduce the surface temperature of the drawers. Also, the internal divisions between the drawers do not allow for ambient heat transfer to the drawers but only for heat transfer between the drawers, thus promoting drawer-to-drawer temperature equalisation over time. Left for long periods, or even overnight, large parts of the external surface of each drawer will fall to temperatures significantly below ambient dew point. Condensation or ice will therefore form on those surfaces as soon as the drawers are opened; similarly, if the drawers are removed and left outside the appliance, they will start to 'sweat' with condensation.

Like Earle, opening and closing a drawer within a sealed cabinet in Ewen acts like a piston, alternately applying both negative and positive pressures to adjacent areas. This promotes air transfer through the drawer opening at the front of the cabinet, which can displace cold treated air in a drawer, and within the cabinet itself. An over-sized cabinet would reduce the piston effect but would also be wasteful of space. Conversely, a more space-efficient close-fitting cabinet may decrease the displacement of cold treated air, and so reduce the burden of cooling the warmer air that takes its place, but it will increase resistance to opening and closing the drawer.

Cold air spillage aside, the gap inevitably left between a drawer and its associated lid in prior art arrangements is large enough to allow the passage of enzymes, spores and other airborne contaminants. Also, Ewen discloses a common interconnecting drain and this too would allow free transfer of contaminants between each drawer, particularly under the aforementioned piston action.

Whilst Ewen speaks of different temperatures in different drawers, the plurality of cooling lids are connected in series and have no means for individual temperature control in each drawer. The different temperatures are designed-in by providing some drawers with more cooling elements than others, but there is no measurement or control of those temperatures in use. Also, like the compartments of more conventional prior art, each drawer in Ewen has a fixed function, namely freezer or refrigerator.

Even if removed from the appliance, Ewen's drawers will stay attached to their drawer fronts and runners. This does not lend the drawers to temporary storage or transport. Moreover, like Earle, the drawers in Ewen cannot be opened fully: they can only be opened less than half-way while being supported by the structure of the appliance. This is to the detriment of access to, and visibility and illumination of, the contents.

It is against this background that the present invention has been devised.

SUMMARY OF THE INVENTION

From one aspect, the invention resides in a cold-storage appliance including: an open-topped insulating container defining an external surface; an insulating lid adapted to close the open top of the container; a cooling means adapted to cool the interior of the container; and a structure supporting the container, the lid and the cooling means; wherein the container is mounted to the structure for movement relative to the structure and the lid to open the container and afford access to its interior or to close the container, and wherein the lid is mounted to the structure for movement relative to the structure and the container to free the container from the lid upon opening or to bring the container and the lid together upon closing.

Thus, in this aspect of the invention, the lid moves to free the container for movement. In a simple arrangement that will be described, the lid can be tilted relative to the structure and the container. For example, the lid can be hinged to the structure, the hinge preferably defining a pivot axis horizontally spaced from the container so that the lid is lifted fully away from the container. More generally, it is preferred that the lid is movable transverse to the direction of movement of the container.

Beneficially, lid transport means are responsive to movement of the container or of a support means movable to support the container during said movement. The lid transport means can move the lid before the container starts moving upon opening and after the container has stopped moving upon closing. In that case, where a support means is movable to support the container during said movement, the lid transport means is preferably between the support means and the lid and responds to movement of the support means to move the lid.

The support means can be movable independently of the container, in which case the lid transport means can be responsive to relative movement between the support means and the container and more particularly to continued movement of the support means after movement of the container has ceased.

In an alternative arrangement, the lid transport means moves the lid during initial movement of the container upon opening and during final movement of the container upon closing.

The invention also resides in a cold-storage appliance including: an open-topped insulating container defining an external surface; an insulating lid adapted to close the open top of the container; a cooling means adapted to cool the interior of the container; and a structure supporting the container, the lid and the cooling means; wherein the container is mounted to the structure for movement relative to the structure and the lid to open the container and afford access to its interior or to close the container, and wherein said movement of the container includes: a major component to open the container and afford access to its interior or to close the container; and a minor component, transverse to the major component, to free the container from the lid at the beginning of said major component upon opening or to bring the container and the lid together at the end of said major component upon closing.

In this aspect of the invention, the two-component movement of the container serves to clear the container from the lid. To avoid a wiping action on seals between the container and the lid, it is preferred that the minor component takes place before the major component upon opening and after the major component upon closing. However, it is also possible for the minor component to take place during initial movement in the direction of the major component upon opening and during final movement in the direction of the major component upon closing.

In this aspect, it is preferred that a support means is movable to support the container during the major component and that container transport means is disposed between the support means and the container to responds to movement of the support means to effect the minor component. Where the support means is movable independently of the container, the container transport means can be responsive to relative movement between the support means and the container. For instance, the container transport means is preferably responsive to continued movement of the support means after the major component of movement of the container has been completed.

The container transport means suitably includes a first part in fixed relation to the support means and a second part in fixed relation to the container, wherein relative movement between the parts accommodates said continued movement of the support means. In this case, relative movement between the parts causes the minor component of movement of the container. For example, one part can include a ramp and the other part can include a ramp follower, such as a wheel. The ramp may further be associated with stops or buffers to limit relative movement of the ramp follower.

Advantageously, the support means may also be fixed to a stabilising mechanism to resist lateral sway of the container during the major component of movement. That stabilising mechanism preferably includes pinions movable with the support means, the pinions being engaged with respective laterally-spaced racks extending in the direction of the major component.

BRIEF DESCRIPTION OF THE DRAWINGS

In order that the present invention can be more readily understood, reference will now be made, by way of example only, to the accompanying drawings in which:

FIGS. 6(a) and 6(b) are partial sectional side views of an appliance in accordance with the invention, FIG. 6(a) showing a drawer closed with its bin sealed to a lid, and FIG. 6(b) showing (in solid lines) the drawer partially open with the bin dropped vertically away from the lid, and then (in dashed lines) fully open with the bin slid horizontally forward to afford access to its interior;

FIGS. 17(a), 17(b) and 17(c) are part-sectional side, front and enlarged front views respectively of a further bin transport mechanism, FIG. 17(a) being on line Y—Y of FIG. 17(b) and FIGS. 17(b) and 17(c) being on line X—X of FIG. 17(a);

FIGS. 18(a), 18(b) and 18(c) are part-sectional detail views of a wheel bracket attached to a transport plate, FIG. 18(a) being a section on line X—X of FIG. 18(b), FIG. 18(b) being a section on line Y—Y of FIG. 18(c), and FIG. 18(c) being a plan view;

FIG. 19 is a side view of a transport plate fitted with wheel brackets as shown in FIGS. 18(a), 18(b) and 18(c);

FIG. 20 is a side view of a bin support frame for use with the transport plate of FIG. 19;

FIG. 21 is a schematic detail side view of a wheel housing component being attached to the bin support frame of FIG. 20;

FIGS. 22(a), 22(b), 22(c) and 22(d) are partial sectional side views showing the operation of the bin transport mechanism of FIGS. 17(a), 17(b) and 17(c), FIG. 22(a) showing the bin sealed and the weight of the bin being carried on wheels, FIG. 22(b) showing the bin released from its seals but with the weight of the bin still being carried on wheels, FIG. 22(c) showing engagement of a bin support frame and transport plate, and FIG. 22(d) showing load transfer to the transport plate such that the weight of the bin is carried on runners as the bin undergoes a horizontal opening movement;

FIGS. 24(a), 24(b) and 24(c) are partial sectional side views showing the operation of the bin transport mechanism of FIGS. 23(a) and 23(b), FIG. 24(a) showing the bin sealed, FIG. 24(b) showing the bin released from its seals and FIG. 24(c) showing engagement of a bin support frame and transport plate as the bin undergoes a horizontal opening movement;

FIGS. 30(a) to 30(f) are a sequence of partial sectional side views showing the operation of the bin transport mechanism of FIGS. 25 to 29;

FIGS. 37(a) to 37(f) are a sequence of sectional side views showing the operation of a bin transport mechanism including restraining mechanisms shown in FIGS. 34, 35 and 36.

DETAILED DESCRIPTION OF THE INVENTION

Figure 1:
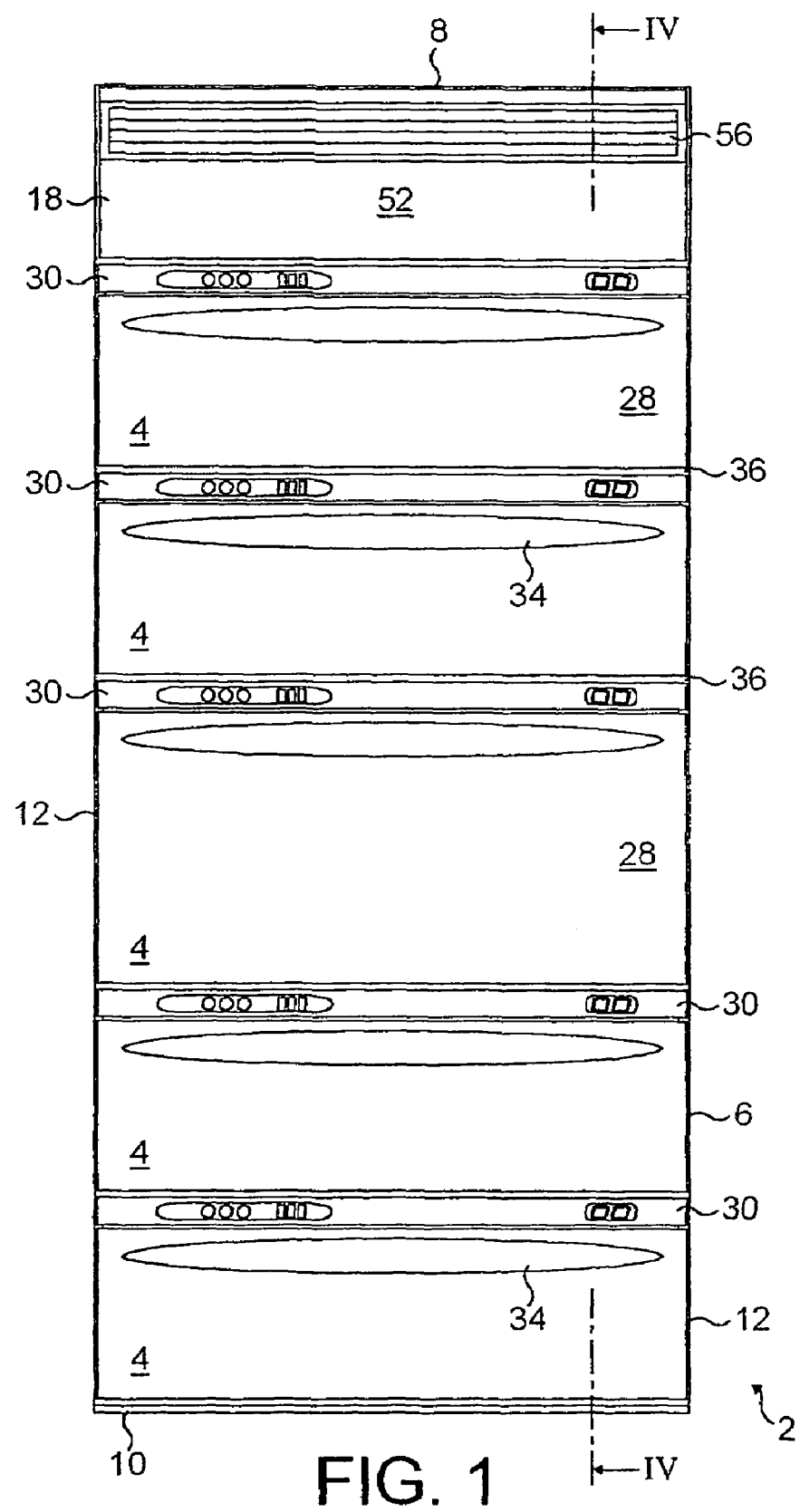
FIG. 1 is a front view of a refrigerator/freezer appliance as disclosed in the Applicant's referenced co-pending International and U.S. patent applications, showing a vertical array of drawers each including a bin.

Whilst the disclosure of the Applicant's co-pending International Patent Application No. PCT/GB00/03521 (WO 01/20237) and U.S. patent application Ser. No. 10/070,896 are incorporated herein by reference, FIGS. 1 to 4 thereof are reproduced in the drawings appended to this specification and will now be described to help put the present invention into context.

FIGS. 1 to 4 show a refrigerator/freezer appliance 2 according to Applicant's referenced International and U.S. patent applications. The appliance 2 is of upright cuboidal configuration, and comprises five rectangular-fronted drawers 4 arranged one above another and housed in a cabinet 6 comprising top 8, bottom 10, side 12 and rear 14 panels. Any of these panels can be omitted if it is desired to build the appliance 2 into a gap between other supporting structures; in particular, the side panels 12 can be omitted if neighbouring cupboards can be relied upon for support or otherwise to perform the function of the side panels 12. The panels 8,10,12,14 may or may not be structural but if they are not, a frame (not shown) provides support for the various parts of the appliance. If a frame is provided, it is structurally unnecessary to have panels.

Figure 2:
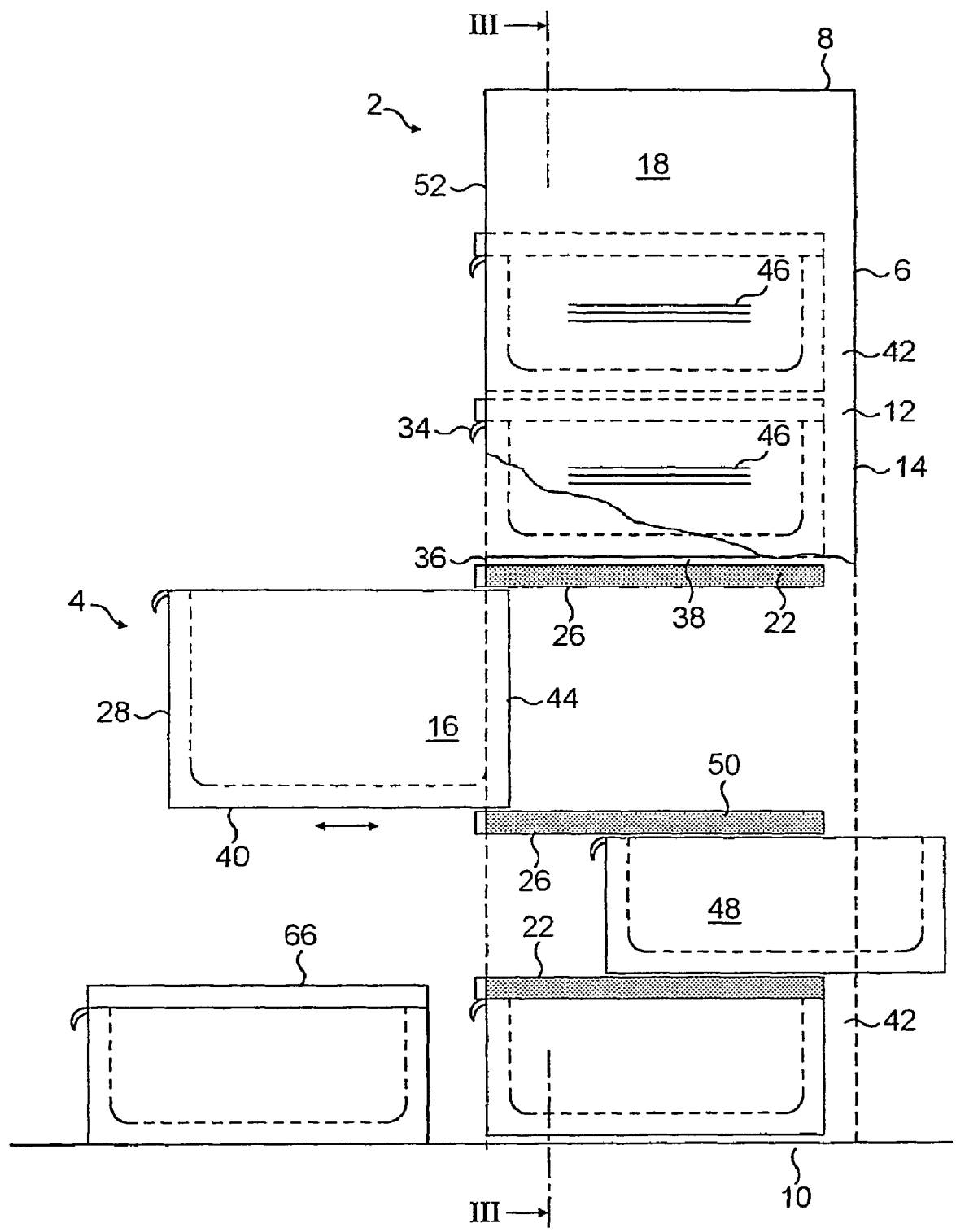
FIG. 2 is a side view of the appliance of FIG. 1, with a lower portion of a side panel removed so that the sides of the drawers can be seen.

The drawers 4 can be slid horizontally into and out of the cabinet 6 by means of tracks or runners on the sides of the drawers 4 that will be described in more detail below. If there is no back panel 14, it is theoretically possible for a drawer 4 to be removed from the cabinet 6 in more than one direction, as shown in FIG. 2.

Each drawer 4 comprises an insulated open-topped bucket-like container 16, at least one container 16 (in this case, that of the central drawer 4) being of a different depth to the other containers 16 to define a different internal volume. These containers 16 will be referred to in this specific description as storage bins or more simply as bins 16. The bottom bin 16 leaves only a narrow gap to the bottom panel 10 of the cabinet 6, whereas the top bin 16 leaves a substantial space at the top of the appliance 2 under the top panel 8, allowing room for a compartment 18 that accommodates a refrigerator engine 20, for example including condenser and compressor means as is well known.

The relatively deep bin 16 of central drawer 4 is intended to hold bottles and other relatively tall items stored upright, whereas the other, relatively shallow bins 16 are for correspondingly shallower items. Compared to the shelves and other compartments defining the main storage volume of a conventional upright cold-storage appliance, all of the bins 16 have a favourable aspect ratio in terms of the substantial width of the access opening compared to the depth of the compartment thereby accessed. It is therefore very easy to reach every part of the interior of a bin 16 when a drawer 4 is opened, The interior of the cabinet 6 is divided by five insulated lids 22, one for each drawer 4, that are generally planar and horizontally disposed. When a drawer 4 is closed, the open top of its associated bin 16 is closed by an appropriate one of the lids 22 in a manner to be described. The lids 22 include cooling means 24 being evaporator elements of known type disposed in the lower face 26 of each lid 22 to cool the contents of a bin 16 closed by that lid 22.

Each bin 16 has a generally flat front face 28 that is exposed when the drawer 4 is closed. The front face 28 could be provided with a decorative panel as is well known. When the drawer 4 is closed, the front face 28 of the bin 16 is bordered at the top by a control and display panel 30 dedicated to that bin 16, the panel 30 being co-planar with the front face 28. The panel 30 is supported by the front edge 32 of the appropriate lid 22, the panel 30 being recessed into the front edge 32 of the lid 22.

The control and display panel 30 contains a number of displays, switches and audible alarms, thus providing a user interface for each bin 16. For example, the interface will most commonly be used for selecting the temperature to which the bin 16 is to be cooled, but also contains temperature displays, on/off and fast-freeze switches, a light indicating when the drawer 4 is open and an audible alarm to indicate when the drawer 4 has been open longer than a predetermined time or when the temperature inside the bin 16 has reached an upper or lower threshold.

A rounded handle 34 extends across substantially the entire width of the top portion of the front face 28 to enable the drawer 4 to be pulled out when access to the interior of the bin 16 is required.

The bottom of the front face 28 of each bin 16 is bordered by a slot 36 that, as will be described, admits ambient air into the cabinet 6. To do so, each slot 36 communicates with an air gap 38 extending beneath the entire bottom face 40 of the associated bin 16 to meet a void 42 maintained behind each bin 16, the void 42 being defined by the inner surfaces of the back 14 and side 12 panels of the cabinet 6 and the backs 44 of the bins 16. As can be seen particularly from FIG. 4, the void 42 extends behind each bin 16 from the base panel 10 of the cabinet 6 to communicate with the refrigerator engine compartment 18 at the top of the cabinet 6.

Figure 3:
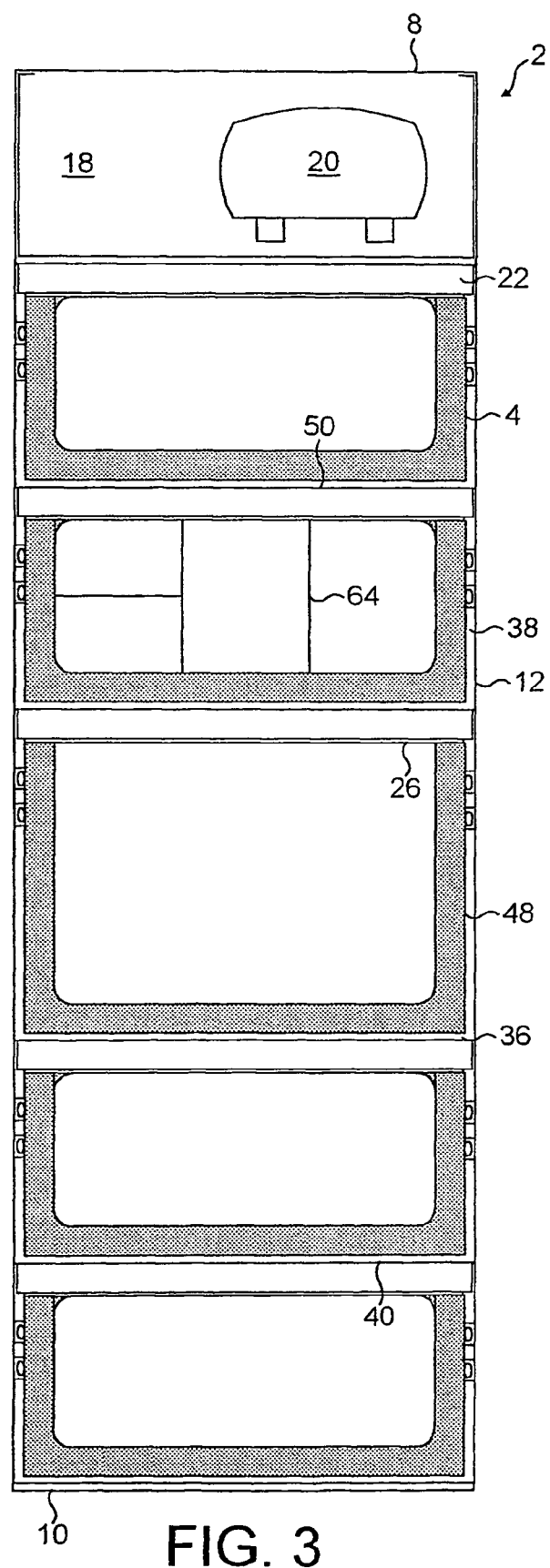
FIG. 3 is a section along line III—III of FIG. 2 but with the drawers closed.
Figure 4:
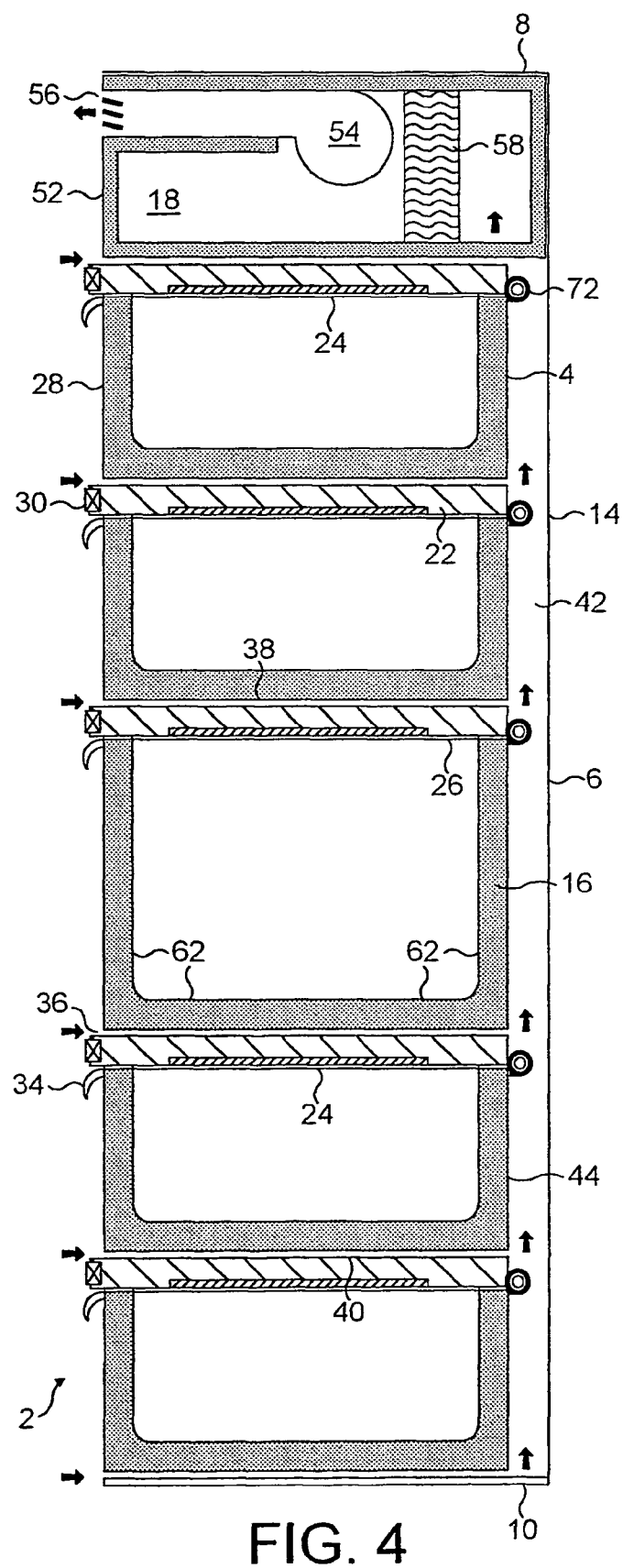
FIG. 4 is a section along line IV—IV of FIG. 1.

The air gaps 38 beneath the bins 16 and the void 42 behind the bins 16 also communicate with air gaps 38 to the sides 48 of the bins 16. Optionally, vents 46 are provided in the side panels 12 of the cabinet 6 adjacent to the bins 16 through which ambient air can also be admitted. As best illustrated in FIGS. 3 and 4, air gaps 38 extend around all bar the top side of each bin 16, so that ambient air entering the cabinet 6 through the slots 36 can circulate freely around the sides 48, bottom 40 and rear 44 of each bin 16. It will also be noted that ambient air can circulate freely over the top surface 50 of each lid 22. To allow this airflow over the uppermost lid 22, which does not have a bin 16 above, a slot 36 is provided under the front face 52 of the refrigerator engine compartment 18.

It will be noted that the piston action created by opening a drawer 4 that sucks ambient air into the interior of the appliance 2 does not pose a problem in this invention. In fact, this action is advantageous as it promotes circulation of ambient air within the cabinet 6.

FIG. 4 shows that the refrigerator engine compartment 18 includes an impeller 54 exhausting through apertures 56 provided in the front face 52 of the refrigerator engine compartment 18. As best seen in FIG. 1, these apertures 56 extend horizontally across the width of the front face 52. The impeller 54 communicates with the void 42 behind the bins 16 to draw air from the void 42, thus continuously promoting the induction of ambient air through the slots 36 and the optional side vents 46. Upon entering the refrigerator engine compartment 18, this air is drawn through the heat-exchange matrix 58 of the condenser.

Accordingly, ambient air entering the cabinet 6 through the front slots 36 and, if provided, the side vents 46, leaves the cabinet 6 through the apertures 56 provided in the front face 52 of the refrigerator engine compartment 18, and so ambient air is circulated through the cabinet 6. More specifically, ambient air enters the appliance 2 where it immediately comes into contact with the outer surfaces 40, 44, 48 of the bins 16 and warms them to ambient temperature (or substantially so, as a surface resistance effect means that a sub-ambient boundary layer will remain due to the temperature gradient across the thickness of the bin wall) before being drawn towards the void 42 and then upwards through the void 42 by the circulation of the air. The arrows of FIG. 4 demonstrate this circulation of air through the appliance 2. Accordingly, the interior of the cabinet 6 is kept close to ambient temperature, and only the interior of each bin 16 is cooled.

By exposing the external surfaces 28, 40, 44, 48 of the bin 16 to warmer air than it contains, there is no problem with condensation on the external surfaces 28, 40, 44, 48, and hence no problem with latent heat transfer to the bin 16 or the icing and cross-contamination difficulties of condensed water entering the cabinet 6.

In any event, cross-contamination would be unlikely to occur because each bin 16 is tightly sealed when its drawer 4 is closed. So, even if microbes enter the cabinet 6, they cannot readily gain access to other bins 16. It is also unlikely that two bins 16 would be open together at any given time. It would be possible to include means for enforcing this, for example using a mechanism akin to that used in filing cabinets for anti-tilt purposes, by preventing more than one drawer 4 being opened at a time. Such a mechanism will be described later.

When a bin 16 is open, its open top does not suffer much spillage of cold air, and when a bin 16 is closed, the horizontal seals 60 apt to be used in the invention are inherently better at sealing-in cold air than the vertical seals commonly used in upright refrigerators and freezers. Whilst horizontal seals are known in chest freezers, this invention does not suffer the inconvenience and space problems of chest freezers, instead being akin in those respects to the much more popular upright appliances. The seals 60 can have magnetic qualities, for example being operable by permanent magnets or electromagnets, or may employ hydraulics or pneumatics to expand or contract them.

As there has to be a large temperature gradient between the cooled inner surfaces 62 of each bin 16 and its outer surfaces 28, 40, 44, 48, the bins 16 are constructed from an efficient insulating material so that the gradient is easily maintained with the outer surfaces 28, 40, 44, 48 remaining close to the ambient temperature. Materials such as phenolic foam or polyurethane foam (optionally skinned with GRP or a polycarbonate in a composite structure) are particularly preferred for the construction of the bins 16.

If segregation of the contents of a particular bin 16 is required, that bin 16 may be fitted with removable inserts 64. The inserts 64 are of varying shape and dimensions and may be used to define many types of compartments. For instance, an insert 64 may be a thin partition with a length corresponding to the length or width of the bin 16 in which it is received. An insert 64 may be a box, with or without a lid, or an insert 64 may include clips for holding bottles in place or trays for holding eggs or the like. An insert 64 could also be a wire basket or shelf.

As can be seen in FIG. 2, one or more of the bins 16 can be removed from the appliance 2 and fitted with an insulated transport cover 66. The bin 16 may then be taken away from the appliance 2, its insulated construction ensuring that it keeps its contents cool for a limited period of time. For instance, the bin 16 may be used as a cool-box, possibly in conjunction with ice-packs to keep the interior cool for as long as possible. Alternatively, the bin 16 with transport cover 66 may be kept close to the appliance 2 to provide added temporary cooled storage capacity, further bins 16 being fitted to the appliance 2 in that event. Further details of transport cover arrangements will be given later.

It is also possible for a transport cover 66 to include a refrigerator engine powered internally by batteries or a gas supply or externally by mains electricity or a vehicle electricity supply.

Although not shown in the general views of FIGS. 1 to 4, the Applicant's referenced co-pending International and U.S. patent applications discloses ways in which a bin 16 can be moved with a major horizontal component of movement to gain access to the interior of the bin 16 and, during that access movement, also with a minor vertical component of movement to clear the lid 22. In subsequent development, the Inventor has devised other ways of clearing the lid 22 and gaining access to the bin 16. The Inventor has also devised other technical changes and improvements to the referenced co-pending applications. That new matter will now be described with reference to the remaining Figures, in which the aforesaid reference numerals are used for like parts where possible.

Figure 5:
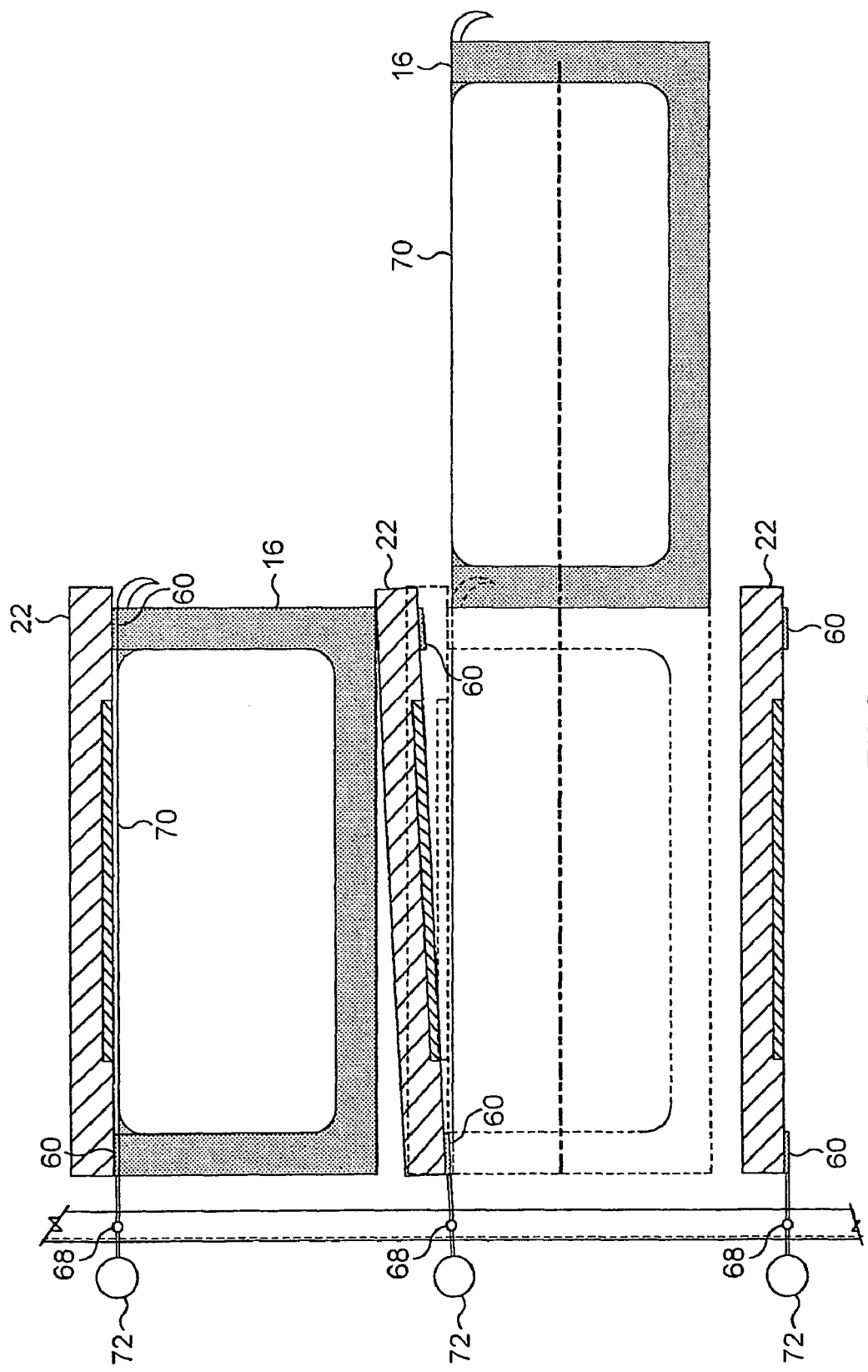
FIG. 5 is an enlarged schematic sectional side view of two drawers of an appliance of the invention in which a lid is movable with respect to the structure to separate the lid from a bin, thereby allowing the bin to be moved subsequently in a single opening direction.

In FIG. 5, for example, the lid 22 is movable with respect to the structure to separate the lid 22 from the bin 16, thereby allowing the bin 16 to be moved subsequently in a single opening direction parallel to the general plane of the closed lid 22, i.e. having only a horizontal component of movement in the embodiment shown. In the very simple example shown in FIG. 5, the lid 22 is attached to the structure behind the rear edge of the lid 22 by horizontal hinges 68 that enable the lid 22 to be pivoted upwardly at its front edge to an extent limited by the bin 16 above. This upward movement of the lid 22 lifts compressible magnetic seals 60 off the top edge 70 of the bin 16 and is sufficient to free the bin 16 to be slid horizontally on simple runners, with no need for the cranks, rollers, ramps and so on that are variously described in WO 01/20237 to effect vertical movement of the bin 16 upon opening and closing. The raised lid 22 is held up by a counterbalance weight 72 or a spring compensation device that biases the lid 22 into the raised position ready for the return of the bin 16 and optionally also into the lowered position atop the bin 16 when the bin 16 has been returned and the lid 22 has been lowered back onto the top edge 70 of the bin 16.

It will be appreciated that the position of the hinges 68 behind the rear edge of the bin 16 ensures that the rearmost seals 60 are lifted clear of the bin 16 or that their pressure upon the top edge 70 of the bin 16 is at least reduced to the extent necessary to free the bin 16 for horizontal movement.

It is emphasised that the simple arrangement of FIG. 5 is shown merely to illustrate the concept of a moving lid 22 and that other ways of raising a lid 22 can clearly be devised. For example, an arrangement of solenoids, actuators, cams or cranks can be used to raise the entire lid 22 into a raised position that is generally parallel to its lowered position. It is also possible to retract the seals 60 upwardly into the lid 22 or downwardly into the bin 16 so as to free the bin 16 for movement.

Movement of the lid 22 can also be linked to the movement of the associated bin 16 or of a movable support for that bin 16, so that initial opening movement of the bin 16 or its support causes the lid 22 to move apart from the bin 16 and, vice-versa, at or toward the end of a closing movement of the bin 16 or its support.

In another way of clearing the lid 22 and gaining access to the bin 16, the Inventor has realised the potential benefit of separating horizontal and vertical movement of the bin 16. Put more specifically, the Inventor sees benefit in ensuring that when the bin 16 and the lid 22 come into contact with each other, that contact does not involve a sliding or wiping motion which otherwise could cause the seals 60 to wear and deteriorate over long periods of frequent use. Such a sliding or wiping motion across the seals 60 should also be avoided when the bin 16 and the lid 22 are pulled apart. The movable-lid variant of FIG. 5 has this benefit, as does the fixed-lid variant of FIGS. 6(*a*) and 6(*b*) which will now be described.

In FIG. 6(*a*), a drawer 4 in accordance with the invention is closed with its bin 16 sealed to the associated lid 22 by being raised against the lid 22 to compress a peripheral horizontal seal 60. FIG. 6(*b*) shows the same drawer 4 in two further positions. In solid lines, to the left in FIG. 6(*b*), the drawer 4 is partially open in that the bin 16 has dropped vertically away from the lid 22 to clear the seal 60, but the bin 16 has not moved horizontally. In dashed lines, to the right in FIG. 6(*b*), the drawer 4 is fully open: the bin 16 has been moved horizontally on telescopic runners 74 to afford access to its interior.

Figure 7:
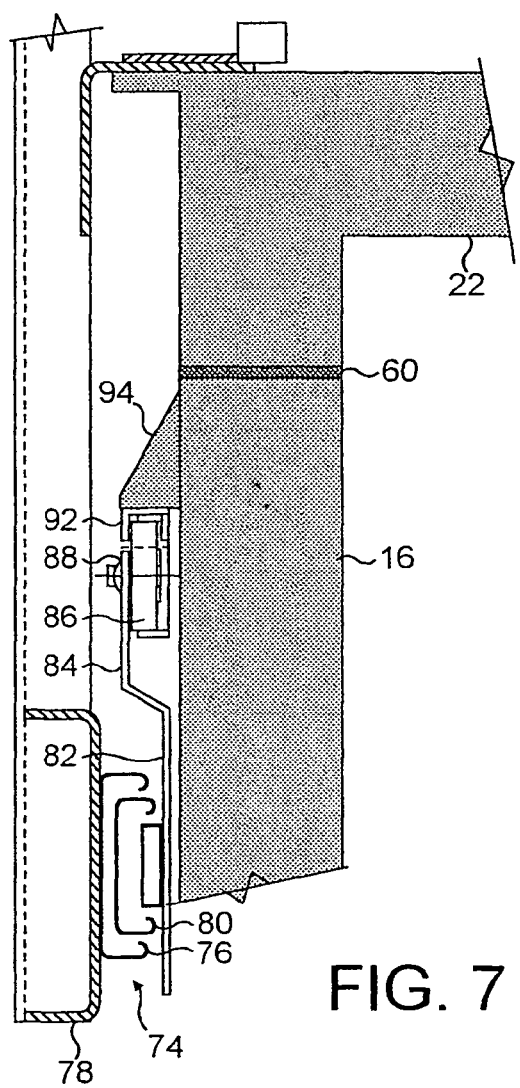
FIG. 7 is a front part-sectional detail view of a bin transport mechanism being part of the appliance of FIGS. 6(a) and 6(b)

The telescopic runners 74 are of two- or three-piece construction, as FIG. 7 also shows. An outer rail 76 is attached to the adjacent side panel 78 of the cabinet and so remains stationary in use, whilst one or more inner rails 80 travel forward and back as the drawer 4 is opened and closed. As the rails 76, 80 reside within the interior of the cabinet that remains at or near to the ambient temperature, there is no problem of ice formation that could jam the sliding movement of the rails 76, 80.

FIGS. 6(*a*) and 6(*b*) show a bin transport mechanism associated with the telescopic runners. That mechanism is also shown in FIG. 7 in a front part-sectional detail view. Specifically, the bin transport mechanism on each side of the bin 16 comprises a transport plate 82 fixed to the respective telescopic runner. As can be appreciated in FIG. 7, the transport plate 82 lies generally vertically beside the bin 16 and its vertical upper portion 84 is folded away from the bin 16 to define a recess between itself and the bin 16. That recess accommodates a pair of vertically-oriented movement transfer wheels 86 that are rotatably attached by horizontal spindles 88 to the upper portion 84. FIGS. 6(*a*) and 6(*b*) show that the pair of movement transfer wheels 86 are disposed one forward, one rearward on each transport plate 82 to each side of the bin 16.

Figure 8:
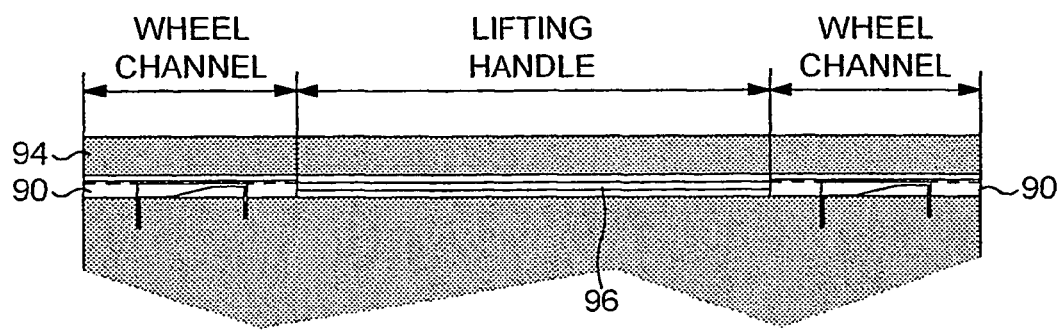
FIG. 8 is a partial side view of a bin being part of the appliance of FIGS. 6(a), 6(b) and 7.

Each movement transfer wheel 86 is received by and constrained to move m a respective wheel housing 90. Each wheel housing 90 comprises a wheel channel 92 being an inverted U-section that opens downwardly to receive an upper portion of each movement transfer wheel 86 and to constrain that wheel 86 against sideways movement. The base of the U-section bears against and supports a horizontal shoulder surface under an overhanging flange 94 that is integral with the wall of the bin 16. As can be seen in FIG. 8, the wheel channels are under respective opposed ends of the flange 94 and are linked by a length of flat bar 96 that also lies under the flange 94. The central portion of the flange 94 between the wheel housings 90 overhangs that bar 96 to define a convenient lifting handle for use when the bin 16 is removed from the appliance 2.

Each movement transfer wheel 86 can move forwardly and rearwardly within its associated wheel housing 90 to a limited extent with respect to the bin 16. Accordingly, each wheel housing 90 has formations associated with the wheel channel that constrain and control the movement of the respective movement transfer wheel with respect to the bin 16. Those formations are best shown in the detail view of FIG. 9 of the drawings.

Firstly, forward and rearward movement of the movement transfer wheel with respect to the bin 16 is limited by forward and rearward buffers 98, 100 respectively. Each buffer 98, 100 defines a respective rest position for the movement transfer wheel 96 so that when the movement transfer wheel 96 is against the forward buffer 98, the wheel 96 is at a forward rest position and when the wheel 96 is against the rearward buffer 100, the wheel 96 is at a rearward rest position.

Figure 9:
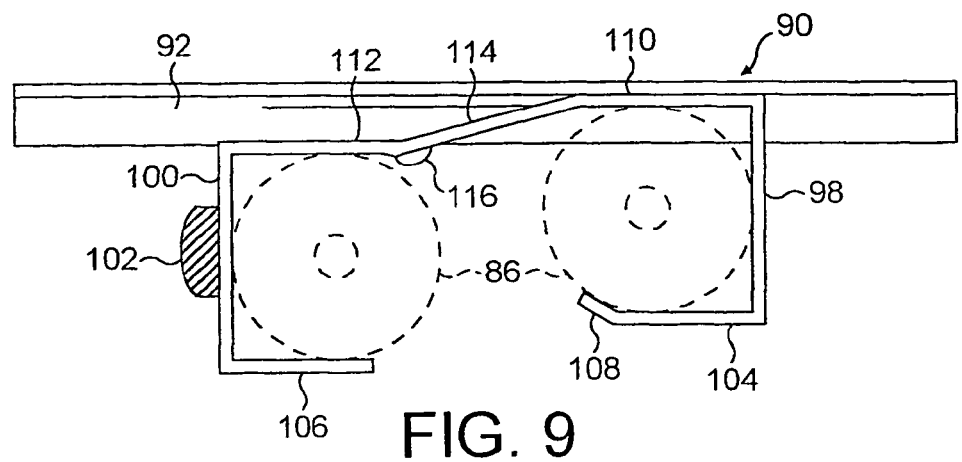
FIG. 9 is detail side view of a wheel housing shown in FIGS. 6(a), 6(b) and 7.

Conveniently, the rearward buffer 100 of a rearward wheel housing 90 has a resilient backstop 102 on its rearward surface as shown in FIG. 9, that bears against a suitable fixed barrier (not shown) to limit the rearward travel of the bin 16.

Secondly, restraining fingers 104, 106 extend from the buffers 98, 100 substantially parallel to the base of the wheel channel 92. The fingers 104, 106, the buffers 98, 100 and the wheel channel 92 define pockets that can receive the movement transfer wheel 86 at the respective rest positions and the resilient fingers 104, 106 prevent that wheel moving away from the wheel channel when at either of those positions. Specifically, a forward restraining finger 104 extends rearwardly from the forward buffer 98 and a rearward restraining finger 106 extends forwardly from the rearward buffer 100. The forward restraining finger 104 has the additional feature of a free end portion 108 bent toward the wheel channel 92 to define an opening narrower than the diameter of the associated movement transfer wheel 86. The forward restraining finger 104 is resiliently flexible to allow the movement transfer wheel 86 to pass through the opening into the forward rest position, where the wheel 86 is then engaged and held by the resilience of the forward restraining finger 104. Moving the movement transfer wheel 86 back out of the forward rest position is only possible upon overcoming the resilience of the forward restraining finger 104.

Thirdly, a track connects the buffer plates 98, 100 to define a running surface for the movement transfer wheel 86. The track has flat end portion 442*s* 110, 112 parallel to the base of the wheel channel 92, namely a forward end portion 110 attached to the base of the wheel channel 92 and a rearward end portion 112 spaced from the base of the wheel channel 92. Those end portions 110, 112 coincide with the forward and rearward rest positions of the movement transfer wheel 86 and are connected by a ramp 114.

A resilient stud 116 at the junction between the rearward end portion 112 and the ramp 114 creates an obstacle that must be overcome if the movement transfer wheel 86 is to move out of its rearward rest position and then forwardly along the ramp 114. This stud 116 therefore helps to keep the movement transfer wheel 86 in its rearward rest position at which the drawer 4 is closed and the bin 16 is sealed to the lid 22. Also, the feel of the drawer movement as the movement transfer wheel 86 over-rides the stud 116 gives the user a positive indication of when the drawer 4 and the bin 16 have reached their closed and sealed states.

Elegantly, the buffers 98, 100, the track 110, 112, 114 and the restraining fingers 104, 106 are folded or fabricated in a single component that it simply fixed within the base and side walls of the wheel channel 92, as shown in FIG. 9. The wheel channel 92 spreads the loads applied to the track 110, 112, 114, buffers 98, 100 and restraining fingers 104, 106 in use, and applies those loads to the bin 16 via the flange 94.

Figure 10A:
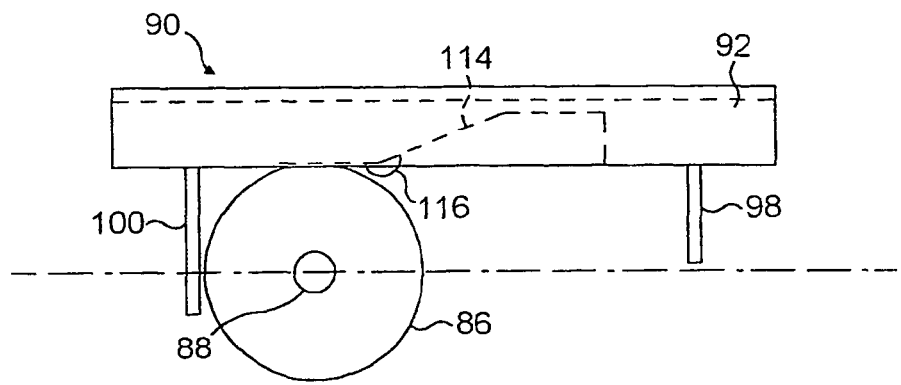
FIGS. 10(a) and 10(b) are schematic detail side views of the wheel housing of FIG. 9 in operation.
Figure 10B:
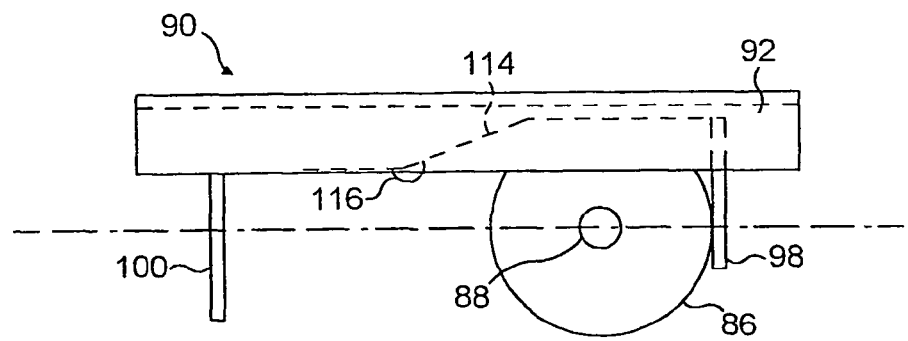

FIGS. 10(*a*) and 10(*b*) show how the height of the bin 16 with respect to the runners 74 responds to the position of the movement transfer wheel 86 within the wheel housing 90. It will be appreciated from FIG. 10(*a*) that when the movement transfer wheel 86 is in the rearward rest position against the rearward buffer 100, the wheel channel 92 and hence the bin 16 is raised, whereas when the movement transfer wheel 86 moves along the ramp 114 to the forward rest position against the forward buffer 98, the wheel channel 92 and hence the bin 16 is lowered.

Returning then to FIGS. 6(a) and 6(b) to see the bin transport mechanism in operation, FIG. 6(a) shows the bin 16 raised against and sealed to the associated lid 22. In this instance, the bin 16 has been slid to its rearmost extent, as has the runner 74 with the attached transport plate 82. The runner 74 has been slid rearwardly to that extent by pushing the attached front panel 118 of the drawer 4 rearwardly as far as it can go. Consequently, the movement transfer wheels 86 supported by the transport plate 82 are forced into the rearward rest position with respect to their respective wheel housings 90, at which position the wheel channels 92 and hence the bin 16 are raised.

The left-hand portion of FIG. 6(b) in solid lines shows how opening the drawer 4 by pulling a handle 120 on its front panel 118 initially pulls the runner 74 and the attached transport plate 82 forwards. The bin 16 does not move forwards during that initial forward movement of the front panel 118 and runner 74; instead, the movement transfer wheels 86 supported by the transport plate 82 move into the forward rest position: this allows the bin 16 to drop away vertically from the lid 22. It will also be apparent that when they reach their forward rest positions, each movement transfer wheel 86 bears against the respective forward buffer 98 and so can transmit continued horizontal drawer-opening force to the bin 16. In this way, when the bin 16 has cleared the seal 60, the drawer 4 can be opened fully into the position shown in dashed lines to the right in FIG. 6(b), in which the interior of the bin 16 is fully accessible. During that movement, the upwardly-bent free end portion 108 of the forward retaining finger 104 holds the movement transfer wheel 86 resiliently in the forward rest position so that the bin 16 does not move about unduly with respect to the runners 74. It will be noted that this opening movement of the bin 16 involves no sliding or wiping action across the seal 60.

When the drawer is fully open, the bin 16 can be removed from the appliance 2. Preferably, the wheel housings 90 joined by the flat bar 96 remain behind when the bin 16 is removed in this way. However, it would also be possible to lift the bin 16 together with its wheel housings 90 so that the wheel housings 90 are lifted off the movement transfer wheels 86. In that event, it will be apparent from FIG. 9 that a gap between the free ends of the retaining fingers 104, 106 is just large enough for a movement transfer wheel 86 to pass through it when the bin 16 is lifted in this way. To reach that gap, it may be necessary to push the movement transfer wheel 86 rearwardly from the forward rest position past the upwardly-bent free end portion 108 of the forward retaining finger 104.

Figure 11A:
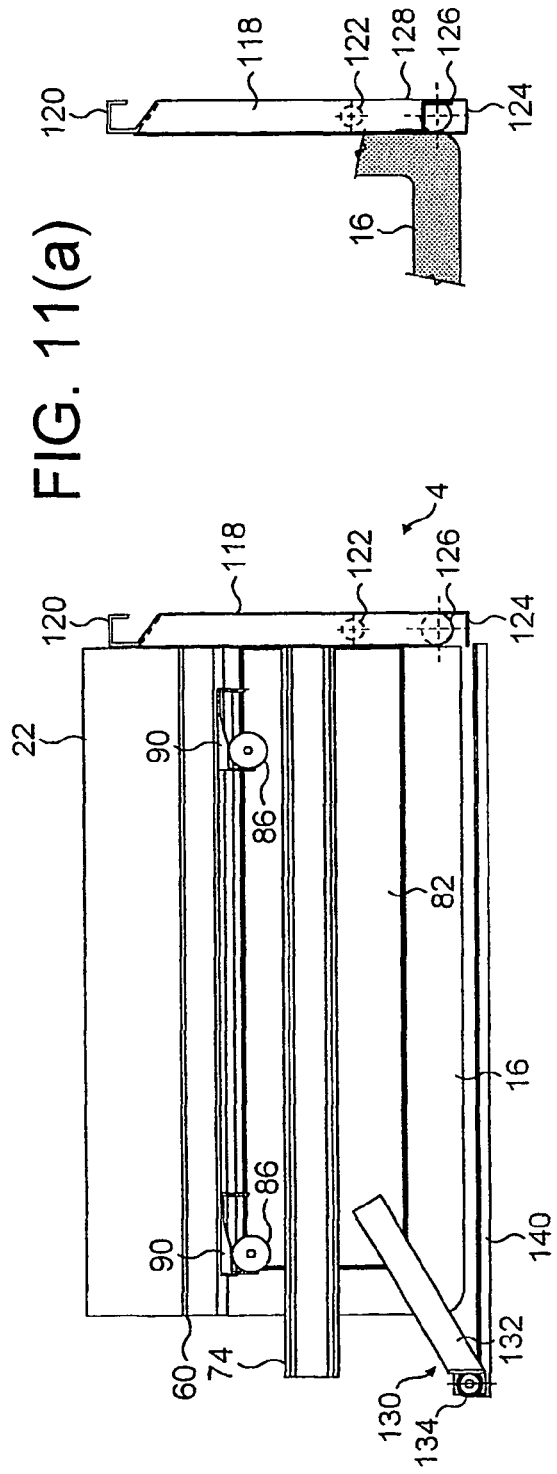
FIGS. 11(a) and 11(b) are side views of a drawer in accordance with the invention, which is akin to that shown in FIGS. 6(a) and 6(b) but has the added refinement of a lever that assists opening and closing of the drawer.
Figure 11B:
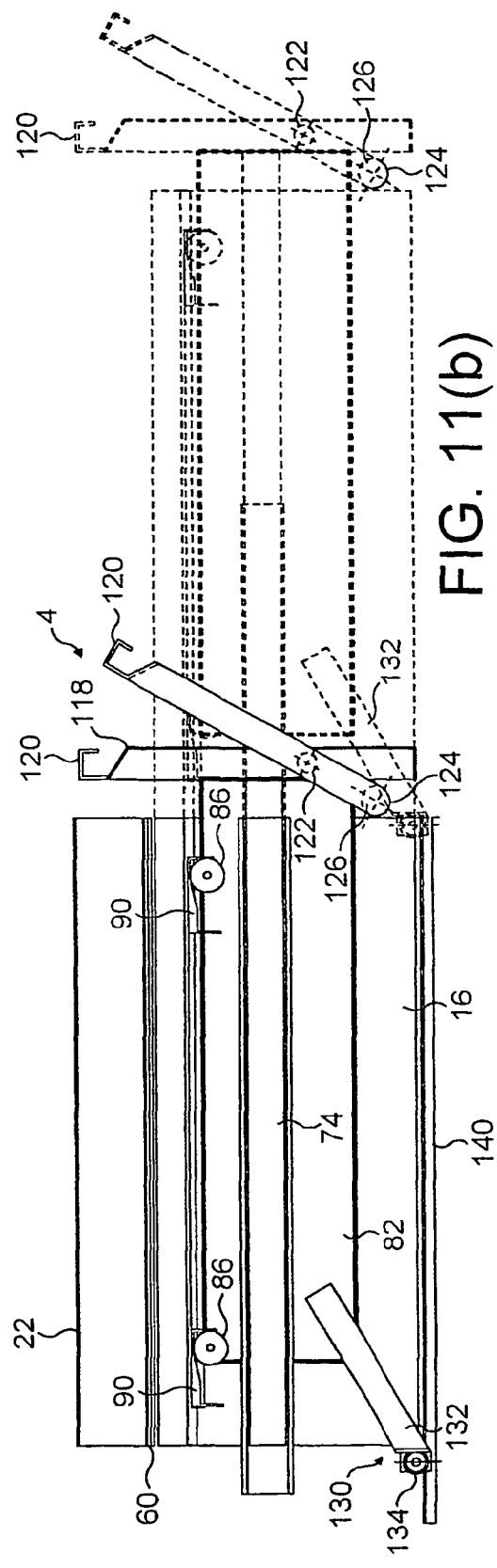

FIGS. 11(a) and 11(b) are akin to FIGS. 6(a) and 6(b) but show a variant in which closing a drawer 4 and opening it over the initial range of movement is lever-assisted. Such assistance may be particularly useful when closing a heavily-laden drawer 4, bearing in mind the need to lift the bin 16 slightly over the final portion of the drawer-closing movement. Elegantly, the front panel 118 of the drawer 4 serves as the lever by being pivotally attached to the runner 74 and/or the transport plate 82 such that the pivot axis 122 lies horizontally just below the mid point of the front panel 118. Consequently, when the handle 120 at the top of the front panel 118 is pulled upon opening the drawer 4, the front panel 118 pivots about the pivot axis 122 (in a clockwise direction as drawn) and this causes the lower edge 124 of the front panel 118 to press against the lower front part of the bin 16. That pressure assists the relative movement between the runner 74 and the bin 16 that is necessary for the bin 16 to drop away from the lid 22.

More specifically, the lower edge 124 of the front panel 118 is associated with a bar 126 that engages a downwardly-opening hook 128 fixed to the front face of the bin 16. As the hook 128 opens downwardly, it allows the bin 16 to move up and down when making or breaking the seal; it also allows the bin 16 to be removed from the appliance 2 by lifting it off the movement transfer wheels 86 as aforesaid. Yet, when the drawer 4 is being closed and closing pressure is therefore applied to the handle 120 at the top edge of the front panel 118 (which causes the front panel 118 to pivot in an anti-clockwise direction as drawn), the bar 126 applies force to the bin 16 via the hook 126 to hold the bin 16 while pushing the runner 74 rearwardly with respect to the bin 16. It is this relative movement that lifts the bin 16 against the lid 22 and benefits most from the mechanical advantage afforded by the lever.

A further feature evident from FIGS. 6(a) and 6(b) and FIGS. 11(a) and 11(b) is a rack-and-pinion mechanism 130 whose primary purpose is to resist lateral sway of a drawer 4 supported by the runners 74 as it opens and closes. The rack-and-pinion mechanism 130 is also shown in plan view in FIG. 12. In that mechanism, an arm 132 depends rearwardly and downwardly from the transport plate 82 on each side of a bin 16 (the outline of which is shown in dashed lines in FIG. 12) and terminates in a bearing 134 defining a horizontal axis of rotation below and behind the rearward face of the bin 16. As can be appreciated from FIG. 12, the bearings 134 of the respective arms 132 align and co-operate to support a horizontal spindle 136 that spans the gap between the arms 132.

The spindle 136, in turn, supports a pair of pinions 138 fixed to the spindle 136 such that one pinion 138 is disposed adjacent each end of the spindle 136, just inboard of each bearing 134 that supports the spindle 136. The pair of pinions 138 are engaged with a correspondingly-spaced pair of parallel racks 140 that are on top of the lid 22 or other horizontal surface (notably the top surface of the base panel) below the drawer 4 in question, and extend orthogonally to the spindle 136 from the front to the back of that lid 22 or surface, at least as far as the opening movement of the drawer 4 dictates.

In use, when the drawer 4 is being opened or closed, the pinions 138 are constrained by the interconnecting spindle 136 to turn with one another. Any lateral sway experienced by the drawer 4 tends to move the spindle 136 out of its orthogonal relationship with the racks 140, and so tries to create a speed differential between the pinions 138 as they move along the racks 140. This conflict therefore causes one pinion 138 to apply torque to the other pinion 138 via the spindle 136; that torque tends to correct or at least resist the incipient sway. The spindle 136 may twist slightly as a result of the applied torque but this helps to prevent either of the pinions 138 skipping out of engagement with their racks 140 and hence potentially out of alignment with each other.

Figure 12:
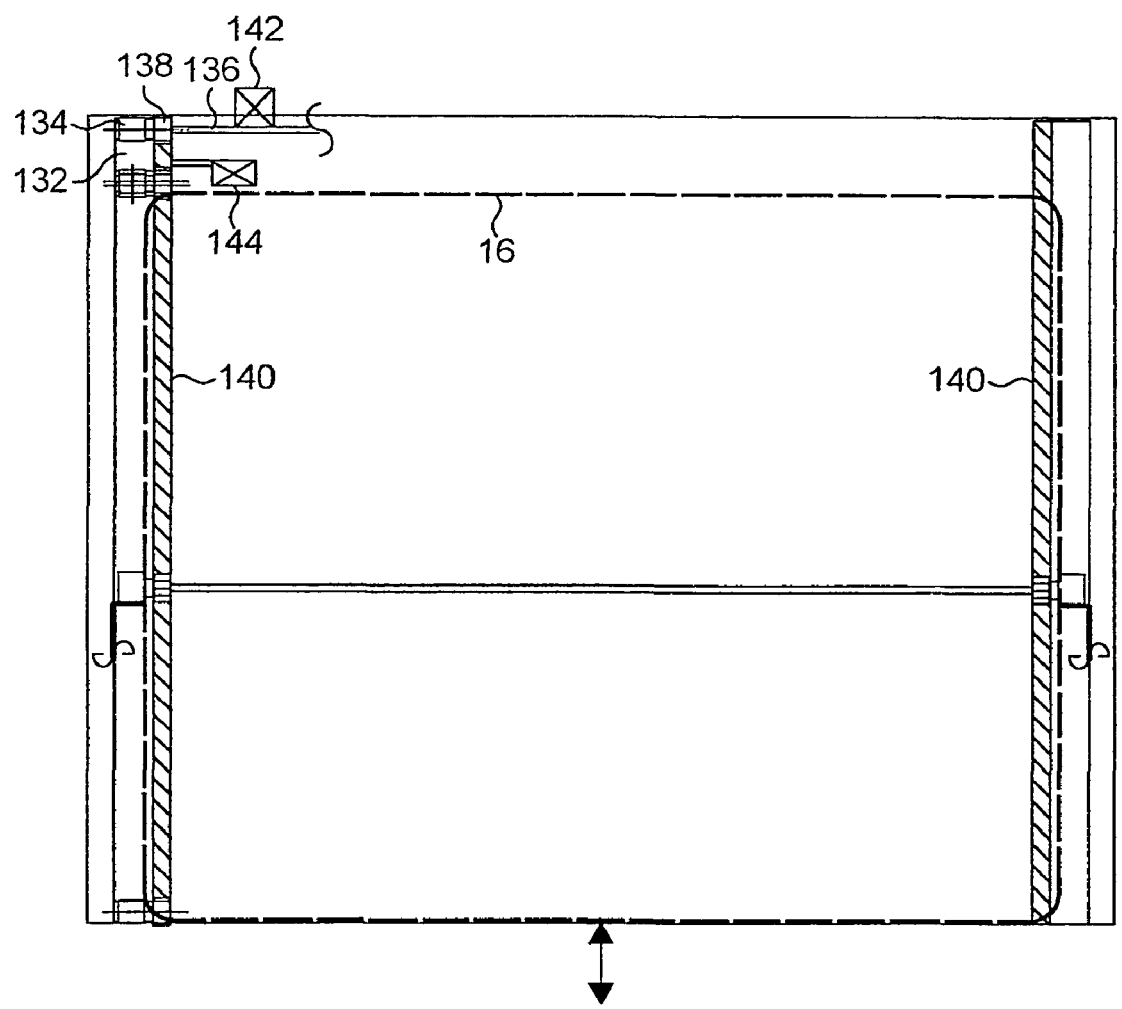
FIG. 12 is a schematic plan view within a drawer recess of an appliance adapted to receive a drawer of FIGS. 6(a) and 6(b) or FIGS. 11(a) and 11(b)

FIG. 12 also shows a limit switch 142 near the rear of one of the racks 140, and a locking solenoid 144 also associated with the rack 140 but positioned slightly forward of the limit switch 142. The purpose of the locking solenoid 144 is to prevent the associated drawer 4 being opened, by for example blocking forward movement of the arm 132 that depends from the transport plate 82. On the other hand, the limit switch 142 interacts with the arm 132 of the transport plate 82, or with the spindle 136 supported by that arm 132, to sense opening and closing of the drawer 4.

By virtue of its rearmost position as shown in FIG. 12, the limit switch 142 is triggered when the transport plate 82 and its associated arm 132 is moved into or from its rearmost position consistent with sealing the bin 16 against the lid 22. If the bin 16 is not sealed in that way, this will be indicated by the transport plate 82 and its associated arm 132 being forward of its rearmost position and will be sensed by the limit switch 142. In that case, the limit switch 142 can be used to trigger an alarm (preferably after a timeout period has elapsed) and/or to cause the corresponding solenoids 144 of other drawers to lock their drawers 4 closed until the open or unsealed drawer 4 has been returned to its closed position and its bin 16 has been sealed against the associated lid 22. This allows only one drawer 4 to be open at a time and so provides an anti-tilt facility akin to a filing cabinet that, in the context of cold storage, also has the unique benefit of limiting cross-contamination between items stored in different drawers 4.

The locking solenoid 144 can also be controlled independently of a limit switch, for example by connecting all of the solenoids 144 of a multi-drawer appliance 2 to enable central locking of all of its drawers 4, preferably by a common key-operated switch (not shown). Preferably, to the benefit of energy consumption, the solenoid 144 unlocks its drawer 4 when energised and so locks that drawer 4 when de-energised. More preferably in such an arrangement, all of the drawers 4 remain locked with their solenoids 144 de-energised until a user-selected one of the drawers 4 is unlocked by, for example, pressing an appropriate button to energise its solenoid 144 or touching a corresponding touch-switch associated with the handle of that drawer 4. Once energised, a solenoid 144 may remain energised constantly until another drawer 4 is selected to be opened; preferably, however, that solenoid 144 is de-energised after a timeout period to lock its drawer 4 until a user selects that drawer 4 to be unlocked once more.

Whilst electric locking solenoids 144 have been mentioned, it will be clear to the skilled reader that other actuators or locking mechanisms operating on hydraulic, pneumatic or mechanical principles can be used instead.

Figure 13A:
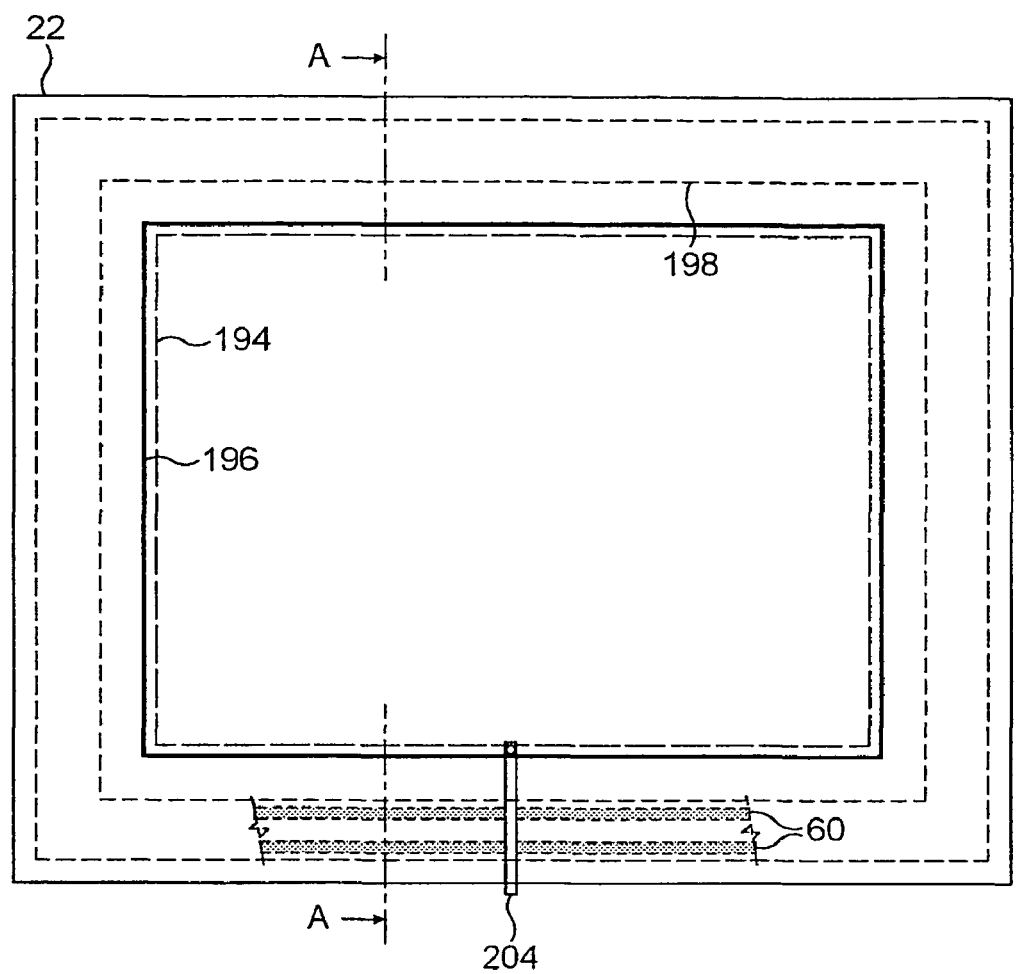
FIGS. 13(a) and 13(b) are a plan view and a sectional side view respectively of a lid showing its sealing, cooling and drainage facilities in detail.
Figure 13B:
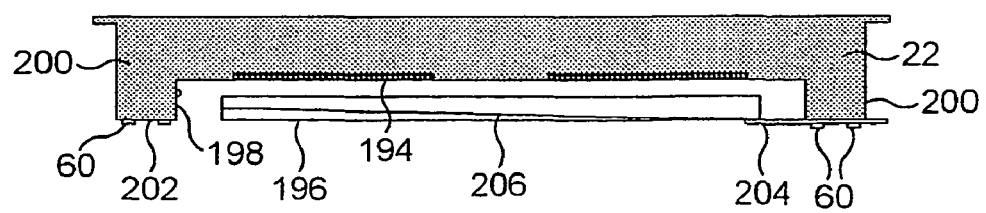

Returning to the appliance 2 itself, FIGS. 13(a) and 13(b) show preferred details of the lids 22 to which the bins 16 seal when fitted in the appliance 2. FIG. 13(a) shows that the lid 22 is oblong in plan view. The oblong dashed outlines of features below the lid 22 are also apparent. Starting inwardly and moving outwardly, those features are an evaporator 194 disposed centrally on the underside of the lid 22, a drain pan 196 disposed beneath the evaporator 194 to catch water that drips from the evaporator 194, and a recess 198 in the underside of the lid 22 that accommodates both the drain pan 196 and the evaporator 194.

As best appreciated from FIG. 13(b), which is a cross-section on line A—A of FIG. 13(a), the recess 198 is bounded by a peripheral skirt 200 depending from the lid 22. A pair of oblong compressible seals 60 lie one within the other on the lower end face 202 of the skirt 200. Those seals 60 are continuous save for an opening that accommodates an oblong-section drainage duct 204 leading rearwardly from the drain pan 196. The drain pan 196 has an inclined base 206 to lead water toward that drainage duct 204, from which the water is channelled away from the lid 22 as FIG. 14 will explain. A temperature sensor (not shown) can penetrates the skirt 200 above the seals 60 to measure the temperature within the cavity sealed by the bin 16 and the lid 22.

Figure 14:
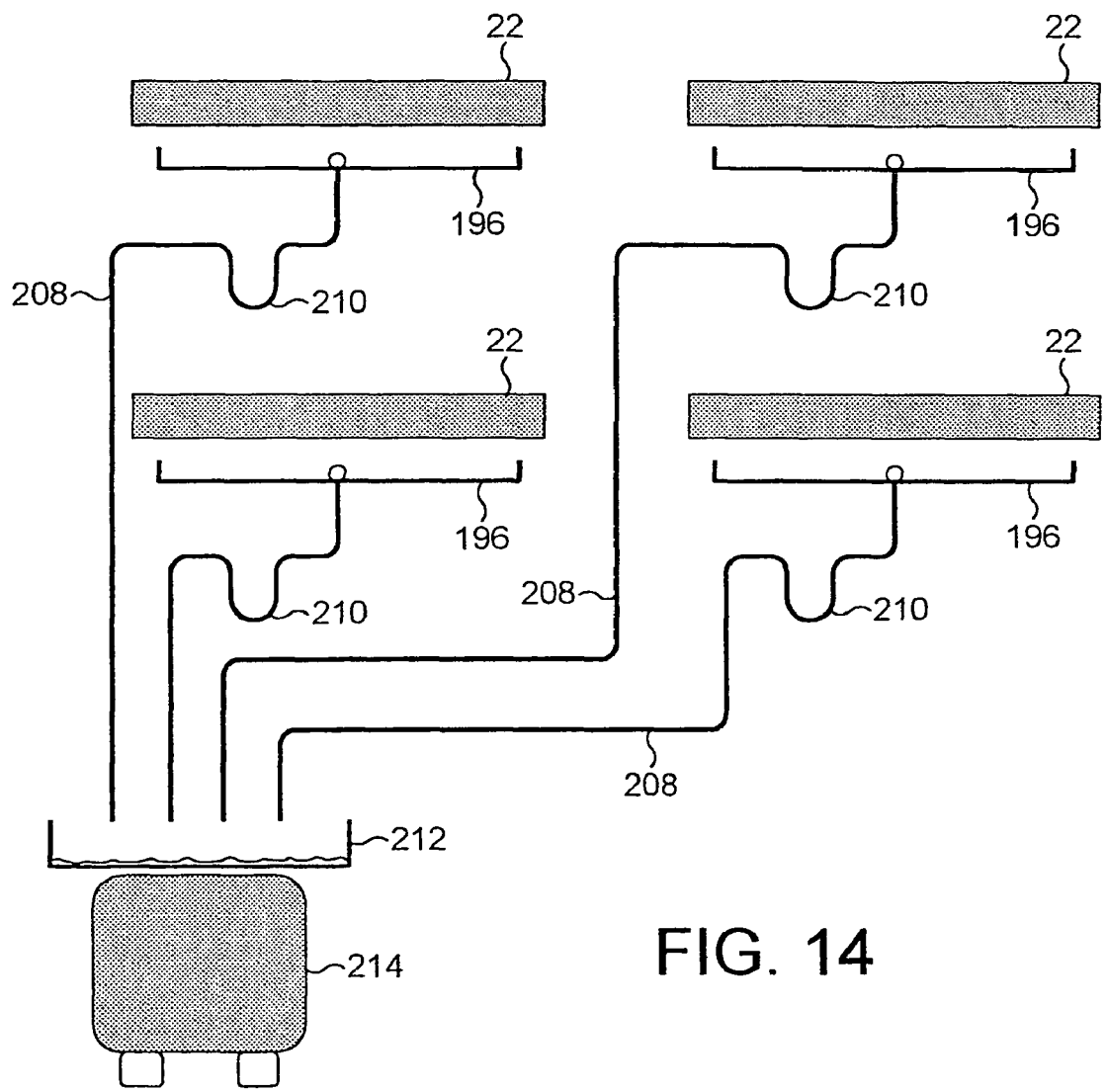
FIG. 14 is a diagrammatic view of a plurality of the lids of FIGS. 13(a) and 13(b), showing their separate drainage arrangements.

FIG. 14 shows how it is preferred that separate drain ducts 208 run from each drain pan 196 of a multi-bin appliance 2. This minimises the risk of cross-contamination. Each duct 208 includes a U-bend 210 defining a sealing water trap and drains separately to a common tray 212. That tray 212 may be located above a compressor 214 of the appliance 2 as shown so that, over time, heat emanating from the compressor 214 evaporates the water from the tray 212 at least as quickly as that water accumulates in the tray 212. In addition or in the alternative, the condenser fan of the appliance 2 (not shown) can blow across the surface of water in the tray 212 so as to promote its evaporation.

Figure 15A:
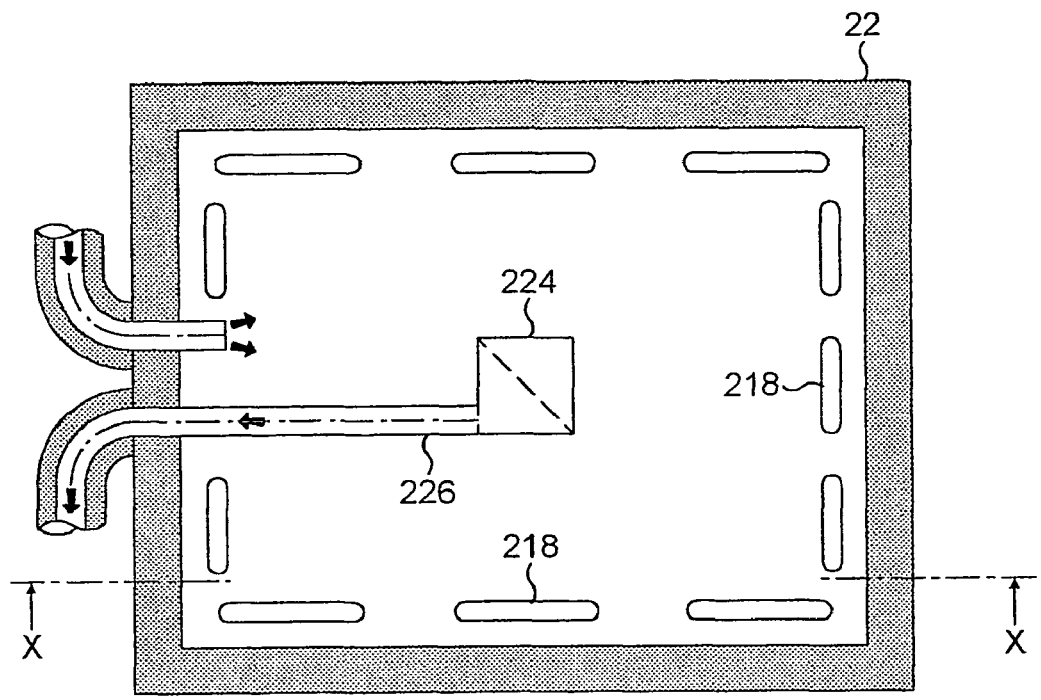
FIGS. 15(a) and 15(b) are a bottom plan view and a sectional side view respectively of a lid adapted for use in a fan coil cooling system.
Figure 15B:
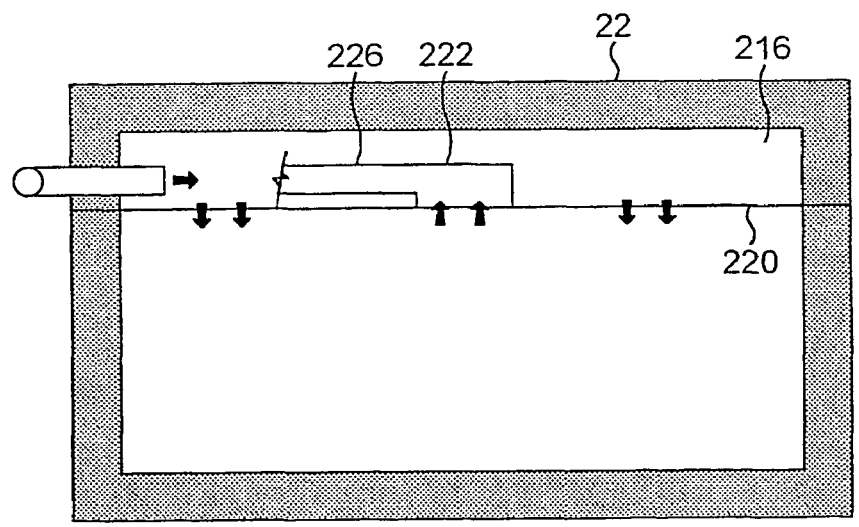

FIGS. 15(a) and 15(b) show a further lid design suitable for use in a fan coil cooling system in which air is supplied to the bin 16 and extracted from the bin 16 via a remote fan coil unit. Such a system is also known as a forced air system, and the lid 22 in FIGS. 15(a) and 15(b) is hollow and partitioned to govern the flow of air on which such systems depend. Thus, cold air cooled by a heat exchanger (not shown) is piped under pressure from a fan (not shown) into a supply air plenum 216 disposed peripherally within the lid 22, from which that air enters the bin through supply air diffusion slots 218 around a base panel 220 defining the underside of the lid 22. Warmer air is extracted from the bin 16 through a centrally-disposed return air plenum 222 that communicates with the bin 16 through a central hole 224 in the base panel 220 and with the fan through a pipe 226 extending through the surrounding supply air plenum 216. The warmer air is drawn into the return air plenum 222 under low pressure created by the fan, and is then sent to the heat exchanger to be cooled and recirculated via the supply air plenum 216.

Figure 16B:
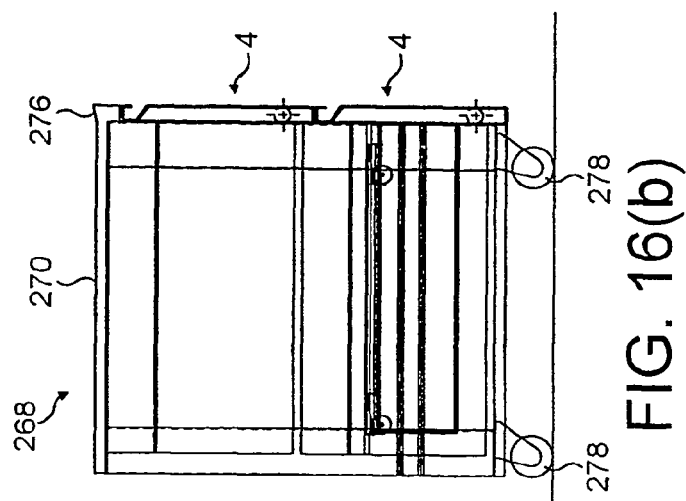
FIGS. 16(a), 16(b) and 16(c) are front and side elevation views and an enlarged partial cross-sectional detail view of a bench-type cold-storage appliance having an alternative layout to that shown in FIGS. 1 to 4.
Figure 16C:
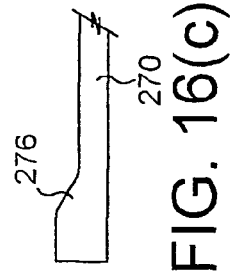
Figure 16A:
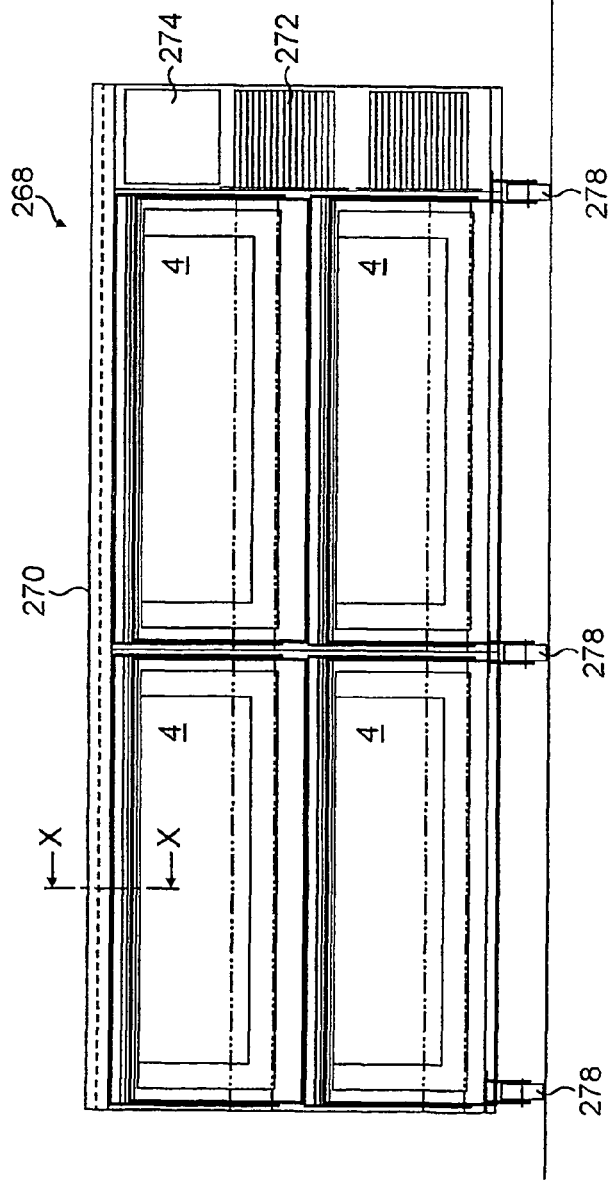
Figure 23B:
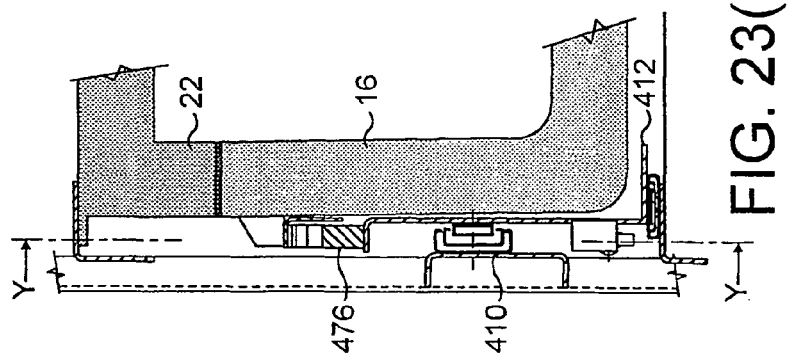
FIGS. 23(a) and 23(b) are part-sectional side and front views respectively of another bin transport mechanism, employing sliding blocks, FIG. 23(a) being on line Y—Y of FIG. 23(b) and FIG. 23(b) being on line X—X of FIG. 23(a)
Figure 23A:
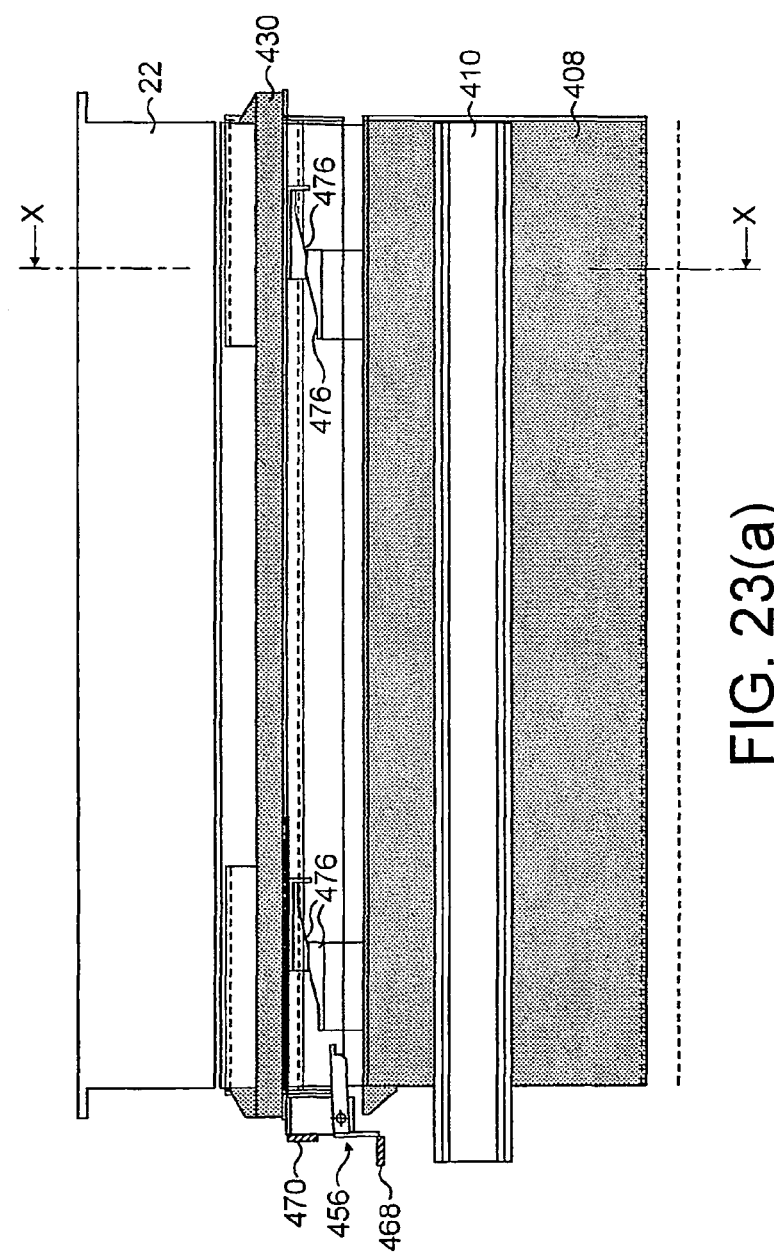

Apart from the vertical array of drawers 4 common to the embodiments described above, a side-by-side arrangement of drawers 4 is also contemplated as shown in FIGS. 16(a), 16(b) and 16(c). The front view of FIG. 16(a) shows a four-drawer bench-type appliance 268 (to which FIGS. 23 and 24 also refer) in which the drawers 4 are in two adjacent columns of two drawers 4 each. Thus, the appliance 268 is low enough to have a worktop 270 over the drawers 4, straddling the two columns. This embodiment of the invention is therefore suitable for use as a refrigerated food preparation and/or servery unit.

The depth of the drawers 4 is maximised within the limited available height by mounting the refrigerator engine 272 and control panel 274 in a side-slung position to one side of the appliance 268 as shown. Also, the side view of FIG. 16(b) and the enlarged detail cross-sectional view of FIG. 16(c), taken on line X—X of FIG. 16(a), shows that the front edge of the worktop 270 has a raised lip 276 that helps to prevent spillages on the worktop 270 dripping down onto or into the drawers 4 below.

FIGS. 16(a) and 16(b) also show how an appliance 268 of the invention can be mounted on castors 278; those castors 278 can be height-adjustable to level the appliance 268 on a non-level floor 280.

Referring now to FIGS. 17 to 24, these show two further bin transport mechanisms being alternatives to those shown in FIGS. 6 to 11 above. They address potential disadvantages of the previously-described bin transport mechanisms. One disadvantage is that when the drawer of the FIGS. 6 to 11 embodiments is extended and is pushed sharply when being closed, the wheels 86 will tend to travel up the ramps 114 before the rearward drawer movement is complete, so raising the bin 16 and possibly risking a clash when the rear top edge of the bin 16 encounters the front lower edge of the lid 22. A steady motion is therefore essential to return the drawer to its fully closed position before further pressure pushes the wheels 86 up the ramps 114 to seal the bin 16 to the lid 22. Another disadvantage is that the wheel spindles 88 take the weight of the bin 16 and the seal compression forces, which increases the risk of failure.

Figure 17C:
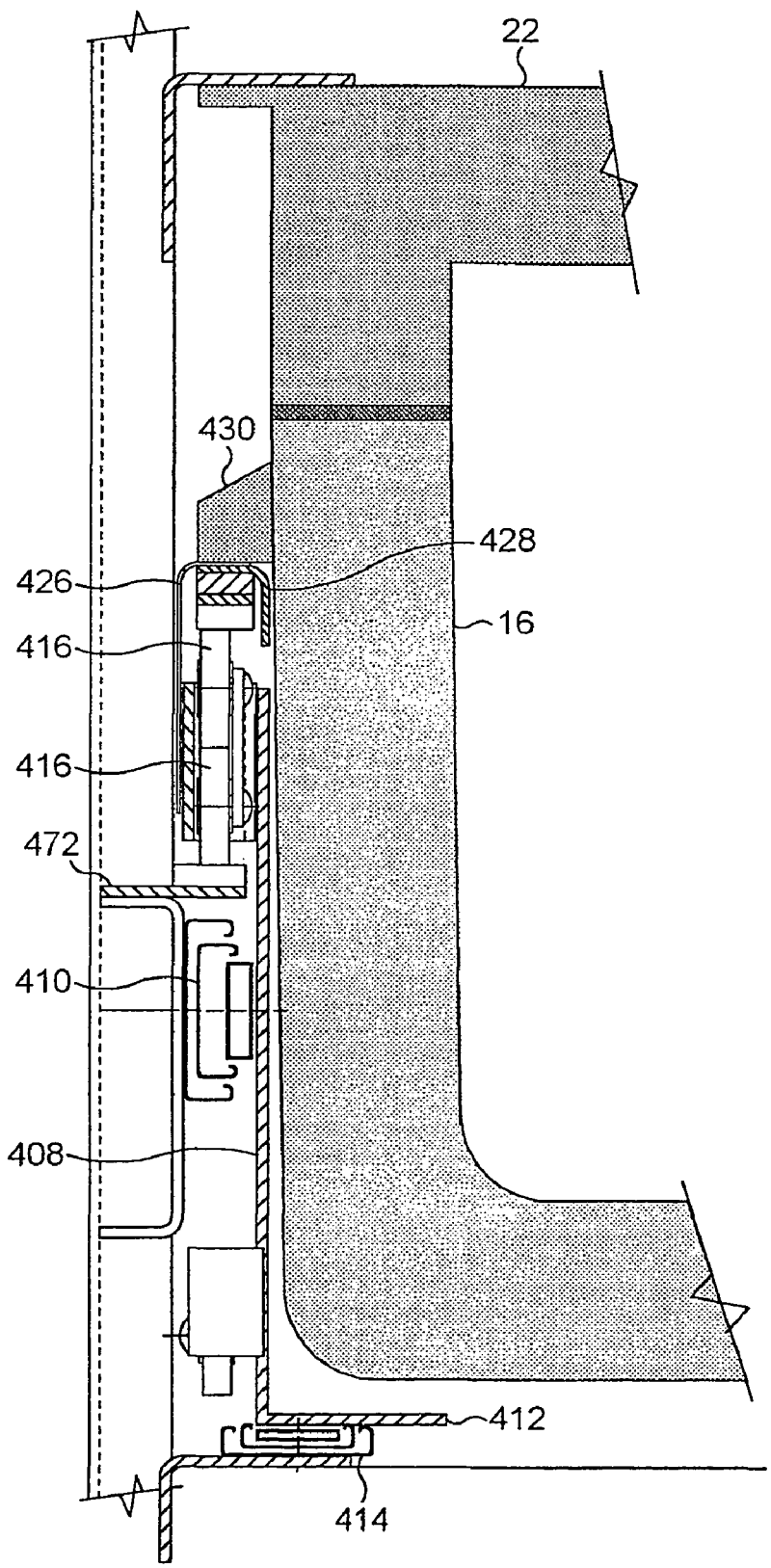

Looking firstly at FIGS. 17(*a*) to 17(*c*), the bin transport mechanism on each side of the bin 16 comprises a transport plate 408 fixed to a telescopic runner 410, the transport plate 408 lying generally vertically beside the bin 16. Unlike the embodiments of FIGS. 6 to 11, the transport plate 408 extends downwardly below the bin 16 to terminate in an inwardly-directed flange 412 disposed orthogonally with respect to the transport plate 408. The flange 412 lies between the underside of the bin 16 and the lid 22 of the bin 16 below, or an equivalent structure, and is connected to the lid 22 of the bin 16 below, or the equivalent structure, via a telescopic runner 414 that lies horizontally. The purpose of that runner 414 is to resist lateral sway of a drawer 4 supported by a pair of runners 410 as it opens and closes. Such an anti-sway runner 414 can be to one side of the bin 16, to both sides of the bin 16 or can be disposed centrally within respect to the bin 16.

Vertically-oriented movement transfer wheels 416 are disposed in pairs, each pair comprising one wheel 416 disposed above the other for rolling contact between them while transmitting bin weight and seal compression loads from one wheel 416 to the other. The pairs of movement transfer wheels 416 are disposed one pair forward, one pair rearward on each transport plate 408 to each side of the bin 16.

The wheels 416 of each pair are rotatably attached by respective horizontal spindles 418 to a wheel plate 420 that floats vertically within a pocket defined by a wheel bracket 422 attached to the transport plate 408. The wheel plate 420 is free to move vertically within the pocket but is restrained against falling out of the pocket by a retaining flange 424 on its upper end. The flange 424 defines a shoulder that bears against the wheel bracket 422 at the top edge of the pocket when the wheel plate 420 is at its lowest point within the pocket.

A transport plate 408 fitted with wheel brackets 422 each carrying a respective wheel plate 420 and a pair of wheels 416 is shown in FIG. 19.

The upper wheel 416 of each pair is received by and constrained to move in a respective wheel housing. Each wheel housing comprises a wheel channel defined between a cover plate 426 that partially shrouds the wheel bracket 422, and an inverted L-section 428 that bears against and supports a horizontal shoulder surface under an overhanging flange 430 projecting from the wall of the bin 16. The flange 430 extends around the front, sides and rear of the bin 16 and the L-section 428 forms part of a bin support frame 432 illustrated in FIG. 20. The flange 430 that extends around the bin 16 sits on the frame 432 in such manner that the bin 16 can be lifted out of the frame 432.

Each upper wheel 416 can move forwardly and rearwardly within its associated wheel housing to a limited extent with respect to the bin 16, and each wheel housing has formations associated with the wheel channel that constrain and control the movement of the upper wheel 416 with respect to the bin 16. Those formations are best shown in isolation in the detail view of FIG. 21 of the drawings.

Forward and rearward buffers 434, 436 limit forward and rearward movement of the upper wheel 416 with respect to the bin 16, and a track 438 connects the buffers 434, 436 to define a running surface for the upper wheel. The buffers 434, 436 and the track 438 are folded or fabricated in a single housing component 440. The track 438 has a flat end portion 442 at its forward end adjacent the forward buffer 434, parallel to the base of the wheel channel. Moving rearwardly from the flat end portion 442, the track 438 defines a forward ramp portion 444 that slants downwardly and a rearward ramp portion 446 that slants upwardly to the rearward buffer 436, the ramp portions 444, 446 between them defining an inverted ridge 448.

The wheel housings are part of a bin support frame 432 shown in FIG. 20 that defines the wheel channel and supports the housing components 440 defining the buffers 434, 436 and tracks 438. The front housing component 440 is lower than the rear housing component 440 by virtue of a packing strip 450 between the L-section 428 and the front housing component 440.

FIG. 20 also shows that the rear of the bin support frame 432 comprises a rear bin support channel 452 that carries a support bracket 454. An engaging lever 456 is pivotally attached by a spindle 458 to the support bracket 454 for limited movement about a horizontal pivot axis. The lever 456 comprises an arm 460 extending forwardly from the spindle 458 and a crank 462 depending rearwardly and downwardly from the spindle 458, the crank 462 terminating in a leg 464. The weight and length of the arm 460 creates a torque acting about the spindle 458 that exceeds the opposing torque created by the weight and length of the crank 462 and leg 464. Thus, gravity biases the lever 456 which tends to pivot clockwise as shown, with the arm 460 moving downwardly. However, the lever 460 cannot reach an equilibrium position of balance about the pivot: instead, the movement of the arm 460 is restrained by encountering a rearward extension 466 of the transport plate 408 as the bin 16 moves forwardly with respect to the arm 460, as will be explained below with reference to FIGS. 22(*a*) to 22(*d*).

As will also be explained with reference to those Figures, a striker plate 468 is fixed to the structure of the appliance at the rear of the drawer compartment and the leg 464 of the crank 462 is positioned to bear against the striker plate 468 when the drawer is closed. This lifts the arm 460 of the lever out of engagement with the rearward extension 466 of the transport plate 408.

A resilient back-stop 470 fixed to the structure of the appliance bears against the support bracket 454 when the drawer is closed so as to limit the rearward travel of the bin 16.

As best shown in FIG. 17(*c*) and FIGS. 22(*a*) to 22(*d*), a shelf 472 faces inwardly from the structure of the appliance to one side of the bin 16, just above the runner 410. Platforms 474 are disposed one forwardly and one rearwardly on the upper face of the shelf 472 to correspond to the positions of the wheel pairs 416. A packing strip 450 between the rearward platform 474 and the shelf 472 corresponds to the packing strip 450 between the front housing component 440 and the L-section 428.

The purpose of the two packing strips 450 is to ensure that the lower wheel 416 of the rearward pair clears the forward platform 474 as the bin 16 is opened on its runners 410.

The forward end of each platform 474 is tapered to define a ramp up which the lower wheel 416 of the respective pair can run to mount the platform 474. The weight of the bin 16 is then borne by the shelf 472 via the wheels 416 (whose spindles 458 bear no load), the track 438 on which the upper wheel 416 runs, the L-section 428 forming part of the bin support frame 432, and the flange 430 that extends around the bin 16 and sits on the frame 432.

FIGS. 22(*a*), 22(*b*), 22(*c*) and 22(*d*) show the bin transport mechanism in operation, with reference to a rearward pair of wheels 416 with its associated wheel housing, wheel bracket 422 and wheel plate 420. It will be apparent that the movement of the forward pair of wheels 416 with respect to its associated wheel housing broadly corresponds to that of the rearward pair of wheels 416 shown in these Figures.

FIG. 22(a) shows the bin 16 raised against and sealed to the associated lid 22. In this instance, the bin 16 has been slid to its rearmost extent defined by abutment of the support bracket 454 with the resilient back-stop 470, as has the runner 410 with the attached transport plate 408. Consequently, the pair of wheels 416 supported by the transport plate 408 via the wheel bracket 422 and wheel plate 420 is forced into a rearward position with respect to its wheel housing, at which position the upper wheel 416 of the pair is on the rearward ramp portion 446 near the ridge 448. Simultaneously, the lower wheel 416 of the pair is supported by the platform 474 to transfer loads between the bin 16 and the shelf 472 that holds the platform 474. Thus, the wheel channels and hence the bin 16 are raised, compressing the seal (not shown) between the bin 16 and the lid 22. It will also be noted that the leg 464 of the crank 462 bears against the striker plate 468, which lifts the arm 460 of the lever 456.

FIG. 22(b) shows the next step, in which the transport plate 408 has been pulled forward such that the pair of wheels 416 adopts a forward position with respect to its wheel housing. At this position, the upper wheel 416 of the pair has surmounted the ridge 448, rolled along the forward ramp portion 444 and onto the flat end portion 442 of the track 438 adjacent the forward buffer 434. The ridge 448 therefore acts as a detent against opening that holds the drawer closed, but can be overcome with minimal effort upon opening.

At the stage shown in FIG. 22(b), the lower wheel 416 of the pair is still supported by the platform 474 to bear the weight of the bin 16, but the position of the upper wheel 416 in the flat end portion 442 of the track 438 allows the bin 16 to drop away from the lid 22, breaking the seal before the bin 16 moves in an opening direction. Otherwise, the bin 16 remains in much the same position as shown in FIG. 22(a). In particular, the leg 464 of the crank 462 still bears against the striker plate 468, which holds up the arm 460 of the lever 456.

When opening movement of the bin 16 begins, as shown in FIG. 22(c), the pivot 458 of the lever 456 moves away from the striker plate 468, which allows the arm 460 of the lever 456 to drop into engagement with the rearward extension 466 of the transport plate 408. That engagement is maintained, locking the transport mechanism, until the drawer again nears its closed position upon closing. At that stage, the leg 464 of the crank 462 bears against the striker plate 468 and lifts the arm 460 out of engagement with the rearward extension 466 of the transport plate 408 to free the transport mechanism once again.

As the drawer opens further, the weight of the bin 16 must at some stage transfer from the shelf 472 within the drawer compartment to the runners 410 extending outside the drawer compartment. This is achieved when the lower wheel 416 clears the ramped forward end of the platform 474 as shown in FIG. 22(d), which allows the bin 16 to drop into contact with the inwardly-facing flange 412 at the bottom of the transport plate 408. As the transport plate 408 is supported by the runners 410, the load transfers to the runners 410. Meanwhile, the wheel plate 420 drops to the extent permitted by the retaining flange 424, clearing the upper wheel 416 from the track 438. The wheels 416 then no longer bear the weight of the bin 16.

It will be evident that when the drawer is closed again, the lower wheel 416 encounters the ramped forward end of the platform 474, lifts the wheel plate 420 and hence lifts the upper wheel 416 into contact with the track 438. This transfers the load of the bin 16 back to the shelf 472 within the drawer compartment, via the track 438, the wheels 416 and the platform 474.

The variant in FIGS. 23(a) and 23(b) and FIGS. 24(a) to 24(c) replaces the wheels 416 and their associated structures with pairs of opposed blocks 476 that slide relative to one another and are shaped to impart the desired motion and sequence of motions to the bin 16. Otherwise, like numerals are used for like parts.

Each block 476 is of plastics material coated or impregnated with, for example, PTFE to minimise friction. Broadly, each block 476 defines a contact surface comprising two horizontal portions linked by a slope, the horizontal portions thus being at different levels. Specifically, all of the blocks have contact surfaces that rise toward the front of the appliance. Thus, a rearward horizontal portion 478 is lower than a forward horizontal portion 480 of each contact surface and the slope 482 between those portions 478, 480 rises moving forwardly.

The lower block 476 of each pair is attached to the transport plate 408 and its contact surface faces generally upwardly, whereas the upper block 476 of each pair is attached to an L-section 428 that supports the flange 430 of a bin 16 and its contact surface faces generally downwardly. The thickest part of the lower block 476 is at its forward end defined by its forward horizontal portion 480 whereas the thickest part of the upper block 476 is at its rearward end defined by its rearward horizontal portion 478. Thus, the contact surfaces of the upper and lower blocks 476 of a pair are opposed and complementary in shape. Indeed, the respective contact surfaces can mate with each other when the blocks 476 of a pair are aligned.

A lug 484 depends from the forward end of the upper block 476 to prevent forward movement of the lower block 476 past the upper block 476 when the drawer is opened.

When the drawer is closed and the bin 16 is sealed to the lid 22 as shown in FIG. 24(a), the transport plate 408 and hence the lower blocks 476 are fully rearward. This brings the forward horizontal portion 480 of the lower block contact surface into register with the rearward horizontal portion 478 of the upper block contact surface. Put another way, the thickest parts of the blocks 476 coincide and hence the aggregate thickness of the pair of blocks 476 is at a maximum. This forces the bin 16 upwards into sealing contact with the lid 22, although the seal is not shown.

Referring now to FIG. 24(b), when the runner 410 and transport plate 408 moves to the right as drawn as part of the initial opening movement of the drawer, the lower block 476 moves forwardly with respect to the upper block 476. This movement continues until the lower block 476 encounters the lug 484 that depends from the forward end of the upper block 476 and so no further relative movement of the blocks 476 can occur during drawer opening. At that stage, the blocks 476 are aligned and their opposed, complementary contact surfaces mate with each other. The effect of this is that the thickest part of each block 476 coincides with the thinnest part of the other block 476, and so the aggregate thickness of the pair of blocks 476 is at a minimum. This allows the bin 16 to fall away from the lid 22 and hence breaks the seal.

As the lug 484 that depends from the forward end of the upper block 476 then prevents further relative movement of the blocks 476 during drawer opening, horizontal force applied to the lower block 476 via the transport plate 408 is transmitted to the upper block 476 and hence pulls the bin 16 horizontally within its support frame 432. This is shown in FIG. 24(c), which like FIG. 22(c) above also shows how the arm 460 of the lever 456 engages a rearward extension 466 of the transport plate 408 as the drawer is opened and the pivot 458 of the lever 456 moves away from the striker plate 468 within the drawer compartment.

Figure 24C:
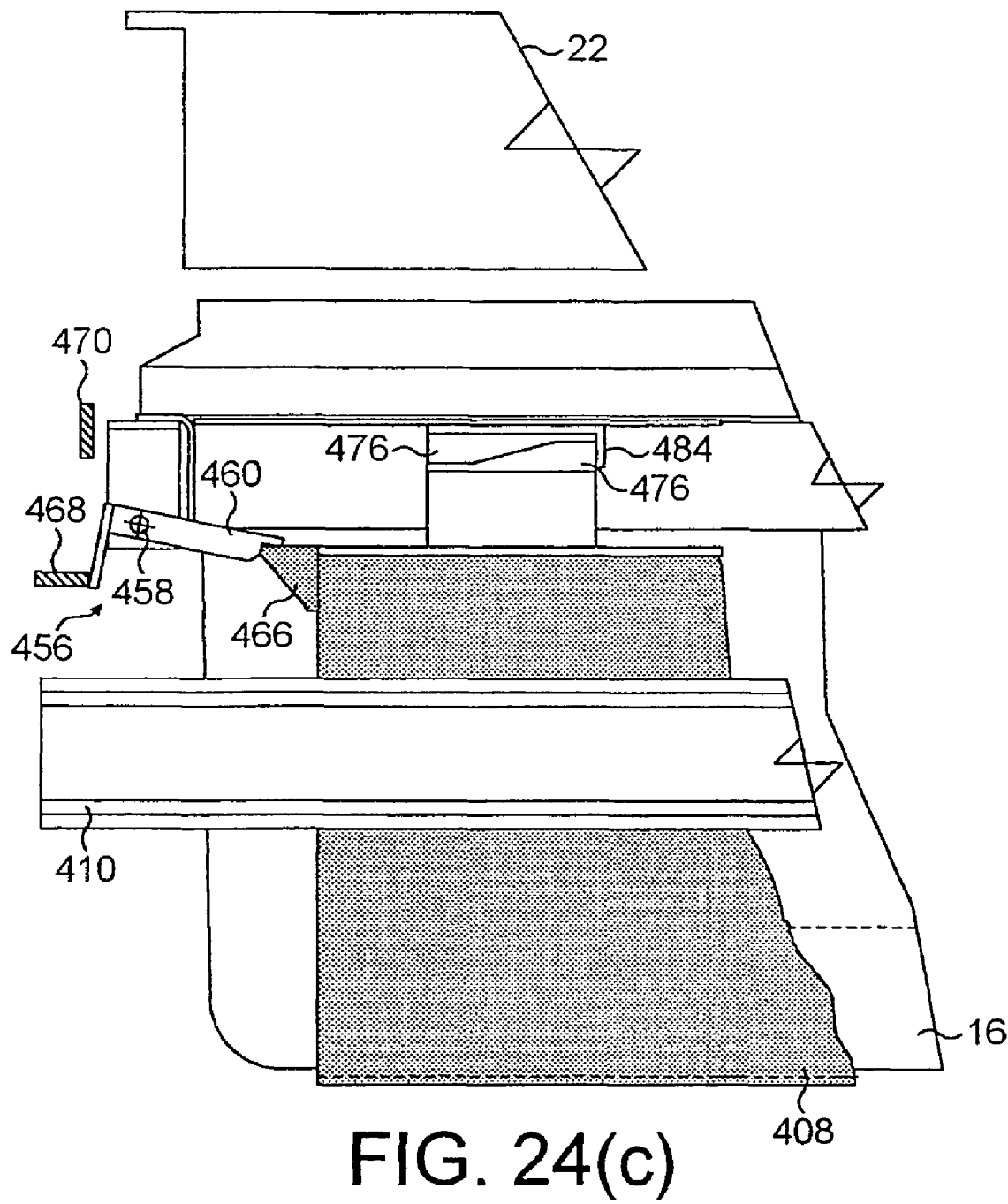

FIGS. 24(a), 24(b) and 24(c) are akin to FIGS. 22(a), 22(b) and 22(c) in their progression but as the weight of the bin 16 is at all times carried by the runners 410 via the transport plate 408 and the blocks 476, there is no need for the bin 16 to be lowered onto the flange 412 of the transport plate 408 in the manner of FIG. 22(d) in which the wheels 416 are uncoupled from the bin 16.

Another deficiency with drawers is the effect on the drawer contents during rapid changes in velocity (i.e. sudden acceleration and deceleration), as tends to happen on opening and closing. When the drawer is moved suddenly or is stopped quickly, the contents of the drawer can be thrown around causing damage to delicate items and/or spillage of liquids. Depending upon what is in the drawer, this could affect items such as cakes and pastries, liquids in jars and bottles, rare samples and artefacts. The damage caused could range from annoying wastage of inexpensive items and a mess to clean up, through to loss or irreparable damage to irreplaceable samples or artefacts. It is therefore advantageous for a drawer transport system to control acceleration and deceleration or braking during opening and closing to protect the drawer contents.

Figure 25:
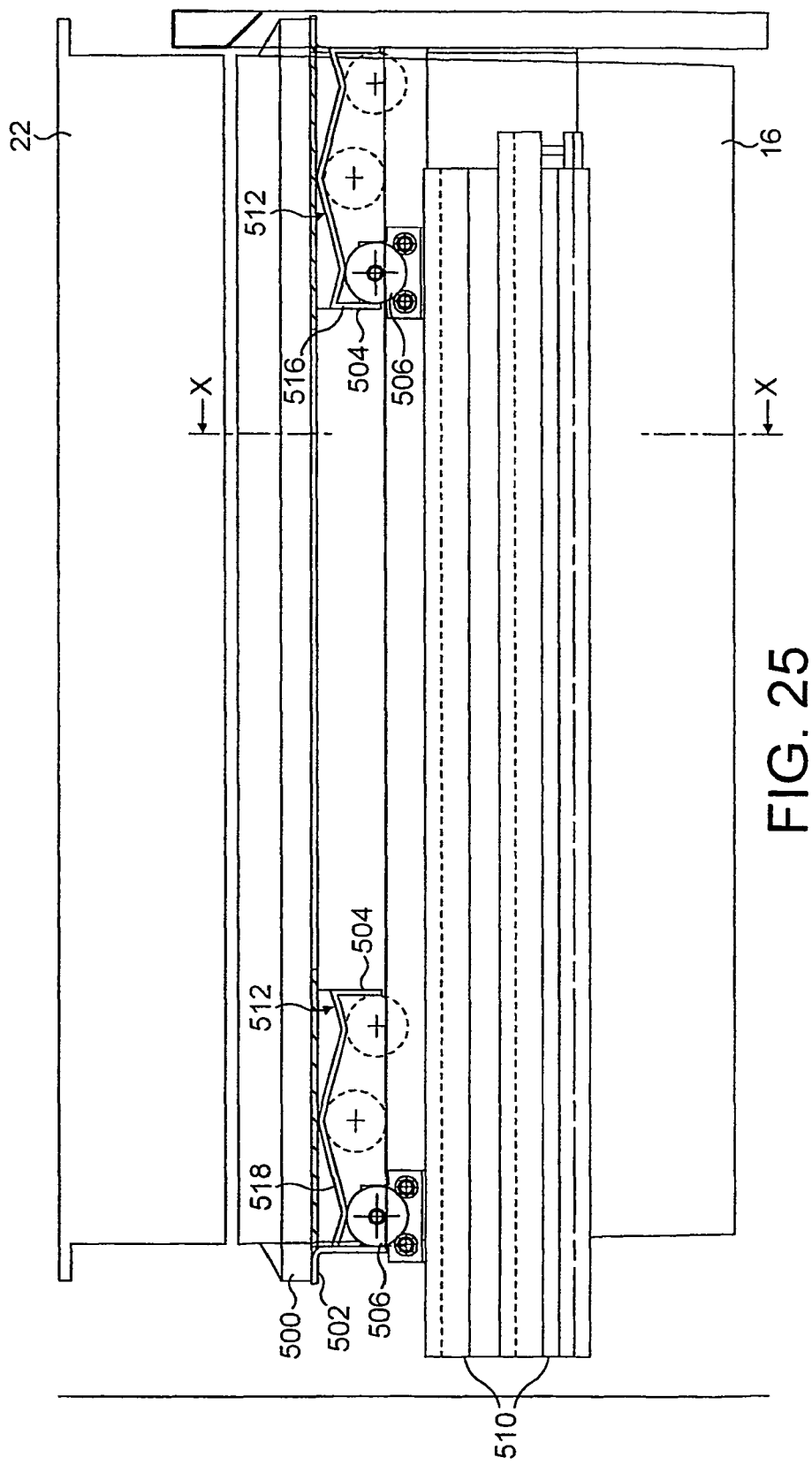
FIG. 25 is a part-sectional side view of a further bin transport mechanism taken on line Y—Y of FIG. 26.
Figure 26:
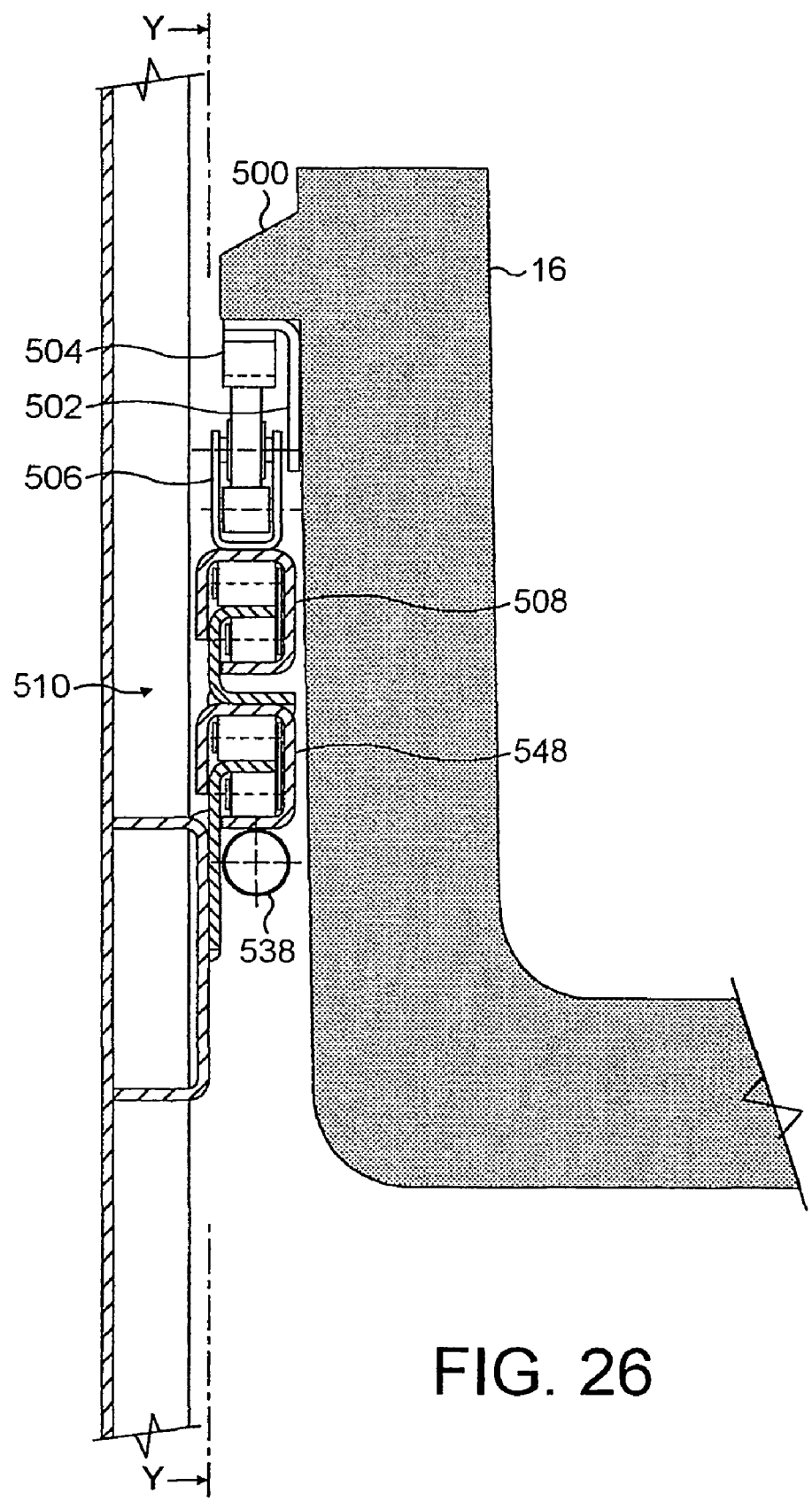
FIG. 26 is a sectional view of the bin transport mechanism of FIG. 25 taken on line X—X of that Figure and line X—X of FIG. 30(a)

Moving on therefore to FIG. 25 and its associated cross-section, FIG. 26, these show a further embodiment in which like numerals are used for like parts. In this embodiment, a drawer lid 22 is fixed to a structure and a removable drawer storage bin 16 is movable with respect to the lid 22 and the structure. The bin 16 is supported from a top flange 500 formed in the bin 16. The flange 500 in turn sits on a drawer support profile 502, which is fitted with forward and rearward wheel ramps 504 as detailed in FIG. 27. The wheel ramps 504 sit upon freely-rotating load-bearing wheels 506, attached to the top section 508 of a telescopic drawer runner 510. Supporting the bin 16 in this way via wheel ramps 504 on the drawer profile 502 and wheels 506 fitted to the runner 510 allows the bin 16 to move independently of the runner 510.

Figure 27:
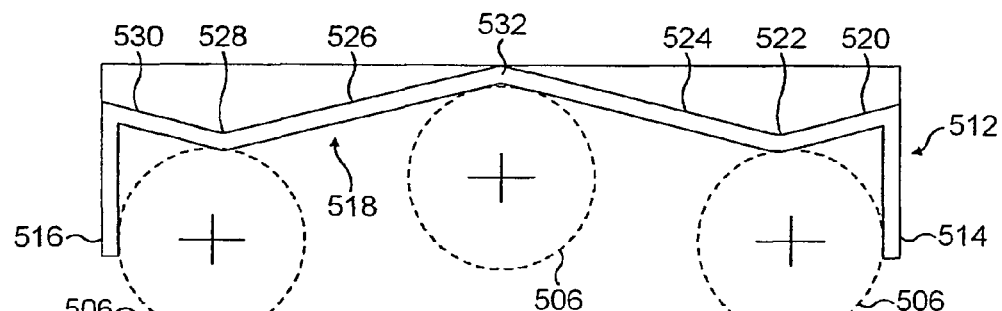
FIG. 27 is a side view of a wheel ramp used in the bin transport mechanism of FIGS. 25 and 26.

FIG. 27 shows that as in the embodiment of FIGS. 17 to 24, the wheel ramps 504 are defined by a wheel housing 512. The wheel housing 512 comprises forward and rearward buffers 514, 516 that limit forward and rearward movement of a wheel 506 with respect to the bin 16, and a track 518 which connects the buffers 514, 516 to define a running surface for the wheel 506. The buffers 514, 516 and the track 518 are again folded or fabricated in a single component.

The track 518 has an upwardly- and forwardly-inclined forward end portion 520 at its forward end adjacent the forward buffer 514. The rearward end of the forward end portion 520 defines a ridge 522 in the track 518. Moving rearwardly from there, the track 518 defines a rest position between opposed upwardly-inclined ramp portions 524, 526 and after a further ridge 528, ends in an upwardly- and rearwardly-inclined rear end portion 530 adjacent the rearward buffer 516.

The rest position at the apex 532 of the intersecting ramp portions 524, 526 is above the level of the ridges 522, 528; were the housing 512 inverted, this apex 532 would be a trough between the ridges 522, 528.

FIG. 25 shows the drawer closed with the bin 16 raised and the horizontal seal (not shown) compressed, with each wheel 506 at the rearward end of its housing 512 adjacent the rearward buffer 516. It will be noted that the radius of the wheel 506 is slightly less than the distance from the rearward buffer 516 to the rearward ridge 528. Thus, the centre of the wheel 506 is marginally rearward of the rearward ridge 528, so that the wheel 506 is biased rearwardly up the rear end portion 530 of the track 518 under the weight of the bin 16. This provides an over-centre locking effect, which can be readily overcome.

Figure 28:
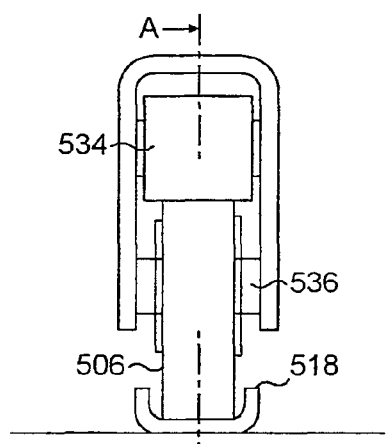
FIG. 28 is a front view of a wheel assembly for use in the bin transport mechanism of FIGS. 25 to 27.
Figure 29:
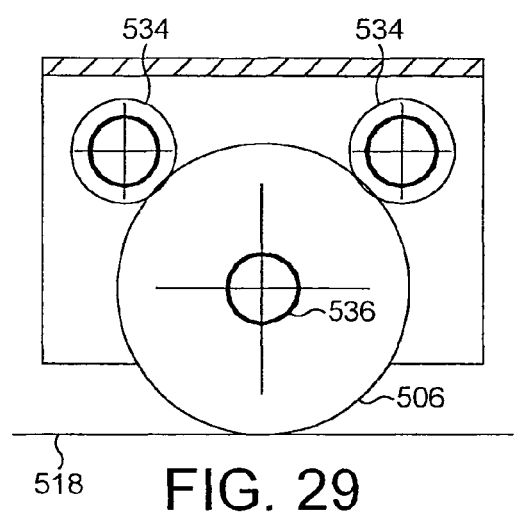
FIG. 29 is a sectional side view of the wheel assembly of FIG. 28, taken on line A—A of that Figure.

As detailed in FIGS. 28 and 29, each load-bearing wheel 506 (shown here inverted) is associated with a pair of auxiliary rollers 534 angularly spaced about the spindle 536 of the wheel 506, opposed to the point of rolling contact between the wheel 506 and the track 518 of the wheel housing 512. The auxiliary rollers 534 are in rolling contact with the wheel 506 and help to bear the load of the bin 16, taking loads transmitted across the wheel 506.

It can be seen in FIG. 25 that the drawer runners 510 extend rearward of the bin 16 to allow additional horizontal movement of the runners 510 beyond that of the bin 16. This additional horizontal movement of the runners 510 with respect to the bin 16 will take place on initial opening and on final closing of the drawer. On opening the drawer, this extra runner movement moves the wheels 506 forwardly along their tracks 518 to drop the bin 16 vertically and so to de-compress the seal on initial opening. In doing so, a wheel 506 takes a mid position at or near the apex 532 of its track 518 as the bin 16 is withdrawn with the runner 510. On returning the bin 16 and runner 510 to the closed position, the bin 16 hits a stop at its completely closed position, with each wheel 506 still at the apex 532 of its track 518. The final closing motion pushes the wheels 506 rearwardly along the tracks 518 to the over-centre locking point shown in FIG. 25, which raises the bin 16 and compresses the seal against the lid 22.

Figure 30A:
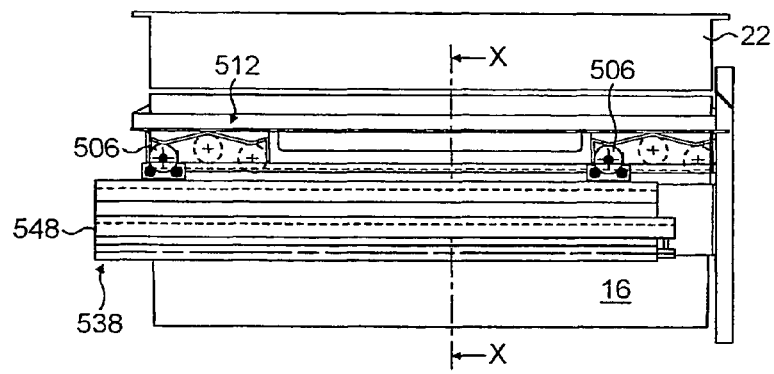
Figure 30B:
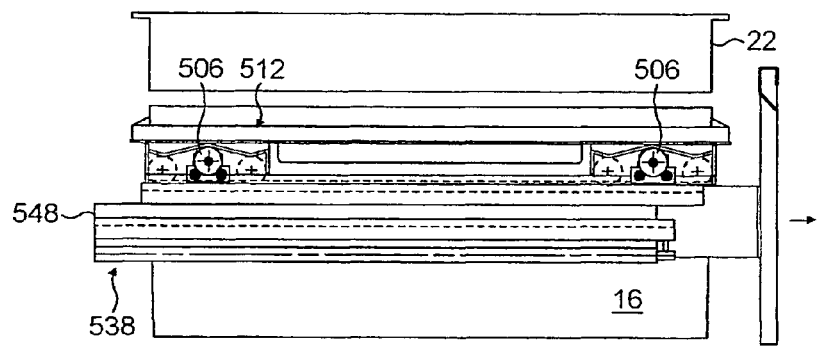
Figure 30C:
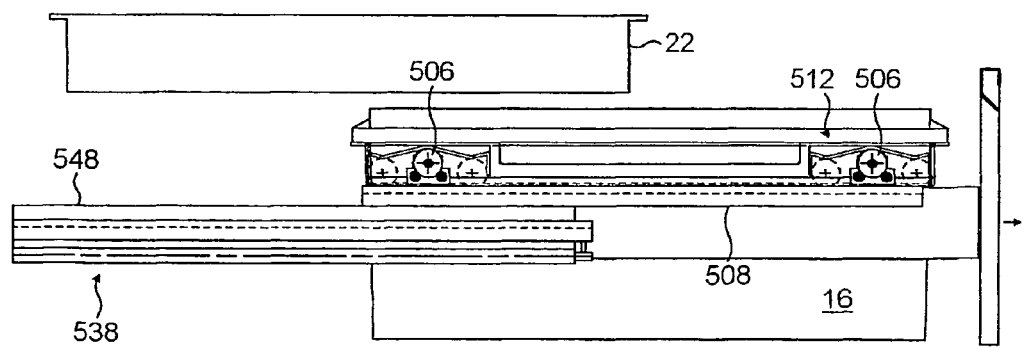
Figure 32:
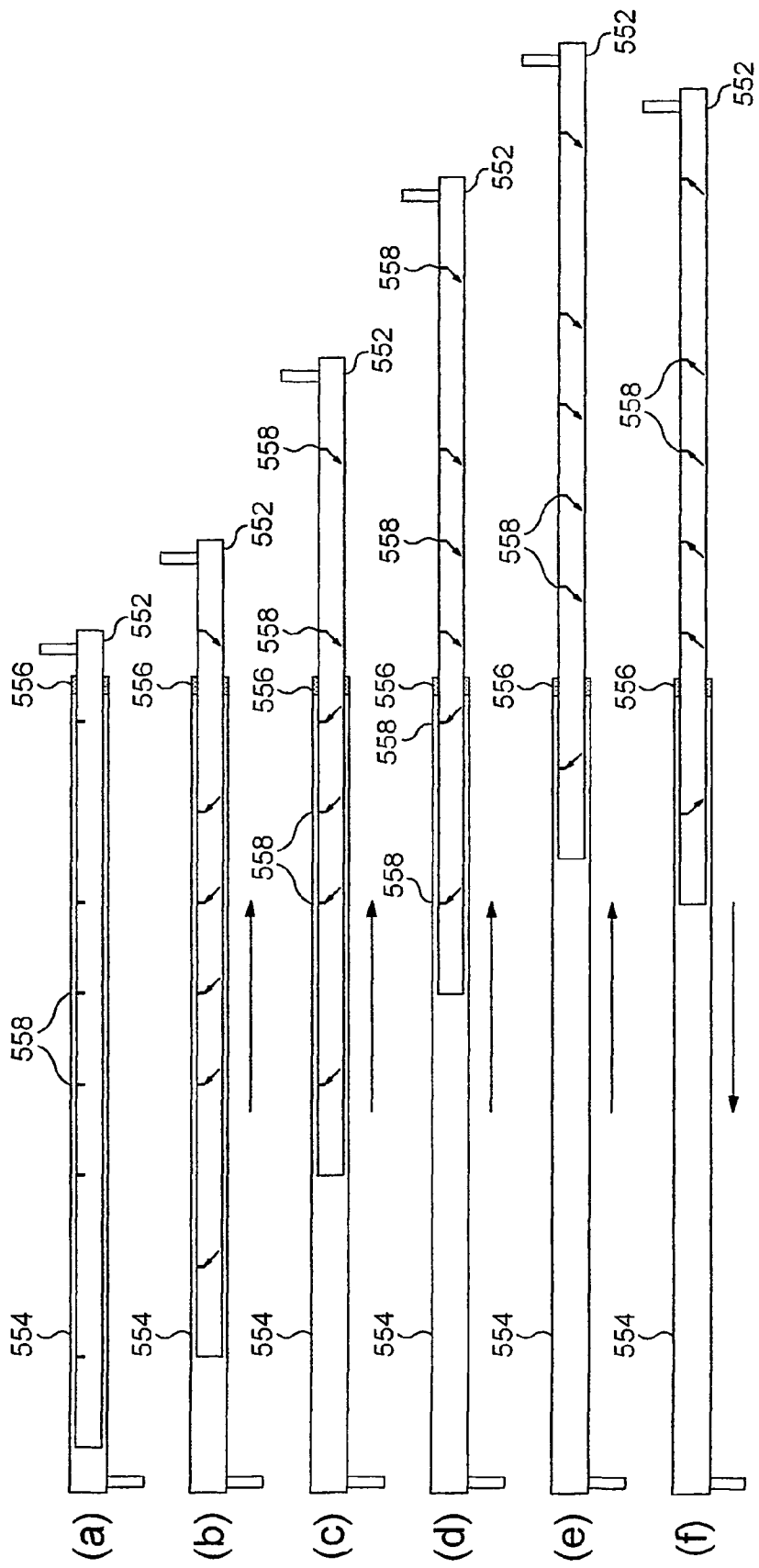
FIGS. 32(a) to 32(f) are a sequence of sectional side views of an alternative damper for use in the bin transport mechanism of FIGS. 25 to 30.

The full drawer transport sequence is illustrated in FIGS. 30(a) to 30(f). FIG. 30(a) corresponds to FIG. 25, showing the drawer closed and the bin 16 raised to compress the horizontal seal (not shown), with the wheels 506 at the rearward end of their wheel housings 512. FIG. 30(b) shows the drawer runner 510 forward of the closed position where the wheels 506 have moved along the respective tracks 518 to a mid-position at the apex 532 and released the seal, and where the bin 16 has dropped down but has not moved forward. FIG. 30(c) shows the runner 510 and bin 16 in a semi-open position, whereas FIG. 30(d) shows the runner 510 and bin 16 in a fully-open position. FIG. 30(e) shows the runner 510 and bin 16 in a semi-closed position, while FIG. 30(f) shows the bin 16 in its closed but dropped position with the runner 510 slightly forward of the closed position, in readiness for the final closing action of pushing the wheels 506 rearwardly along the tracks 518 to raise the bin 16 and compress the seal, whereupon the sequence returns to its starting point at FIG. 30(a).

A variation on the above arrangement would be to make the wheel tracks 518 out of a low-friction material such as PTFE or a PTFE-coated material, with a suitable PTFE or PTFE-coated profile fixed to the runner 510 instead of a wheel 506.

The embodiment of FIGS. 25 to 30 also includes means for partially isolating the movement of the runner 510 from that of the bin 16, thus reducing acceleration and braking forces imparted to the bin 16. The system of wheel housings 512 fixed in relation to the bin, and the wheels 506 fixed to the runners but floating within the wheel housings 512 permits limited independent movement between the bin 16 and the runner 510. Thus, sudden acceleration and deceleration to the runner 510 can be partially absorbed by limited independent movement of the bin 16, which reduces the rate of change in bin velocity and hence the inertial effects experienced by items stored in the bin 16.

It will be noted that when the accelerations of the bin 16 and runner 510 are near equilibrium, the wheel 506 will sit around the central rest point at the apex 532 of the wheel track 518. When the runner acceleration changes rapidly, such as hitting an end stop or when the drawer is jerked open, the direction and motion of the bin 16 will continue as the wheel moves along the track 518 from the apex 532 toward one of the ridges 522, 528. This vertical movement up the upwardly-inclined ramp portions 524, 526 against the weight of the loaded bin 16 absorbs some of the kinetic energy in the bin 16, and thus slows it to a gentler stop.

Figure 31:
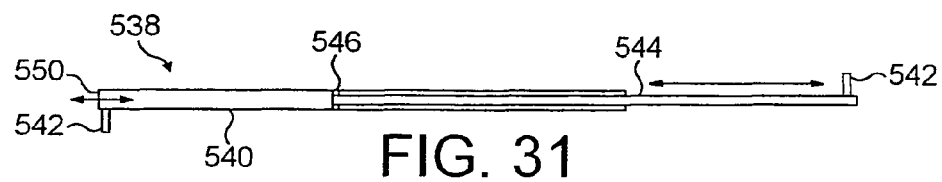
FIG. 31 is a sectional side view of a damper for use in the bin transport mechanism of FIGS. 25 to 30.

A further refinement of the embodiment of FIGS. 25 to 30 is a control damper. Referring especially now to FIG. 31, this shows a simple piston-operated air damper 538 to restrict the acceleration and braking of the drawer runner. The damper has a cylinder 540 whose rear end terminates in a pin 542 that is fixed to the structure of the appliance at its rear. A rod 544 slides within the cylinder 540 and has a piston 546 at one end, slideably sealed within the cylinder 540, and another pin 542 at the other end for attachment to the bottom section 548 of the runner 510 as shown in FIGS. 30(a) to 30(f). As the rod 544 and piston 546 are pulled from the cylinder 540, air is drawn though a small orifice 550 in the blind end of the cylinder 540. The orifice 550 is sized such that below a limiting piston speed, the passage of air through the orifice 550 causes little resistance (i.e. differential pressure over the orifice 550) and the rod 544 can be moved easily. As the speed of the piston 546 increases, then so does the resistance across the orifice 550 making the rod 544 more difficult to extend or retract. Speed control of the piston rod 544 is achieved because the inverse square law applies, whereby a doubling in airflow through the orifice 550 produces a fourfold increase in resistance on the rod 544.

The purpose of the damper 538 is to control the speed of the runner 510 from mid-point to fully open, also from mid-point to fully closed, preventing a jarring stop in both directions. Alternatively, dampers 538 could be fitted to both sections of the runner 510 to provide speed control over the entire travel of the runner 510.

Referring back to FIGS. 30(a) to 30(f), the damper control sequence will now be described. FIG. 30(a) shows the bin 16 in the closed position with the runners 510 and damper 538 fully retracted. FIG. 30(b) shows the bin 16 released from its seal with the top section 508 of the runner 510 extended and the bottom section 548 of the runner 510 restrained by the damper 538. FIG. 30(c) shows the bin 16 at about mid-point in opening with the top section 508 of the runner 510 fully extended and the bottom section 548 of the runner 510 still restrained by the damper 538. FIG. 30(d) shows the bin 16 fully open with both runner sections 508, 548 and the damper 538 fully extended, indicating that the damper 538 had control over the last part of the bin opening movement. FIG. 30(e) shows the bin 16 at about mid-point in closing with the top section 508 of the runner 510 fully retracted and the bottom section 548 of the runner 510 fully extended and restrained by the damper 538. FIG. 30(f) shows the bin 16 and top section 508 of the runner 510 fully retracted with the bottom section 548 of the runner 510 and the damper 538 significantly retracted, indicating that the damper 538 had control over the last part of the bin closing movement.

FIGS. 32(a) to 32(f) show a refinement of the damper concept, in which the piston 552 is itself a cylinder sliding concentrically within the outer cylinder 554. The outer cylinder 554 has no orifices and is sealed to the piston 552 by a sealing gland 556 between the piston 552 and the outer cylinder 554 near the otherwise open end of the outer cylinder 554. The piston 552, on the other hand, has a series of orifices 558 spaced along the length of the piston 552.

It will be self-evident that when the piston 552 is forced into the outer cylinder 554, the piston 552 will compress air trapped within the outer cylinder 554. That compressed air can only escape from the outer cylinder 554 by passing through the cylindrical piston 552 via one or more orifices 558 lying within the outer cylinder 554 and one or more orifices 558 lying outside the outer cylinder 554. However, when the piston 552 is fully retracted within the outer cylinder 554 as shown in FIG. 32(a), all of the orifices 558 are within the outer cylinder 554: none of the orifices 558 can communicate within the outside, so there is no net flow or air out of the outer cylinder 554. This traps compressed air, which provides a cushioning effect as the damper approaches its fully retracted state.

Conversely, when the damper is in a semi-extended or semi-retracted state as shown for example in FIGS. 32(c) or 32(d), more than one orifice 558 is within the outer cylinder 554 and more than one orifice 558 is outside: this presents minimum resistance to air flow and so minimises the damping effect when the damper is in mid-stroke. However, when the damper nears the fully-extended state as in FIG. 32(f), only one orifice 558 is within the outer cylinder 554 and whilst several orifices 558 are outside, the airflow through them is limited by the airflow through the single orifice 558 within: this presents greater resistance to air flow and so maximises the damping effect when the damper nears the end of its stroke. Eventually, when the damper is fully extended (not shown), all of the orifices 558 may be outside the outer cylinder, so again, airflow is blocked. Continued extension of the damper in this state is strongly resisted by low pressure within the outer cylinder 554, but again in a cushioned manner.

Further enhancements to the drawer transport system will now be described. They include methods to limit the independent movement between the runner and bin, and alternative end-of-travel restraints.

Figure 33A:
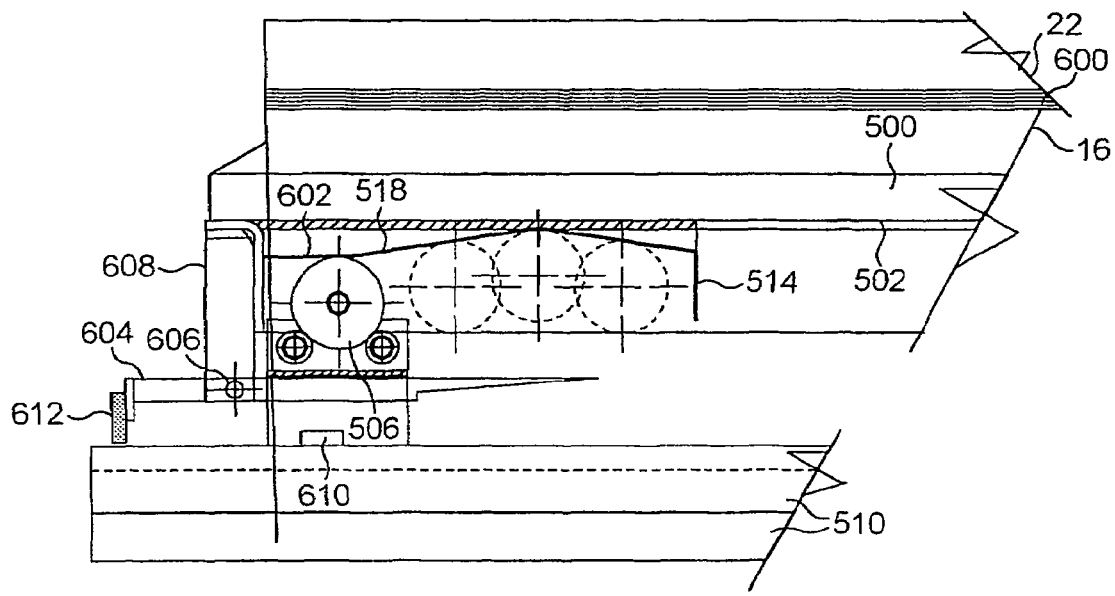
FIGS. 33(a) to 33(e) are a sequence of sectional side views showing the operation of a further alternative bin transport mechanism.

It will be apparent that the system employing wheel ramps and wheels as illustrated in FIGS. 25 to 30 will raise the bin 16 when the runners 510 are rapidly accelerated in mid-travel. Where this is not desirable, a movement limiting system may be employed as shown in FIGS. 33(a) to 33(e). FIG. 33(a) shows a drawer transport system with the bin 16 closed with its seal 600 compressed against a lid 22, supported by a wheel 506 parked on a flat portion 602 of the rear part of a wheel track 518. To drop the bin 16 to open it and break the seal, the wheel 506 moves forwardly along the wheel track 518 out of the parked position. In this state, the three dashed line circles shown on the wheel track 518 indicate the rearward and forward travel limits and the normal centre position of the wheel 506. Rearward bin movement in relation to the runner 510 is limited by the assembly including the wheel 506 encountering the forward buffer 514 at the front of the wheel track 518.

A pivoting engaging lever 604 is attached by a spindle 606 to a support plate 608 that travels with the wheel track 518 and so moves in relation to the runner 510. The lever 604 pivots to limit the forward movement of the bin 16 in relation to the runner 510 during normal bin movement. Specifically, when the drawer is opened, the front end of the lever 604 drops down under gravity and engages with a stop plate 610 attached to the runner 510. This engagement between lever and stop plate limits the forward motion of the bin 16 in relation to the runner 510, and so prevents the wheel 506 travelling the full length of the track 518 into the parked position 602, in which the bin 16 is raised.

To remove the forward limit by disengaging the lever 604 from the stop plate 610, the rear of the engaging lever 604 hits a striker plate 612 fixed to the structure just as the bin 16 reaches its final horizontal closed position. In this way, the lever 604 pivots in an opposite sense to free the bin 16 for forward movement so as to enable the wheel 506 to travel the full length of the track 518 into the parked position 602, in which the bin 16 is raised and the seal 600 is compressed during the final closing motion of the drawer.

FIG. 33(a) shows a bin 16 in a closed and raised position with the seal 600 compressed. The rear of the lever 604 is firmly against the striker plate 612 so that the lever 604 is disengaged from the stop plate 610 and the wheel 506 is free to move the full length of the track 518.

Figure 33B:
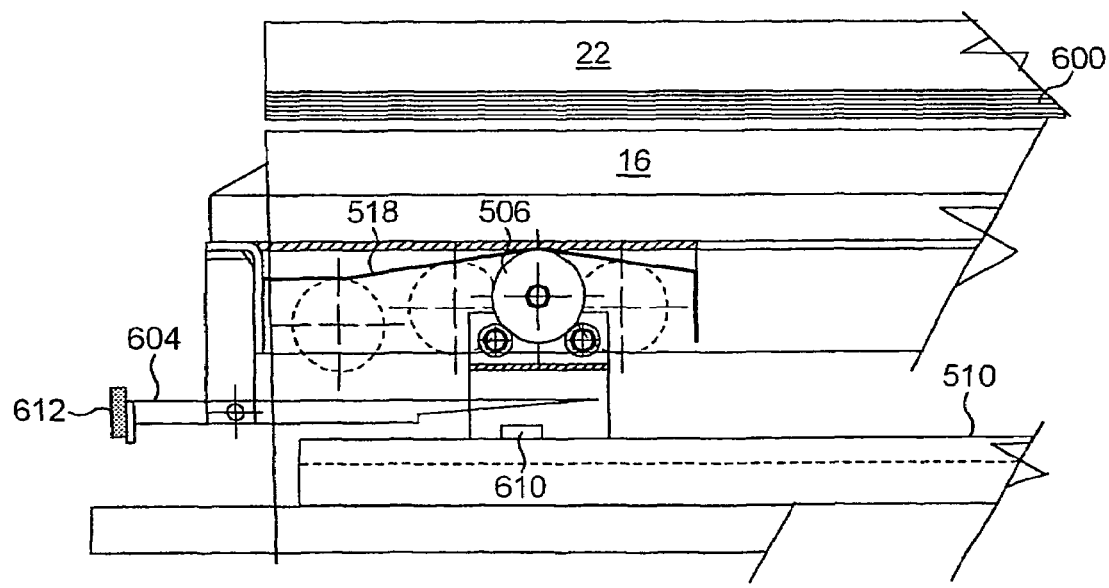

FIG. 33(b) shows the bin 16 in a closed position but lowered so that the seal 600 is released. The rear of the lever 604 is still firmly against the striker plate 612 so that the lever 604 is disengaged and the bin movement is not limited. However, relative movement between the runner 510 and the bin 16 means that the wheel 506 is now located at the mid-point of the wheel track 518.

Figure 33C:
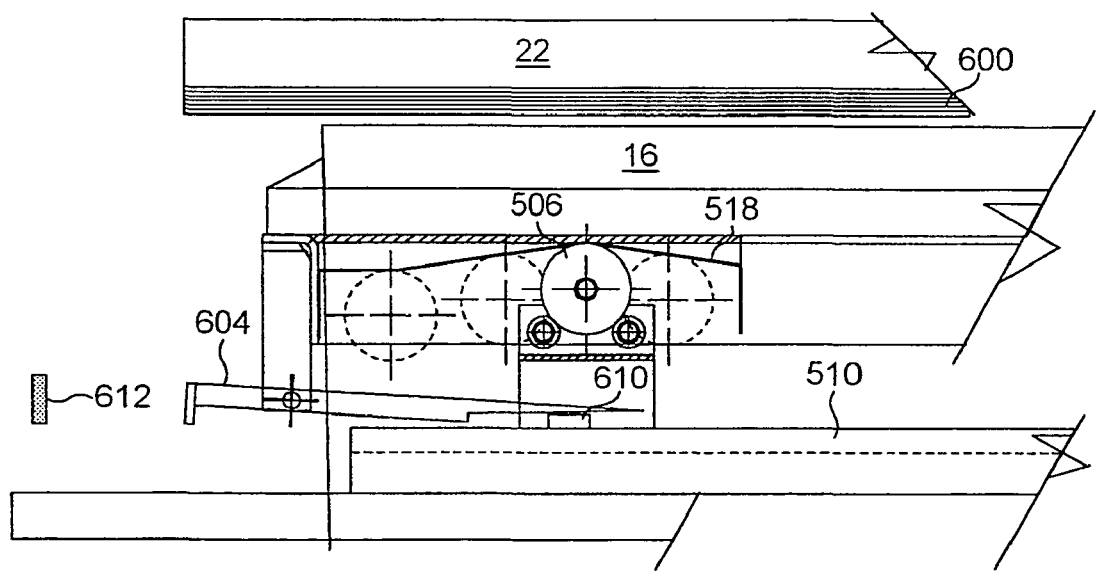

FIG. 33(c) shows the bin 16 in a partially open position with the seal 600 released. The rear of the lever 604 has moved away from the striker plate 612 so that the front of the lever 604 is free to drop and has engaged with the stop plate 610, so that bin movement is now limited. The wheel 506 is still located at the midpoint of the wheel track 518 and the bin 16 can move forward or backward by a limited amount relative to the runner 510, as the wheel 506 travels along the inclined portions of the wheel track 518 either forwardly or rearwardly (or more precisely, as the track travels with respect to the wheel). However, the load of the bin 16 and its contents biases the wheel 506 to the mid-point of the track 518.

Figure 33D:
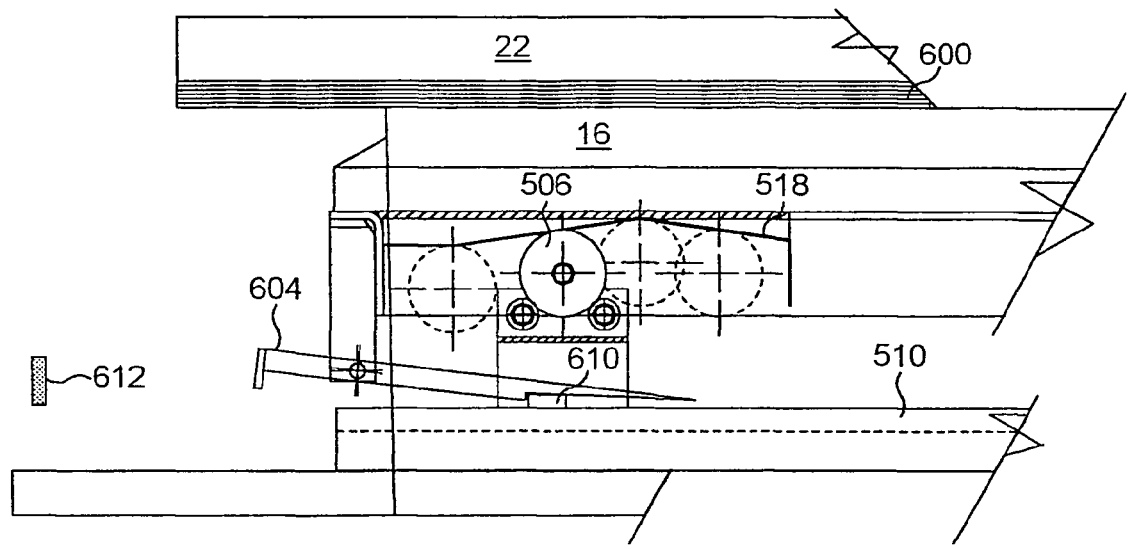

FIG. 33(d) shows the bin 16 in a partially open position with forward movement of the bin 16 relative to the runner 510, as the drawer is being closed. The wheel 506 is now at the rearward limit of the wheel track 518 and the bin 16 is prevented from further forward movement with respect to the runner 510 by the engaging lever 604 bearing against the stop plate 610 on the runner 510. In effect, the bin 16 and the runner 510 are now locked together during continued closing movement of the drawer, until the rear end of the lever 604 encounters the striker plate 612 and releases the bin 16 for further forward movement with respect to the runner 510.

Figure 33E:
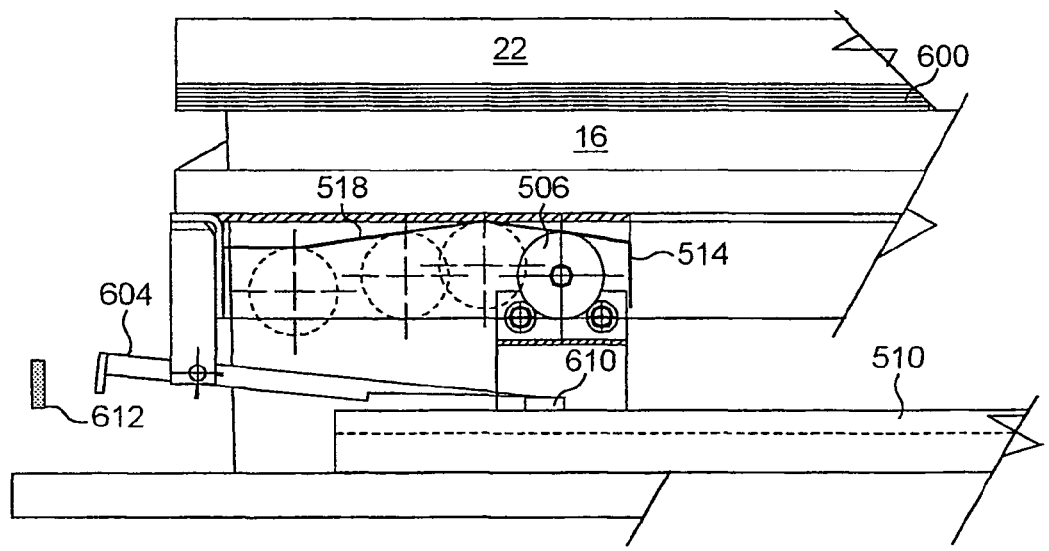

FIG. 33(e) shows the bin 16 in a partially open position with rearward movement of the bin 16 relative to the runner 510, as would happen if the drawer is jerked open. The wheel 506 is now located at the forward limit of the wheel track 518 and the bin 16 is prevented from further rearward movement with respect to the runner 510 by the wheel assembly 506 hitting the forward buffer 514.

FIGS. 33(d) and 33(e) show how movement of the bin 16 relative to the runner 510 causes vertical movement of the wheel track 514, which brakes the velocity of the bin 16. As this happens, the independent horizontal movement of the bin 16 increases the time allowed for this change in velocity to take place, hence resulting in a smoother bin stop. Otherwise, depending upon how roughly a drawer is handled in use, the bin 16 could come to a sudden stop at each end of travel, either closed-to-open or open-to-closed, which can disturb stored objects and spill liquids within the bin 16.

Further to reduce rapid deceleration of the bin 16 at each end of travel, end-of-travel restraints can be used. For example, as the bin 16 is about to reach the final closed position, a flexible restraining plate on the runner can hit a striker plate on the structure that temporarily slows the runner and then releases it. Slowing the runner, but not the bin, allows the bin to move rearwardly independently of the runner, which absorbs some of the bin's momentum and so reduces inertial effects upon the stored products as the bin thereafter comes to a halt.

Figure 34:
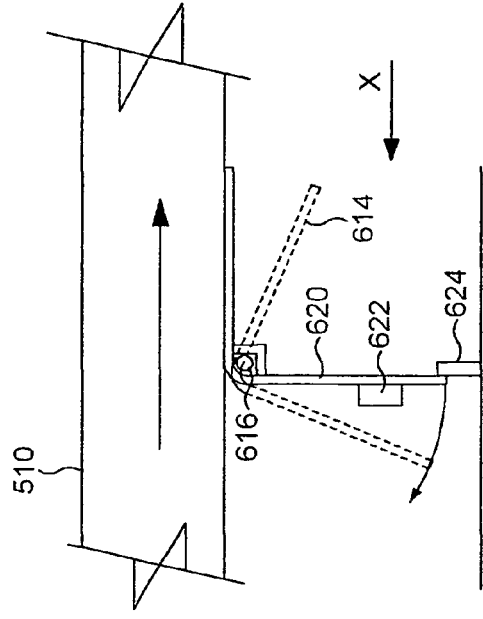
FIGS. 34, 35 and 36 are side and front views respectively of a restraining mechanism, the front view of FIG. 36 being taken on line X of FIG. 35.
Figure 35:
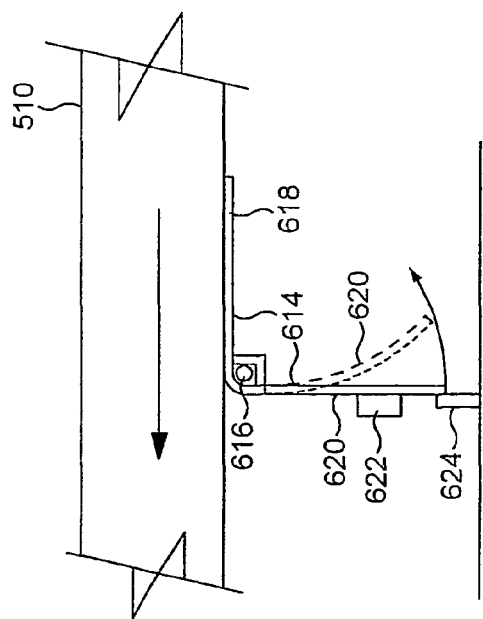
Figure 36:
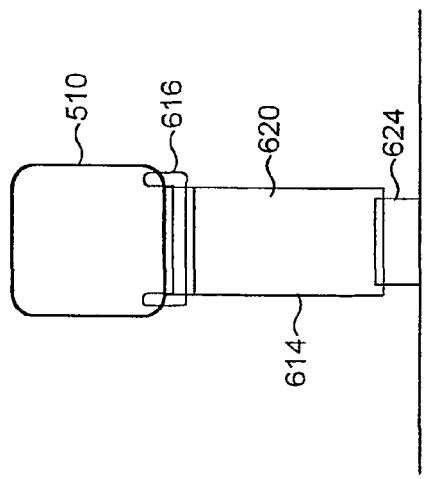

FIGS. 34 to 36 show a flexible sprung angled restraining plate 614 attached by a hinge 616 to the underside of the runner 510. The plate is essentially a strip formed in a right-angle and hinged at its apex between two mutually-orthogonal legs 618, 620. Normally one leg 618 lies horizontally against the underside of the runner 510 and the other leg 620 hangs vertically with the aid of a counterbalance weight 622.

FIG. 34 shows the restraining plate resisting movement in a restraining phase as it is forced past a striker plate 624 fixed to the structure. Continued movement of the runner 510 deflects the leg (shown by the dashed line) until it has deflected sufficiently to pass over the striker plate 624, thus ending the restraining phase. FIG. 35 shows the runner 510 returning in the opposite direction; in this case, as the leg 620 reaches the striker plate, the entire restraining plate 614 pivots easily about the hinge 616 into the position shown by dashed lines. Thus, in this direction, the restraining plate 614 offers no resistance to the drawer movement.

In practice, restraining plates 614 and striker plates 624 will be used in opposed pairs as shown in FIGS. 37(a) to 37(f). These drawings show the location of forward and rearward restraining plates 614 on the underside of the runner 510 and the associated striker plates 624 located on the structure. The forward striker plate 624 initiates the opening restraining end stop and the rearward striker plate 624 initiates the closing restraining end stop.

Figure 37D:
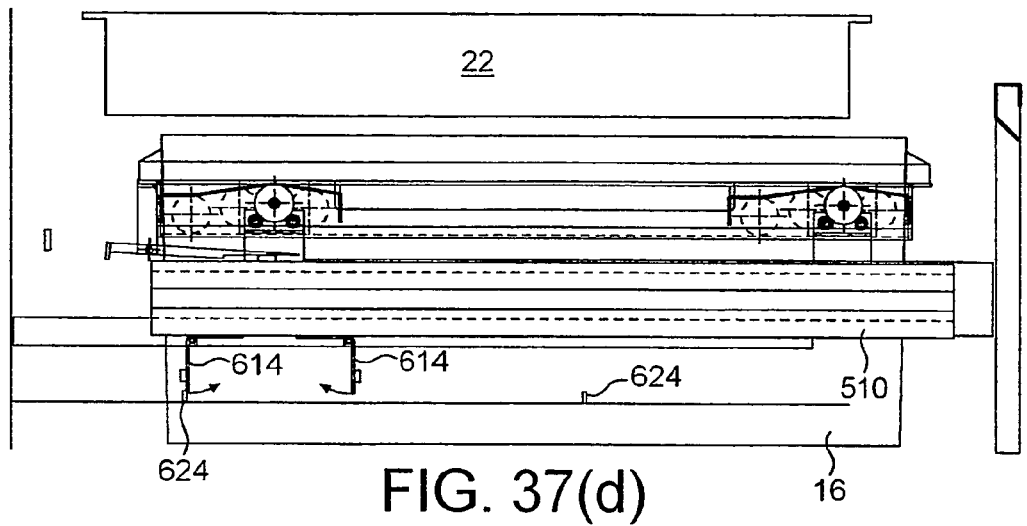
Figure 37E:
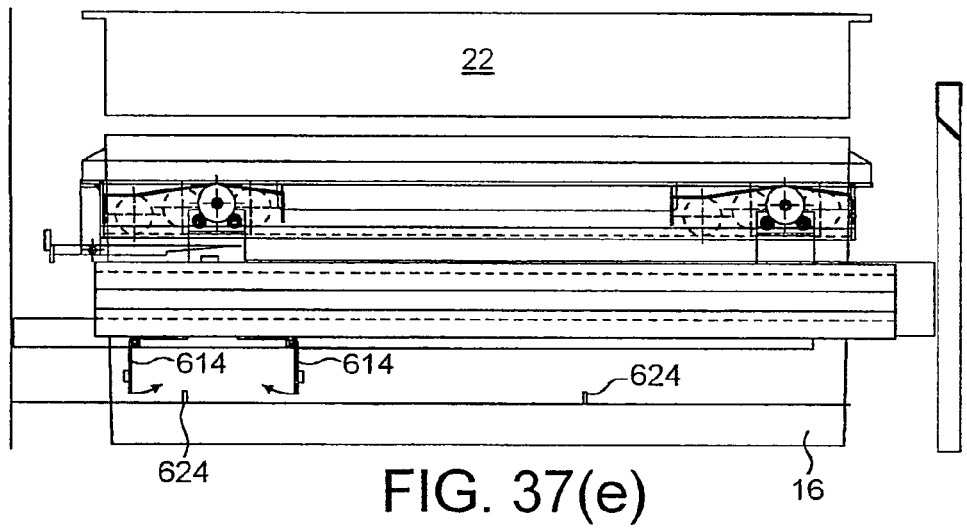
Figure 37F:
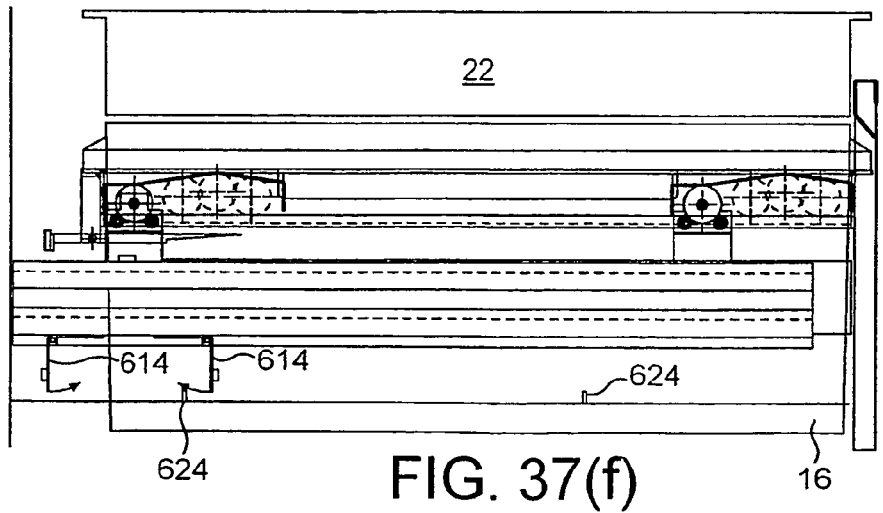

When the drawer opening is in a mid position shown in FIG. 37(a), the restraining plates 614 do not encounter the associated striker plates 624. FIG. 37(b) shows a drawer almost completely open with the forward restraining plate 614 engaging and deflecting around the forward striker plate 624, hence slowing the drawer as it nears the end of its opening movement. FIG. 37(c) shows the drawer completely open with the forward restraining plate 614 having passed over the striker plate 624. Conversely, FIG. 37(d) shows the drawer almost completely closed with the rearward restraining plate 614 engaging the rearward striker plate 624 to slow bin movement near the end of the closing movement, and FIG. 37(e) shows the drawer with the bin 16 fully closed, but not yet raised, and the rearward restraining plate 614 having passed over the rearward striker plate 624. FIG. 37(f) shows a drawer completely closed with the bin 16 raised and the seal compressed; again, the restraining plates 614 do not encounter the associated striker plates 624.

Many variations are possible within the inventive concept. For example, it has already been said that movement of a lid can be linked to the movement of the associated bin or of a movable support for that bin, so that initial opening movement of the bin or its support causes the lid to move apart from the bin and, vice-versa, at or toward the end of a closing movement of the bin or its support. The skilled reader will appreciate that the various bin transport mechanisms described above can be adapted and inverted to drive the vertical movement of a lid instead of the vertical movement of a bin, simply by acting upon an extension of the lid overhanging the bin rather than upon the lid itself.

The invention has wide-ranging applications and benefits for storing, handling, distributing, transporting and delivering items in the right condition, notably:

- precise variable temperature and humidity control that could even include heating rather than merely cooling;
- mechanical protection of stored items;
- sterile storage with minimal risk of cross-contamination;
- the option of storage in partial vacuum conditions;
- the option of storage in a preservative holding gas environment;
- isolation of stored items against vibration and agitation; and
- containment of, or protection against, radiation and bio hazards.

In general, therefore, reference should be made to the appended claims and other general statements herein rather than to the foregoing specific description as indicating the scope of the invention. In interpreting the invention, it should be understood that although features of the illustrated embodiments have been described in combination with each other and although such combinations may have advantages of their own, many of those features can be applied independently. For example, the skilled reader will appreciate that the damper of FIGS. 32(*a*) to 32(*f*) could be used independently of a cold-storage appliance or other storage unit. So, those features are considered to be independently patentable whether within or beyond the inventive concepts expressed herein.

What is claimed is:

1. A storage unit including:
an open-topped drawer;
a lid adapted to close the open top of the drawer; and
a structure supporting the drawer and the lid;
wherein the drawer is mounted to the structure for movement relative to the structure and the lid to open the drawer and afford access to its interior or to close the drawer, and wherein said movement of the drawer includes:
a major component to open the drawer and afford access to its interior or to close the drawer; and
a minor component, transverse to the major component, to separate the drawer from the lid at the beginning of said major component upon opening or to bring the drawer and the lid together at the end of said major component upon closing; and wherein the minor component takes place before the major component upon opening and after the major component upon closing.

2. The unit of claim 1, embodied as a cold storage appliance comprising:
an open-topped insulating container being the drawer;
an insulating lid adapted to close the open top of the container;
a cooling means adapted to cool the interior of the container; and
a structure supporting the container, the lid and the cooling means;
wherein the container is mounted to the structure for movement relative to the structure and the lid to open the container and afford access to its interior or to close the container, and wherein said movement of the container includes:
a major component to open the container and afford access to its interior or to close the container; and
a minor component, transverse to the major component, to free the container from the lid at the beginning of said major component upon opening or to bring the container and the lid together at the end of said major component upon closing.

3. A storage unit including:
an open-topped drawer;
a lid adapted to close the open top of the drawer; and
a structure supporting the drawer and the lid;
wherein the drawer is mounted to the structure for movement relative to the structure and the lid to open the drawer and afford access to its interior or to close the drawer, and wherein said movement of the drawer includes:
a major component to open the drawer and afford access to its interior or to close the drawer; and
a minor component, transverse to the major component, to separate the drawer from the lid at the beginning of said major component upon opening or to bring the drawer and the lid together at the end of said major component upon closing; and
wherein the minor component takes place during initial movement in the direction of the major component upon opening and during final movement in the direction of the major component upon closing.

4. The unit of claim 3, embodied as a cold storage appliance comprising:
an open-topped insulating container being the drawer;
an insulating lid adapted to close the open top of the container;
a cooling means adapted to cool the interior of the container; and
a structure supporting the container, the lid and the cooling means;
wherein the container is mounted to the structure for movement relative to the structure and the lid to open the container and afford access to its interior or to close the container, and wherein said movement of the container includes:
a major component to open the container and afford access to its interior or to close the container; and
a minor component, transverse to the major component, to free the container from the lid at the beginning of said major component upon opening or to bring the container and the lid together at the end of said major component upon closing.

5. A storage unit including:
an open-topped drawer;
a lid adapted to close the open top of the drawer; and
a structure supporting the drawer and the lid;
wherein the drawer is mounted to the structure for movement relative to the structure and the lid to open the drawer and afford access to its interior or to close the drawer, and wherein said movement of the drawer includes:
a major component to open the drawer and afford access to its interior or to close the drawer; and
a minor component, transverse to the major component, to separate the drawer from the lid at the beginning of said major component upon opening or to bring the drawer and the lid together at the end of said major component upon closing;
the unit comprising support means movable to support the drawer during the major component and transport means between the support means and the drawer that responds to movement of the support means to effect the minor component.

6. The unit of claim 5, embodied as a cold storage appliance comprising:
an open-topped insulating container being the drawer;
an insulating lid adapted to close the open top of the container;

a cooling means adapted to cool the interior of the container; and a structure supporting the container, the lid and the cooling means;

wherein the container is mounted to the structure for movement relative to the structure and the lid to open the container and afford access to its interior or to close the container, and wherein said movement of the container includes:

a major component to open the container and afford access to its interior or to close the container; and a minor component, transverse to the major component, to free the container from the lid at the beginning of said major component upon opening or to bring the container and the lid together at the end of said major component upon closing.

7. The unit of claim 5, further including locking means for releasably locking the transport means to prevent movement of the drawer in the direction of the minor component.

8. The unit of claim 7, wherein the locking means is responsive to the position of the drawer in the direction of the major component and locks the transport means during part of a range of movement of the support means in the direction of the major component.

9. The unit of claim 8, wherein the locking means unlocks the transport means during initial movement in the direction of the major component upon opening and during final movement in the direction of the major component upon closing.

10. The unit of claim 5, wherein the support means is movable independently of the drawer and the transport means is responsive to relative movement between the support means and the drawer.

11. The unit of claim 10, wherein the transport means is responsive to movement of the support means before the major component of movement of the drawer begins or to continued movement of the support means after the major component of movement of the drawer has been completed.

12. The unit of claim 10, wherein the transport means includes a first part movable with the support means and a second part movable with the drawer, wherein relative movement between the parts accommodates said continued movement of the support means.

13. The unit of claim 12, wherein said relative movement between the parts causes the minor component of movement of the drawer.

14. The unit of claim 12, wherein one part includes a ramp and the other part includes a ramp follower.

15. The unit of claim 14, wherein the ramp is associated with stops or buffers to limit relative movement of the ramp follower.

16. The unit of claim 14, wherein the ramp follower is a wheel.

17. The unit of claim 16, wherein the wheel is one of a pair of wheels, a first wheel of the pair being for rolling load-transmitting contact with the ramp and a second wheel of the pair being for rolling load-transmitting contact with the structure while also being in rolling load-transmitting contact with the first wheel.

18. The unit of claim 16, wherein the wheel is supported by one or more auxiliary rollers opposed to the ramp.

19. The unit of claim 14, wherein the ramp follower is an opposed ramp such that relative sliding movement between the ramps during movement in the direction of the major component causes the minor component of movement of the drawer.

20. The unit of claim 19, wherein each ramp terminates in a peak at one end and a trough at the other end.

21. The unit of claim 20, wherein relative movement between the ramps brings the peaks of the ramps into alignment with each other to bring the drawer and the lid together.

22. The unit of claim 20, wherein relative movement between the ramps brings the peaks of the ramps into alignment with the opposed troughs to separate the drawer from the lid.

23. The unit of claim 19 and including means for limiting relative movement between the ramps to transmit from one part of the transport means to the other a force in the direction of the major component.

24. The unit of claim 12, wherein the parts can be separated on removing the drawer from the support means.

25. The unit of claim 5, wherein the support means bears the weight of the drawer during movement of the drawer other than during initial movement in the direction of the major component upon opening and during final movement in the direction of the major component upon closing, the structure bearing the weight of the drawer directly during said initial and final movements and when the drawer is closed.

26. The unit of claim 5, further comprising a damper extensible and retractable in response to movement of the support means with respect to the structure.

27. The unit of claim 26, wherein the damper has variable resistance to movement of the support means.

28. The unit of claim 27, wherein the resistance of the damper increases with increasing speed of movement of the support means.

29. The unit of claim 27, wherein the resistance of the damper increases approaching at least one end of its stroke.

30. The unit of claim 26, wherein the damper resists movement of the support means by pumping air through a restricted orifice.

31. The unit of claim 26, wherein the damper comprises an outer cylinder sealed to a hollow and elongate piston movable within the outer cylinder to pressurise and depressurise air within the outer cylinder, the piston including a plurality of orifices spaced apart along its length and communicating with each other through the hollow interior of the piston, whereby the piston can be positioned within the outer cylinder to expose at least one of said plurality of orifices to the interior of the outer cylinder while simultaneously exposing at least one other of said plurality of orifices to atmosphere outside the outer cylinder.

32. The unit of claim 5, further comprising restraining means to slow movement of the support means or the drawer with respect to the structure.

33. The unit of claim 32, wherein the restraining means is unidirectional in its effect.

34. The unit of claim 32, wherein the restraining means acts to slow the support means or the drawer when the support means or the drawer are at one or more predetermined locations in their range of movement with respect to the structure.

35. The unit of claim 32, wherein the restraining means acts to slow the support means or the drawer when the support means or the drawer approach an end of said range or movement.

36. The unit of claim 32, wherein the restraining means comprises a first part in fixed relation to the structure and a second part in fixed relation to the support means or the drawer, the parts encountering one another during relative movement between the structure and the support means or the drawer and at least one of the parts deflecting resiliently to allow the parts to pass one another upon continued relative movement.

37. The unit of claim 5, wherein the support means is fixed to a stabilising means to resist lateral sway of the drawer during the major component of movement.

38. The unit of claim 37, wherein the stabilising means includes at least one extending member attached to the structure and being auxiliary to and movable with the support means.

39. The unit of claim 38, wherein the major component is generally horizontal and the extending member is relatively stiff in a generally horizontal direction transverse to the direction of the major component.

40. The unit of claim 39, wherein the or each extending member is laterally offset with respect to the direction of the major component.

41. The unit of claim 37, wherein the extending member is a telescopic runner.

42. The unit of claim 37, wherein the stabilising means includes pinions movable with the support means, the pinions being engaged with respective laterally-spaced racks extending in the direction of the major component.

43. A storage unit including:
an open-topped drawer;
a lid adapted to close the open top of the drawer; and
a structure supporting the drawer and the lid;
wherein the drawer is mounted to the structure for movement relative to the structure and the lid to open the drawer and afford access to its interior or to close the drawer, and wherein the lid is mounted to the structure for movement relative to the structure and the drawer to separate the lid from the drawer before said movement of the drawer upon opening or to bring together the drawer and the lid after said movement of the drawer upon closing;
wherein the lid can be tilted relative to the structure and the drawer; and
wherein the lid is hinged to the structure, the hinge defining a pivot axis horizontally spaced from the drawer.

44. The unit of claim 43, embodied as a cold storage appliance comprising:
an open-topped insulating container being the drawer;
an insulating lid adapted to close the open top of the container;
a cooling means adapted to cool the interior of the container; and
a structure supporting the container, the lid and the cooling means;
wherein the container is mounted to the structure for movement relative to the structure and the lid to open the container and afford access to its interior or to close the container, and wherein the lid is mounted to the structure for movement relative to the structure and the container to free the container from the lid before said movement of the container upon opening or to bring the container and the lid together after said movement of the container upon closing.

45. A storage unit including:
an open-topped drawer;
a lid adapted to close the open top of the drawer; and
a structure supporting the drawer and the lid;
wherein the drawer is mounted to the structure for movement relative to the structure and the lid to open the drawer and afford access to its interior or to close the drawer, and wherein the lid is mounted to the structure for movement relative to the structure and the drawer to separate the lid from the drawer before said movement of the drawer upon opening or to bring together the drawer and the lid after said movement of the drawer upon closing; and
wherein the lid is movable transverse to the direction of movement of the drawer.

46. The unit of claim 45, embodied as a cold storage appliance comprising:
an open-topped insulating container being the drawer;
an insulating lid adapted to close the open top of the container;
a cooling means adapted to cool the interior of the container; and
a structure supporting the container, the lid and the cooling means;
wherein the container is mounted to the structure for movement relative to the structure and the lid to open the container and afford access to its interior or to close the container, and wherein the lid is mounted to the structure for movement relative to the structure and the container to free the container from the lid before said movement of the container upon opening or to bring the container and the lid together after said movement of the container upon closing.

47. A storage unit including:
an open-topped drawer;
a lid adapted to close the open top of the drawer; and
a structure supporting the drawer and the lid;
wherein the drawer is mounted to the structure for movement relative to the structure and the lid to open the drawer and afford access to its interior or to close the drawer, and wherein the lid is mounted to the structure for movement relative to the structure and the drawer to separate the lid from the drawer before said movement of the drawer upon opening or to bring together the drawer and the lid after said movement of the drawer upon closing;
the unit including lid transport means responsive to movement of the drawer or of a support means movable to support the drawer during said movement.

48. The unit of claim 47, embodied as a cold storage appliance comprising:
an open-topped insulating container being the drawer;
an insulating lid adapted to close the open top of the container;
a cooling means adapted to cool the interior of the container; and
a structure supporting the container, the lid and the cooling means;
wherein the container is mounted to the structure for movement relative to the structure and the lid to open the container and afford access to its interior or to close the container, and wherein the lid is mounted to the structure for movement relative to the structure and the container to free the container from the lid before said movement of the container upon opening or to bring the container and the lid together after said movement of the container upon closing.

49. The unit of claim 47, wherein the lid transport means moves the lid before the drawer starts moving upon opening and after the drawer has stopped moving upon closing.

50. The unit of claim 47, and comprising support means movable to support the drawer during said movement and lid transport means between the support means and the lid that responds to movement of the support means to move the lid.

51. The unit of claim 50, wherein the support means is movable independently of the drawer and the lid transport means is responsive to relative movement between the support means and the drawer.

52. The unit of claim 51, wherein the lid transport means is responsive to continued movement of the support means after movement of the drawer has ceased.

* * * * *